(12) United States Patent
Chuba et al.

(10) Patent No.: US 11,207,847 B2
(45) Date of Patent: Dec. 28, 2021

(54) AIR CUSHION INFLATION MACHINE

(71) Applicant: Automated Packaging Systems, LLC, Streetsboro, OH (US)

(72) Inventors: Larry Chuba, Akron, OH (US); David Romo, Mentor, OH (US)

(73) Assignee: Automated Packaging Systems, LLC, Streetsboro, OH (US)

( * ) Notice: Subject to any disclaimer, the term of this patent is extended or adjusted under 35 U.S.C. 154(b) by 0 days.

(21) Appl. No.: 17/281,610

(22) PCT Filed: Oct. 3, 2019

(86) PCT No.: PCT/US2019/054415
§ 371 (c)(1),
(2) Date: Mar. 31, 2021

(87) PCT Pub. No.: WO2020/072727
PCT Pub. Date: Apr. 9, 2020

(65) Prior Publication Data
US 2021/0308955 A1    Oct. 7, 2021

Related U.S. Application Data

(60) Provisional application No. 62/741,102, filed on Oct. 4, 2018.

(51) Int. Cl.
*B29C 65/00* (2006.01)
*B29C 65/22* (2006.01)
(Continued)

(52) U.S. Cl.
CPC .......... *B29C 66/439* (2013.01); *B29C 65/222* (2013.01); *B29C 65/7802* (2013.01); *B29D 22/02* (2013.01); *B29C 66/344* (2013.01)

(58) Field of Classification Search
CPC ......... B31B 70/02; B31B 70/04; B31B 70/10; B31B 70/14; B31B 70/144; B31B 70/148;
(Continued)

(56) References Cited

U.S. PATENT DOCUMENTS 5,552,003 A  *  9/1996  Hoover ................ B29C 66/439
                                                        156/147
6,491,614 B1 * 12/2002  Harding ............... B31D 5/0047
                                                        493/24
(Continued)

OTHER PUBLICATIONS

Written Opinion of the International searching authority in PCT/US2019/054415 dated Apr. 9, 2020.

*Primary Examiner* — Dariush Seif
(74) *Attorney, Agent, or Firm* — Jon M. Isaacson

(57) ABSTRACT

A machine for converting two different types of webs of inflatable material to two different types of inflated cushioning material includes an inflation arrangement, a sealing arrangement, and a tensioning device. The inflation arrangement is configured to provide air at a lower pressure to a first web of a first type of inflatable material to inflate the first type of inflatable material, and to provide air at a higher pressure to a second type of inflatable material to inflate the second type of inflatable material. The inflation arrangement includes a guide pin configured to the first and second webs and align the first and second webs on the machine. The sealing arrangement is configured to seal the first type of inflatable material and the second type of inflatable material to create the two different types of inflated cushioning material. The tensioning device is configured to provide a lower tensioning force to the first web as the first web moves between the inflation arrangement and the sealing arrangement, and to provide a higher tensioning force to the second web as the second web moves between the inflation arrangement and the sealing arrangement.

20 Claims, 43 Drawing Sheets

(51) Int. Cl.
*B29D 22/02* (2006.01)
*B29C 65/78* (2006.01)

(58) Field of Classification Search
CPC ......... B31B 70/16; B31B 70/20; B31B 70/36; B29C 66/439; B29C 65/18; B29C 65/222; B31D 2205/0058; B31D 3105/0039; B31D 2205/0073; B31D 2205/0023; B65D 81/052; B65D 81/03; B29L 2022/02; B29L 2031/7128
USPC ........................................................ 53/403
See application file for complete search history.

(56) References Cited

U.S. PATENT DOCUMENTS

| | | | |
|---|---|---|---|
| 6,889,739 B2 * | 5/2005 | Lerner | B29C 66/8161 156/498 |
| 7,125,463 B2 | 10/2006 | Lerner et al. | |
| 7,550,191 B2 * | 6/2009 | Lerner | B29C 65/18 428/166 |
| D596,031 S * | 7/2009 | Wehrmann | D9/456 |
| 7,571,584 B2 * | 8/2009 | Lerner | B31D 5/0073 156/147 |
| D603,705 S * | 11/2009 | Wehrmann | D9/456 |
| 7,694,495 B2 * | 4/2010 | Wehrmann | B29C 65/224 53/403 |
| 7,718,028 B2 | 5/2010 | Lerner et al. | |
| 7,757,459 B2 * | 7/2010 | Wehrmann | B65D 81/052 53/403 |
| 7,767,288 B2 | 8/2010 | Lerner | |
| D630,945 S * | 1/2011 | Wehrmann | D9/456 |
| D633,792 S * | 3/2011 | Wehrmann | D9/456 |
| 7,897,219 B2 * | 3/2011 | Wehrmann | B31D 5/0073 428/35.2 |
| 7,897,220 B2 | 3/2011 | Wehrmann | |
| 7,975,457 B2 | 7/2011 | Wehrmann | |
| 9,844,911 B2 * | 12/2017 | Corbin | B29C 65/7802 |
| 10,131,094 B2 * | 11/2018 | Shook | B29C 65/7873 |
| 10,286,617 B2 * | 5/2019 | Murch | B31D 5/0073 |
| 10,766,651 B2 * | 9/2020 | Pettersson | B65B 43/08 |
| 10,850,906 B2 * | 12/2020 | Eckel | B29C 67/0014 |
| 2002/0108352 A1 * | 8/2002 | Sperry | B31D 5/0073 53/403 |
| 2002/0166788 A1 * | 11/2002 | Sperry | B29C 66/83413 206/522 |
| 2004/0154728 A1 * | 8/2004 | Selle | B29C 66/1122 156/147 |
| 2006/0042184 A1 * | 3/2006 | Perkins | B31D 5/0073 53/79 |
| 2006/0218879 A1 * | 10/2006 | Garceau | B31D 5/0073 53/403 |
| 2006/0218880 A1 * | 10/2006 | Sperry | B29C 66/83413 53/403 |
| 2006/0289108 A1 * | 12/2006 | McNamara, Jr. | B65H 23/032 156/147 |
| 2007/0251190 A1 * | 11/2007 | Daigle | B29C 65/222 53/403 |
| 2007/0251631 A1 * | 11/2007 | Garceau | B29C 66/3432 156/147 |
| 2008/0066852 A1 * | 3/2008 | Wetsch | B29C 65/18 156/147 |
| 2009/0110864 A1 * | 4/2009 | Wehrmann | B65D 81/052 428/43 |
| 2009/0293427 A1 * | 12/2009 | Lerner | B31D 5/0073 53/403 |
| 2010/0200169 A1 * | 8/2010 | Sperry | B31D 5/0073 156/495 |
| 2010/0221466 A1 * | 9/2010 | Wehrmann | B31D 5/0073 428/35.2 |
| 2010/0281828 A1 | 11/2010 | Wehrmann | |
| 2012/0231940 A1 * | 9/2012 | Tan | B29C 66/8225 493/186 |
| 2013/0011510 A1 * | 1/2013 | Chuba | B29C 66/8122 425/324.1 |
| 2013/0032293 A1 * | 2/2013 | Birkle | B29C 65/18 156/538 |
| 2014/0261752 A1 * | 9/2014 | Wetsch | B65B 61/065 137/223 |
| 2014/0261871 A1 * | 9/2014 | Wetsch | B31D 5/0073 141/10 |
| 2015/0075114 A1 * | 3/2015 | Murch | B29D 22/02 53/52 |
| 2015/0144268 A1 * | 5/2015 | Corbin | B29C 66/9672 156/358 |
| 2015/0239633 A1 * | 8/2015 | Wetsch | B65D 81/052 428/12 |
| 2017/0166343 A1 * | 6/2017 | Murch | B65B 57/02 |
| 2018/0009178 A1 * | 1/2018 | Shook | B29C 65/7894 |
| 2019/0255798 A1 * | 8/2019 | Sperry | B31D 5/0073 |

* cited by examiner

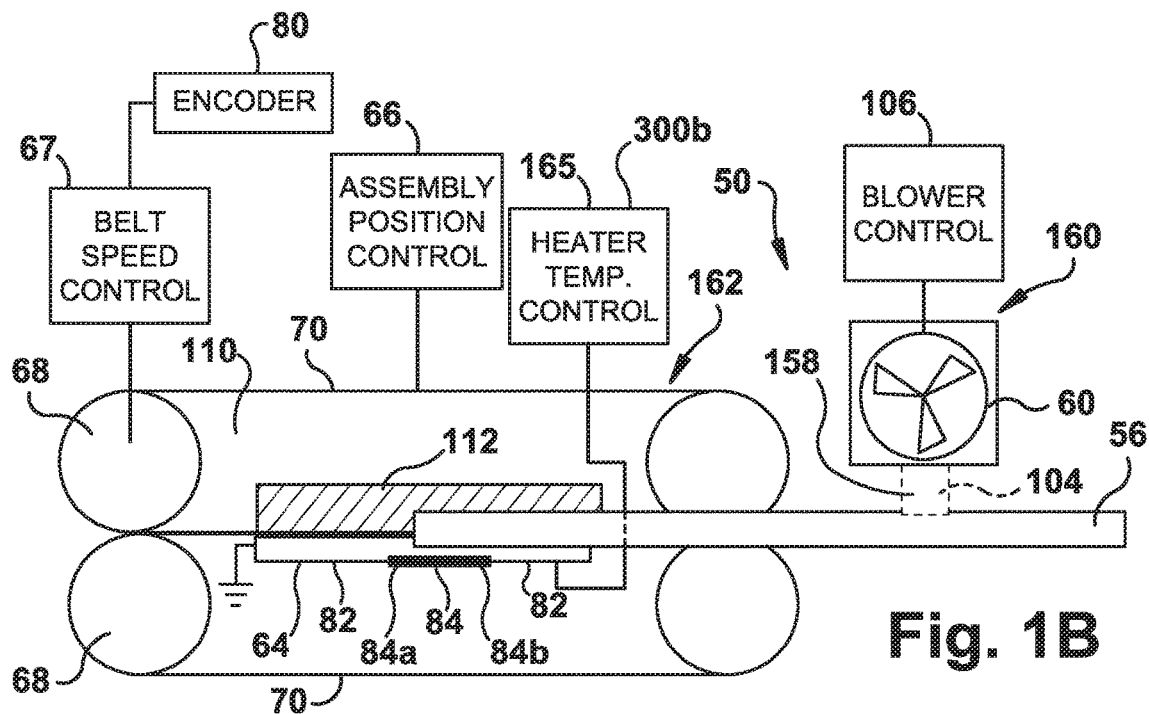
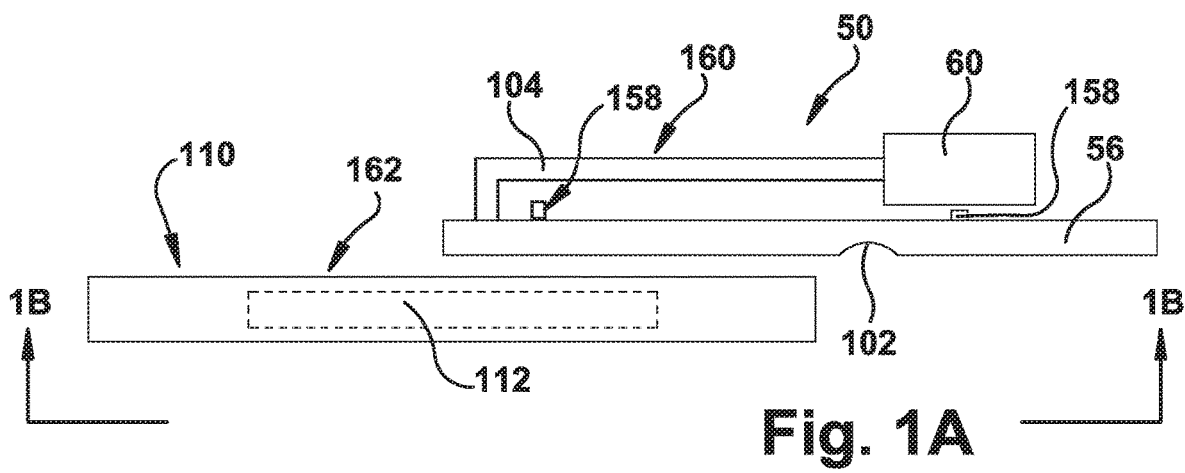

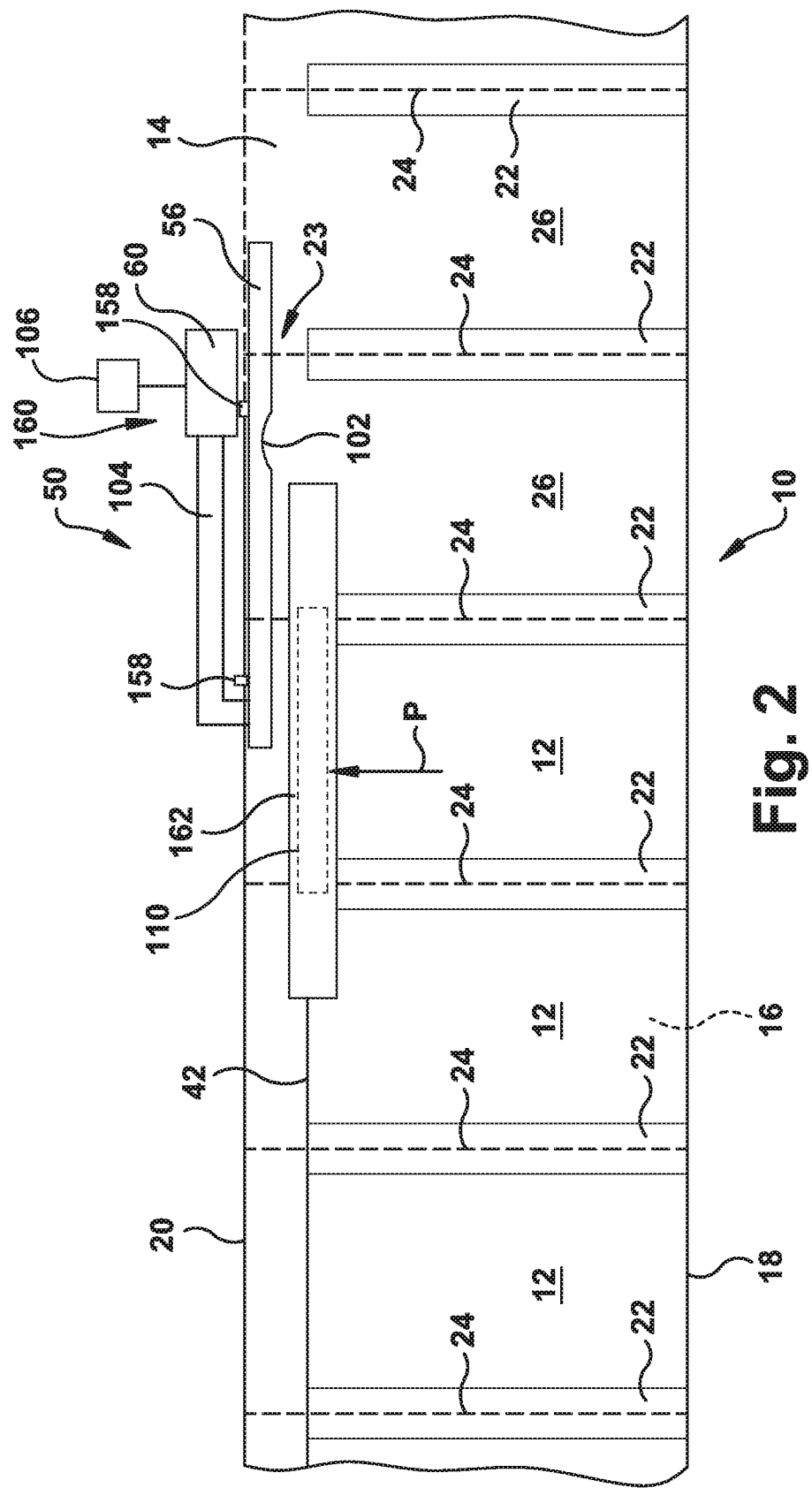

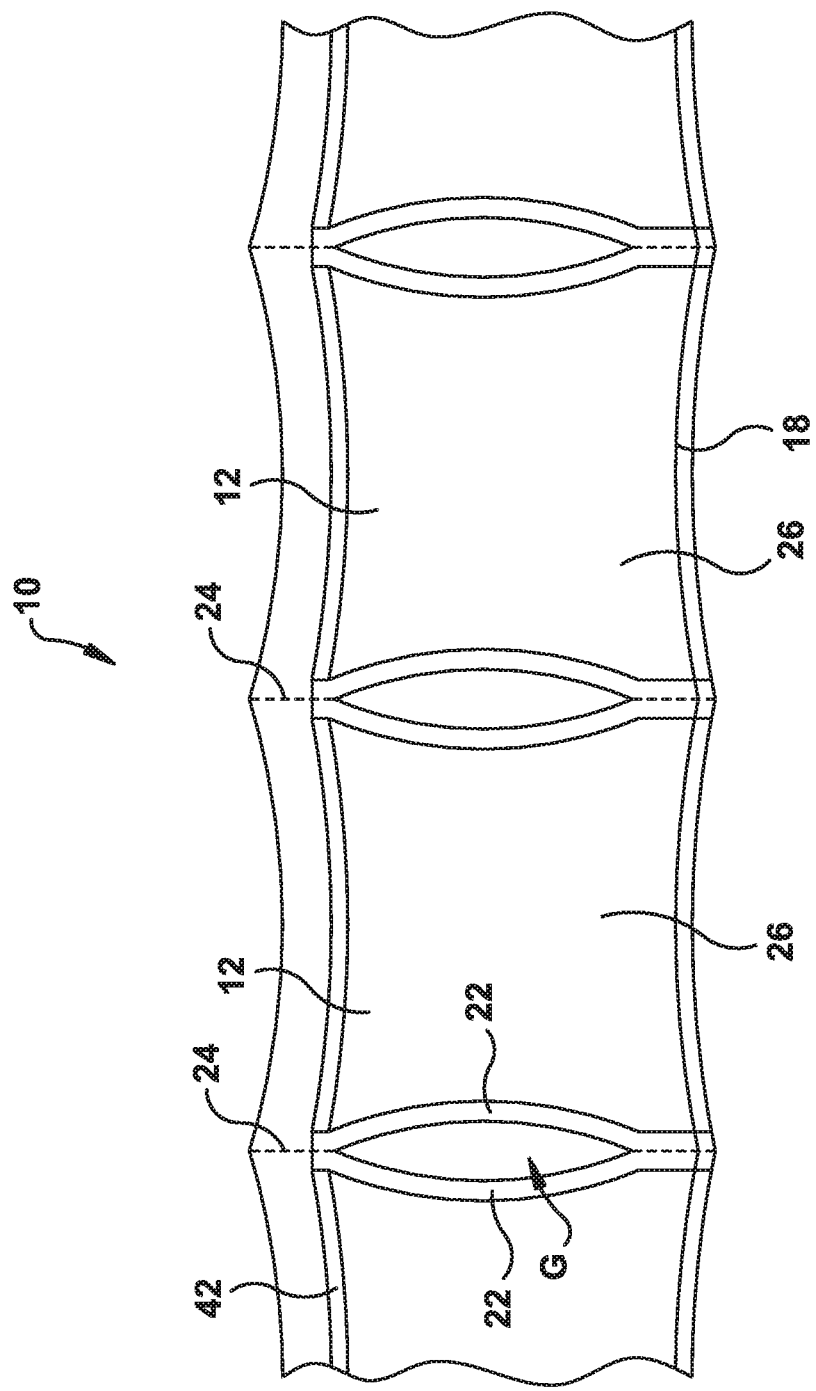

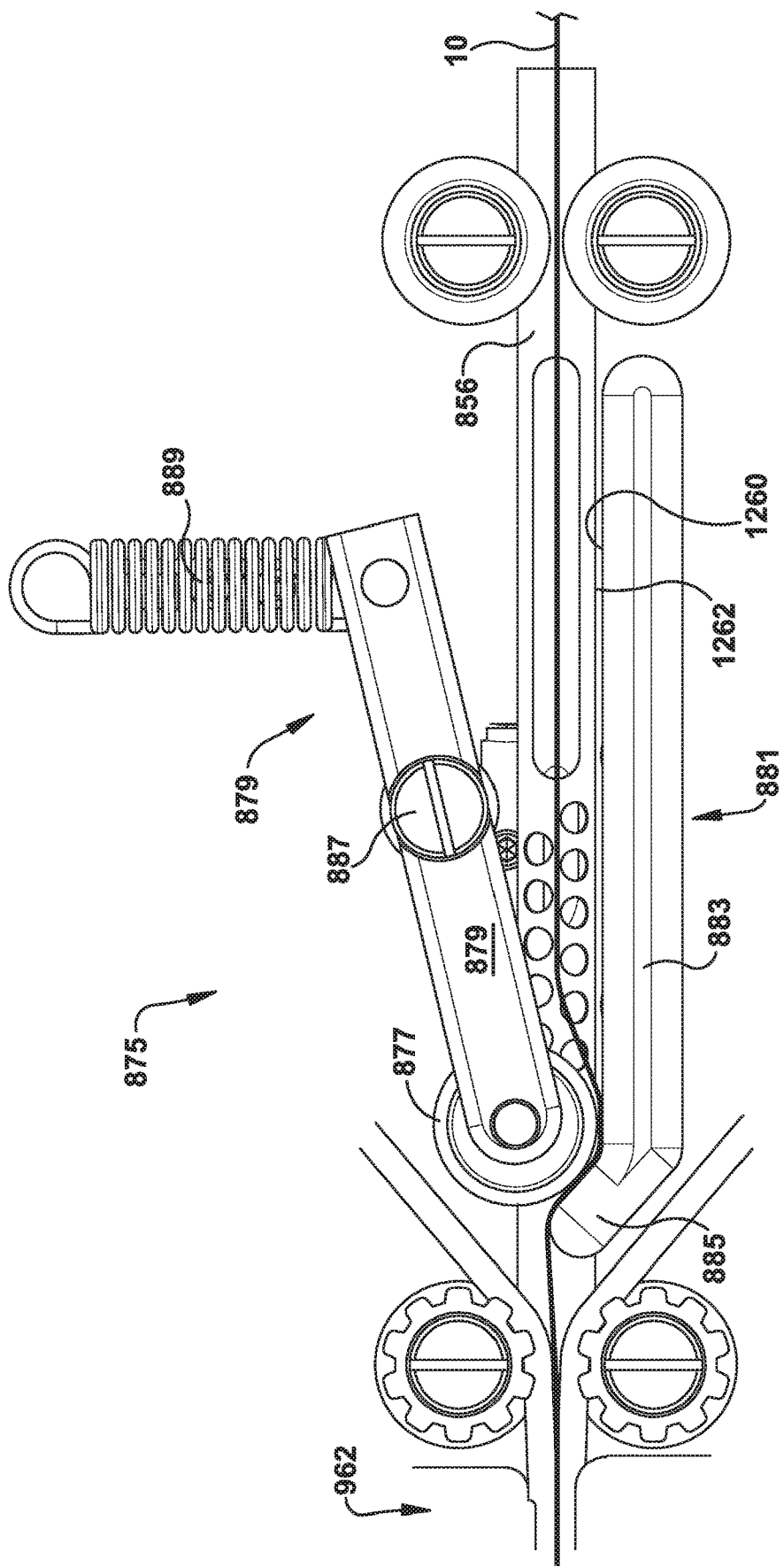

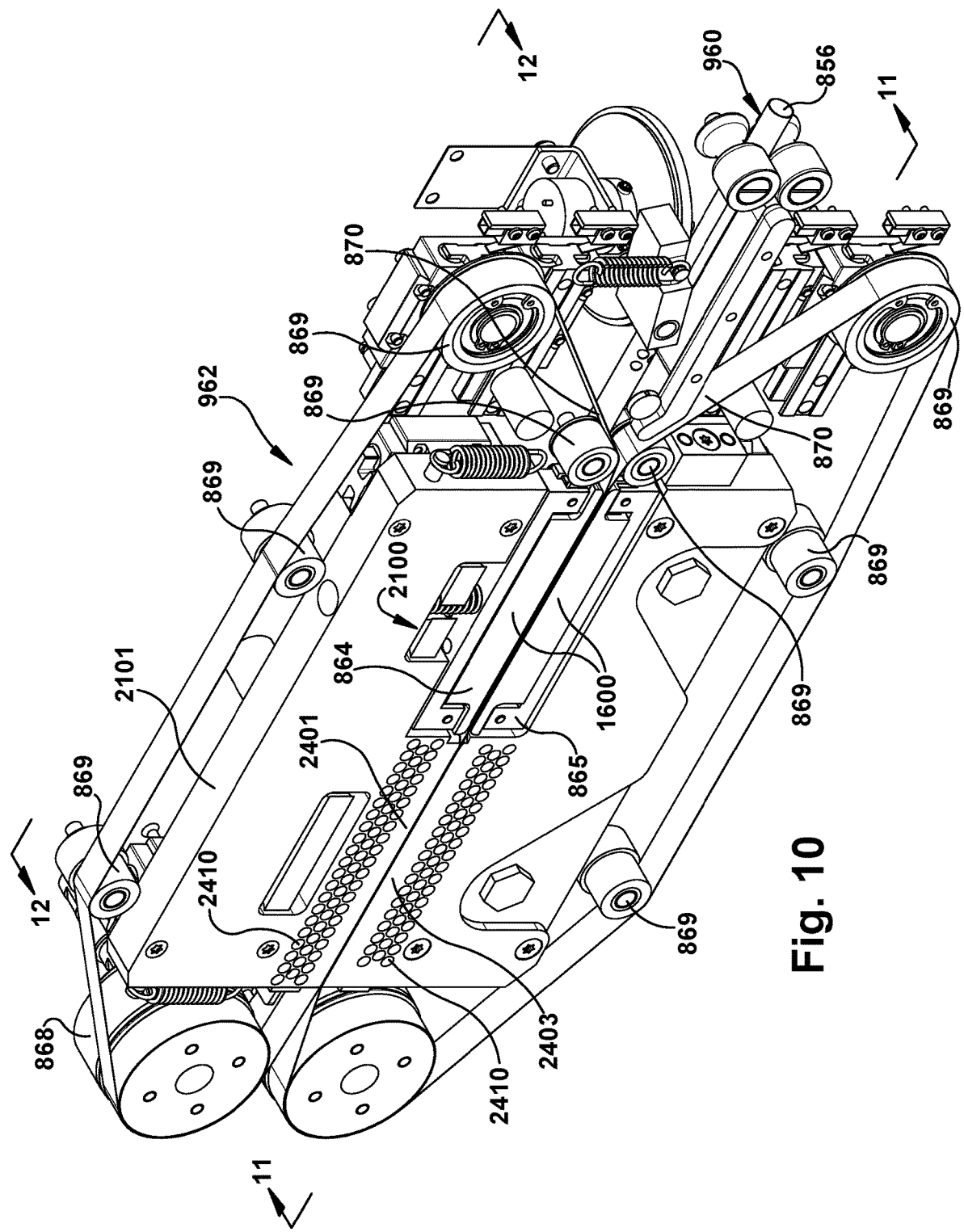

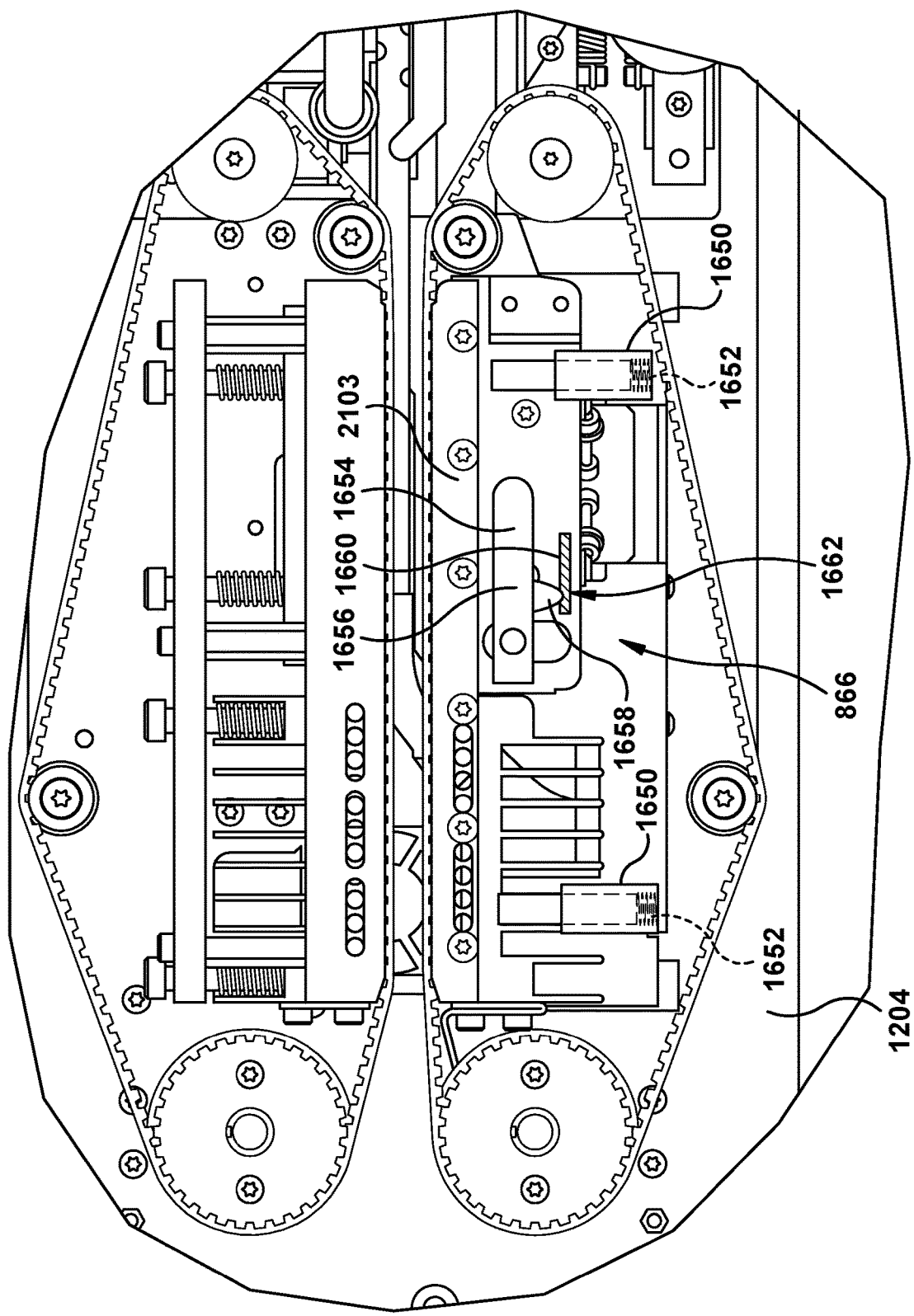

AIR CUSHION INFLATION MACHINE

CROSS REFERENCE TO RELATED APPLICATIONS

This application claims priority to and all benefit of U.S. Provisional Patent Application Ser. No. 62/741,102, filed on Oct. 4, 2018 and entitled AIR CUSHION INFLATION MACHINE, the entire disclosures of each of which are incorporated herein by reference.

INCORPORATION BY REFERENCE

This application incorporates by reference the entire disclosure of, to the extent it is not conflicting with the present application, U.S. Pat. No. 9,844,911, entitled AIR CUSHION INFLATION MACHINE, issued on Dec. 19, 2017.

BACKGROUND

The present invention relates to fluid filled units and more particularly to a novel and improved machine for converting a web of preformed pouches to sealed air filled units and will be described with particular reference thereto. It will be appreciated, however, that the invention is also amenable to other applications.

Machines for forming and filling dunnage units from sheets of plastic are known. Machines which produce dunnage units by inflating preformed pouches in a preformed web are also known. For many applications, machines which utilize preformed webs are used.

SUMMARY

An exemplary embodiment of a machine for converting two different types of webs of inflatable material to two different types of inflated cushioning material includes an inflation arrangement, a sealing arrangement, and a tensioning device. The inflation arrangement is configured to provide air at a lower pressure to a first web of a first type of inflatable material to inflate the first type of inflatable material, and to provide air at a higher pressure to a second type of inflatable material to inflate the second type of inflatable material. The inflation arrangement includes a guide pin configured to receive the first and second webs and align the first and second webs on the machine. The sealing arrangement is configured to seal the first type of inflatable material and the second type of inflatable material to create the two different types of inflated cushioning material. The tensioning device is configured to provide a lower tensioning force to the first web as the first web moves between the inflation arrangement and the sealing arrangement, and to provide a higher tensioning force to the second web as the second web moves between the inflation arrangement and the sealing arrangement.

Another exemplary embodiment of a machine for converting two different types of webs of inflatable material to two different types of inflated cushioning material includes an inflation arrangement, a sealing arrangement, and a tensioning device. The inflation arrangement is configured to provide air at a lower pressure to a first web of a first type of inflatable material to inflate the first type of inflatable material, and to provide air at a higher pressure to a second type of inflatable material to inflate the second type of inflatable material. The inflation arrangement includes a guide pin configured to receive the first and second webs and align the first and second webs on the machine. The sealing arrangement is configured to seal the first type of inflatable material and the second type of inflatable material to create the two different types of inflated cushioning material. The tensioning device is switchable between a first position and a second position, in which the tensioning device provides a lower tensioning force to the first web as the first web moves between the inflation arrangement and the sealing arrangement when the tensioning device is in the first position, and in which the tensioning device provides a higher tensioning force to the second web as the second web moves between the inflation arrangement and the sealing arrangement when the tensioning device is in the second position.

An exemplary method of converting two different types of webs of inflatable material to two different types of inflated cushioning material includes moving a first web of a first type of inflatable material along a path of travel and providing a lower air pressure to the first type of inflatable material. The method also includes applying a first tensioning force to the first web with a tensioning device and sealing the first web to form a first type of inflated cushioning material. In addition, the method includes moving a second web of a second type of inflatable material along the path of travel of the machine and providing a higher air pressure to the second type of inflatable material. The method also includes applying a second tensioning force to the second web with the tensioning device, in which the second tensioning force applied to the second web is greater than the first tensioning force applied to the first web. The method further includes sealing the second web to form a second type of inflated cushioning material.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIG. 1A is a top plan view of an exemplary embodiment of an air cushion inflation machine;

FIG. 1B is a view taken along lines 1B-1B in FIG. 1A;

FIG. 2 is a view similar to FIG. 1A with a web of air cushion material installed in the air cushion inflation machine;

FIG. 2A is a plan view of inflated and sealed air cushions;

FIG. 7B is a view similar to FIG. 7A illustrating routing of inflation cushion material into the machine;

FIG. 10 is a perspective view of a sealing assembly of the air cushion inflation machine shown in FIG. 4;

FIGS. 16A-16D illustrate an exemplary embodiment of a positioning assembly for positioning the sealing and clamping assemblies;

FIG. 17 is a sectional view taken along the plane indicated by lines 27-27 in

FIG. 15;

FIG. 20 is a sectional view taken along the plane indicated by lines 30-30 in

FIG. 18;

DETAILED DESCRIPTION OF ILLUSTRATED EMBODIMENTS

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members or elements.

Figure 1:
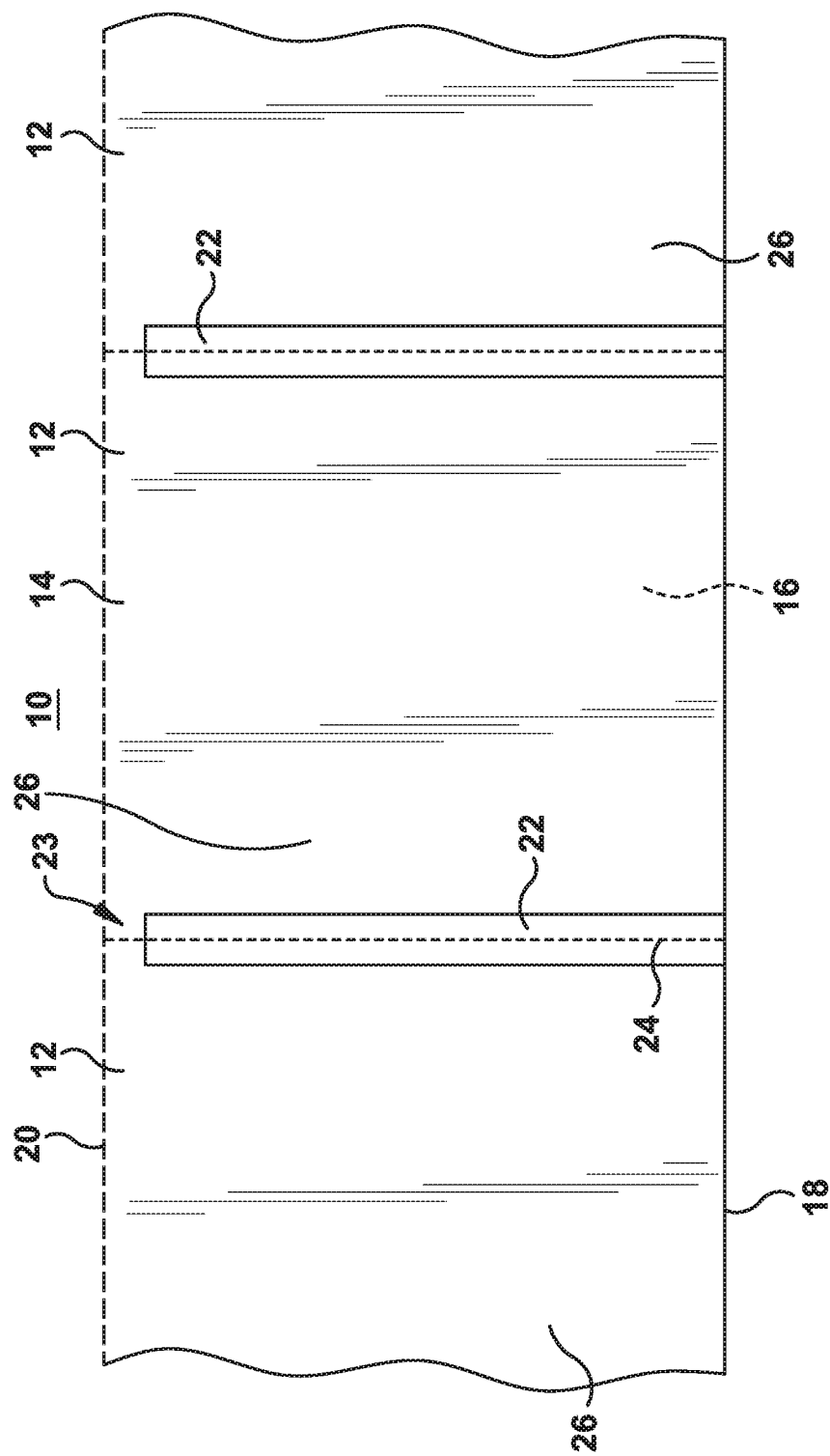
FIG. 1 is a plan view of an exemplary embodiment of air cushion material.

FIG. 1 illustrates an example of a preformed web 10 that can be processed by a machine 50 (See machine examples of FIGS. 1A, 3, and 4) to produce inflated air cushions 12 (See FIG. 2A) and/or air filled wrap material having a plurality of inflatable chambers. The preformed web can take a wide variety of different forms. Any preformed web that can be inflated, sealed and then separated from the machine 50 can be used. Examples of acceptable webs 10 include, but are not limited to, any of the webs shown and/or described by U.S. Pat. No. D633792; 7,897,220; 7,897,219; D630945; 7,767,288; 7,757,459; 7,718,028; 7,694,495; D603705; 7,571,584; D596031; 7,550,191; 7,125,463; 7,125,463; 6,889,739; or 7,975,457; or United States Patent Application Publn. Nos.: 20100281828A1; 20100221466A1; 20090293427A1; and 20090110864A1, which are all incorporated herein by reference in their entirety. It should be readily apparent that other preformed webs could be used in the machine 50 to produce dunnage units.

The illustrated web 10 is formed of a heat sealable plastic film, such as polyethylene. However, any heat sealable material can be used. The web 10 includes superposed top and bottom, elongate layers 14, 16 connected together along spaced seal and inflation side edges 18, 20. Each of the edges may be either a fold or a seal. The superposed layers 14, 16 are hermetically connected along the seal side edge 18. In the illustrated embodiment, the inflation side edge 20 is perforated. In another embodiment, the inflation side edge 20 is not perforated and a line of perforations is included in one of the layers 14, 16, with the line of perforations being spaced apart from and running parallel to the inflation side edge 20. In another embodiment, the inflation side edge 20 is not perforated and a line of perforations is included in each of the layers 14, 16, with the lines of perforations being spaced apart from and running parallel to the inflation side edge 20. In yet another embodiment, the layers 14, 16 are not connected together at the inflation side edge.

A plurality of longitudinally spaced, transverse seals 22 join the top and bottom layers 14, 16. Referring to FIGS. 1 and 2, the transverse seals 22 extend from the seal edge 18 to within a short distance of the inflation edge 20 to form pouches 26. An optional pocket 23 is formed between the transverse seals 22 and the inflation edge 20. A pocket is not formed if the inflation edges of the layers 14, 16 are not connected. A line of perforations 24 extends through the top and bottom layers. FIG. 2A illustrates a length of the web 10 after it has been inflated and sealed to form inflated cushions 12. An inflation seal 42, closes the pouches 26 defined by the transverse seals 22 and the seal side edge 18 to form the inflated cushions. The illustrated inflated cushions 12 include gaps G (see FIG. 2A) between each pair of adjacent cushions. A web 10 that is specially constructed to form the gaps G was used in the illustrated embodiment. In other embodiments, a web 10 may be used that does not form the illustrated gaps G (see FIG. 2A).

Figure 9:
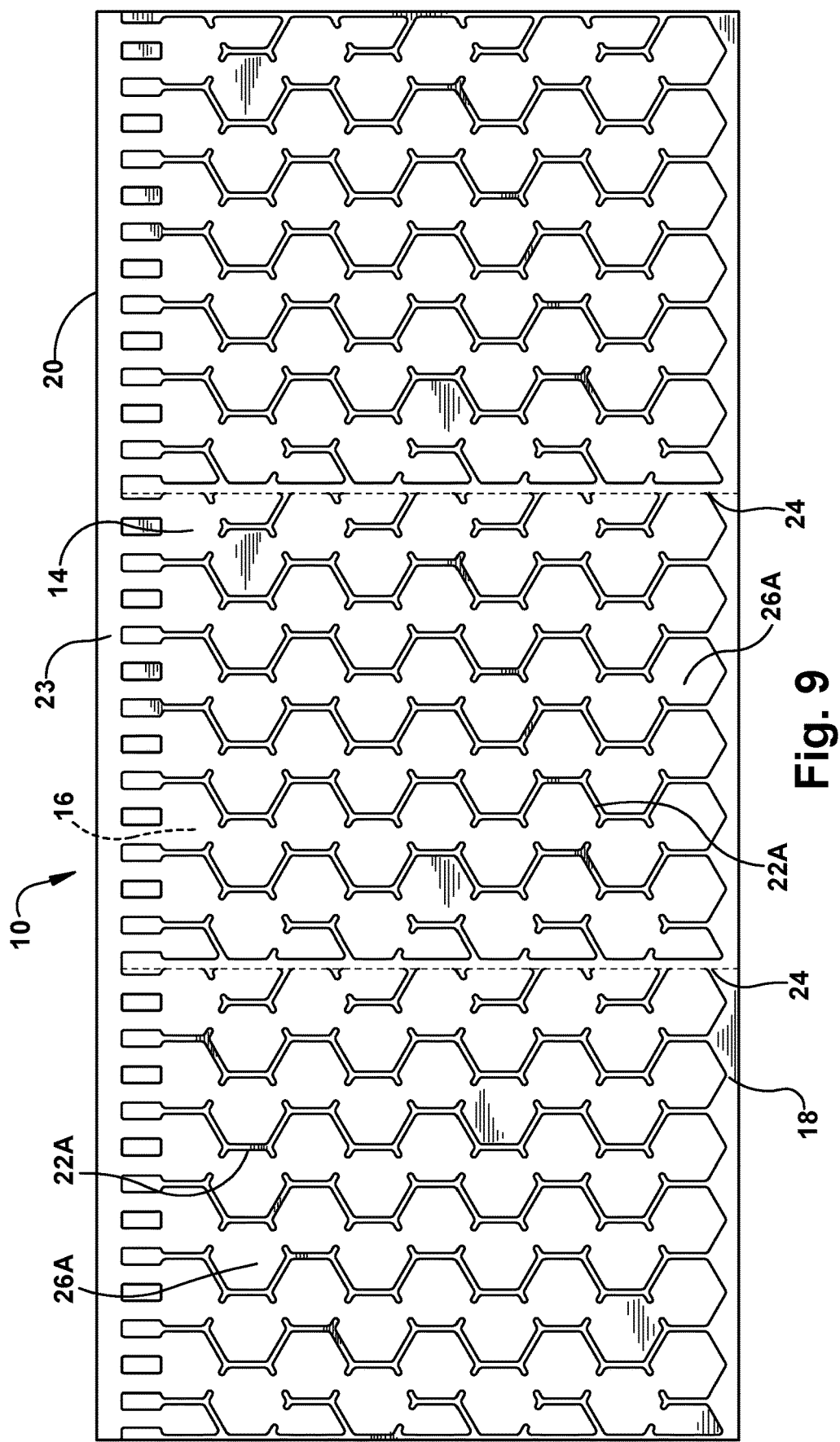
FIG. 9 illustrates an example an air wrap material.

FIG. 9 illustrates another embodiment of a heat sealable web 10. In the example illustrated by FIG. 9, the web 10 is inflated to form a wrap material having a plurality of inflated chambers, such as more than 5 inflated chambers, such as more than 10 inflated chambers, such as more than 15 inflated chambers, such as more than 20 inflated chambers, such as more than 30 inflated chambers, such as more than 40 inflated chambers, such as more than 50 inflated chambers. The wrap material can be used to wrap articles to be shipped in substantially the same manner as bubble wrap, but can be inflated and sealed on demand. The air pressure required to inflate the wrap material is typically much higher than the air pressure required to inflate the material illustrated by FIG. 1.

In the example illustrated by FIG. 9, the illustrated web 10 can be formed of a heat sealable plastic film, such as polyethylene. However, any heat sealable material can be used. The web 10 includes superposed top and bottom, elongate layers 14, 16 connected together along spaced seal and inflation side edges 18, 20. Each of the edges may be either a fold or a seal. The superposed layers 14, 16 are hermetically connected along the seal side edge 18. In the illustrated embodiment, the inflation side edge 20 is perforated. In another embodiment, the inflation side edge 20 is not perforated and a line of perforations is included in one of the layers 14, 16, with the line of perforations being spaced apart from and running parallel to the inflation side edge 20. In another embodiment, the inflation side edge 20 is not perforated and a line of perforations is included in each of the layers 14, 16, with the lines of perforations being spaced apart from and running parallel to the inflation side edge 20. In yet another embodiment, the layers 14, 16 are not connected together at the inflation side edge.

Still referring to FIG. 9, a plurality of longitudinally spaced, transverse seal patterns 22A join the top and bottom layers 14, 16. Referring to FIG. 9, the transverse seal patterns 22A extend from the seal edge 18 to within a short distance of the inflation edge 20 to form a pattern of inflatable chambers 26A. The transvers seal patterns 22A illustrated by FIG. 9 is one of the many different patterns that can be used. The illustrated seal patterns 22A form hexagonal shaped chambers 26A. However, any seal patterns 22A can form any chamber 26A shape. For example, the seal patterns 22A can form round or circular chambers, undulating chambers, square chambers, chambers with differing shapes and sizes, etc.

Figure 9A:
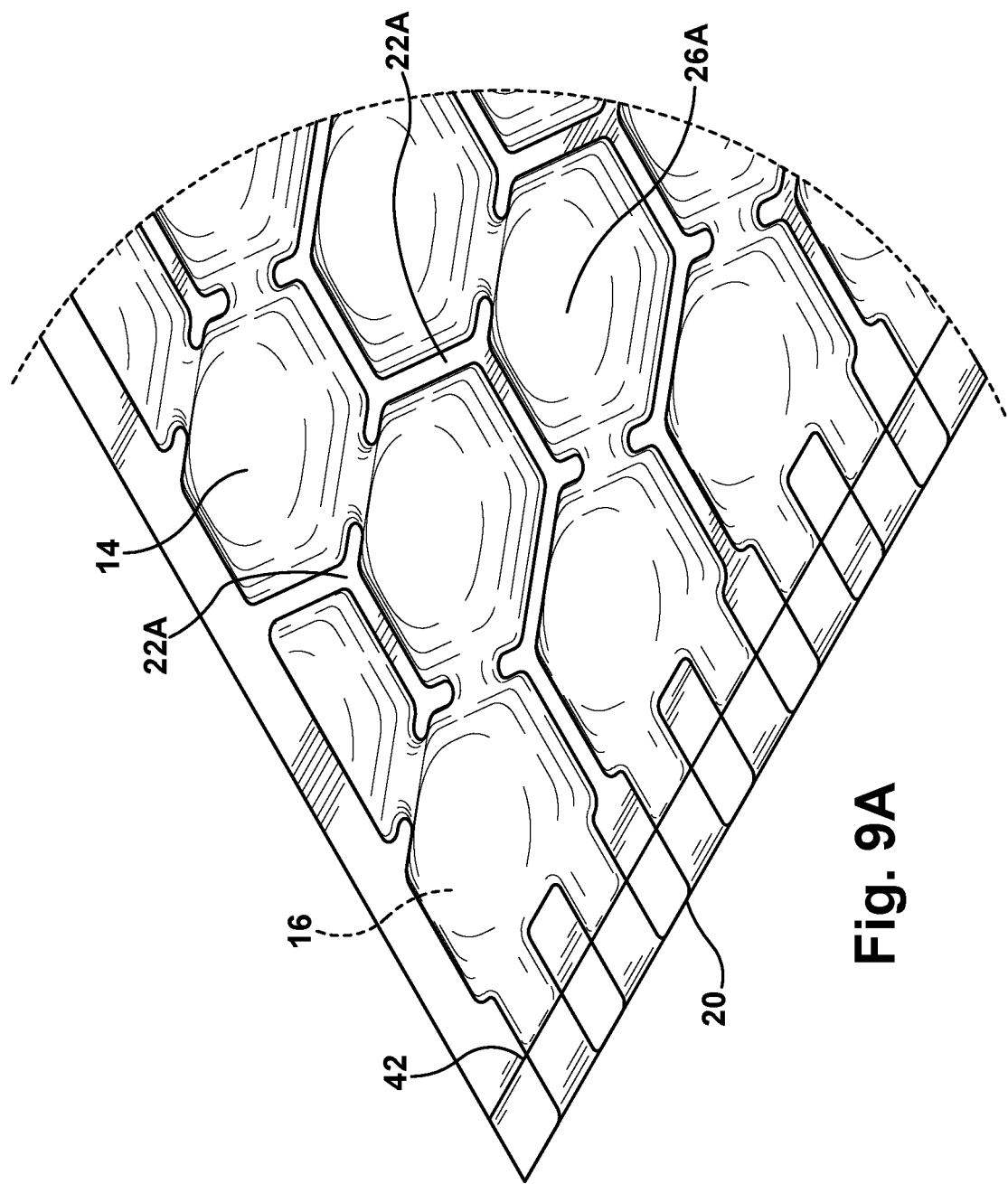
FIG. 9A illustrates a portion of the wrap material of FIG. 9 that has been inflated and sealed.

Still referring to FIG. 9, an optional pocket 23 is formed between the transverse seal pattern 22A and the inflation edge 20. A pocket is not formed if the inflation edges of the layers 14, 16 are not connected. A line of perforations 24 extends through the top and bottom layers. Referring to FIG. 9A, an inflation seal 42, closes the inflated chambers 26A defined by the transverse seals 22 and the seal side edge 18 to form the inflated cushions.

FIGS. 1A-1B and 2 schematically illustrate an exemplary embodiment of a machine 50 for converting a preformed web 10 (see FIG. 1) to inflated cushions 12 (see FIG. 2A). The machine 50 may take a wide variety of different forms and the inflation, sealing and separation arrangements described below may be in the order/positions described or in any other order/position that facilitates inflation of the web 10, sealing of the web, and separation of the web from the machine 50. In the example illustrated by FIGS. 1A-1B and 2, the machine 50 includes an inflation arrangement 160, a sealing arrangement 162, a clamping arrangement 110 optionally including a compliant material 112, and a web separation device 158. In one embodiment, the compliant material 112 is a silicone foam rubber, closed cell material having less than a Shore A hardness. The compliant material 112 may be coated with acrylic adhesive on both sides. In one embodiment, the compliant material 112 is usable up to about 390° F.

The inflation arrangement 160 can take a wide variety of different forms. Any arrangement capable of providing air under increased pressure (above atmosphere) to the pouches 26 or patterns 26A can be used. In the illustrated embodiment, the inflation arrangement 160 includes a hollow, longitudinally extending guide pin 56 and a blower 60.

Referring to FIG. 2, a web 10 is routed from a supply and the pocket 23 is placed around the guide pin 56, such that the guide pin 56 is between the inflation side edge 20 and the transverse seals 22. The guide pin 56 aligns the web as it is pulled through the machine 50. The guide pin 56 includes an inflation opening 102 that is fluidly connected to the blower 60 by a conduit 104. The blower 60 inflates the web pouches 26 as the web moves past the inflation opening 102.

In an exemplary embodiment, the inflation arrangement 160 also includes a blower control 106. The blower control 106 can take a wide variety of different forms. For example, the blower control 106 can be any arrangement that is operable to control the flow rate and/or pressure of air provided by the inflation arrangement 160 to the pouches 26. In one embodiment, the blower control 106 is a speed controller that controls the operation speed of the blower 60. Such a speed controller speeds the blower up to provide air at higher pressures and/or flow rates and reduces the blower speed to reduce the pressure and/or flow rate. In another embodiment, the blower control 106 comprises a flow control valve in the conduit 104 between the blower 60 and the inflation opening 102. The conduit 104 may be short as illustrated by FIG. 1B or long as illustrated by FIG. 1A. The conduit may optionally perform or be adapted to perform the function of the web separation device 158.

The sealing arrangement 162 forms the seal 42 (FIG. 2) to create sealed inflated cushions 12. The sealing arrangement 162 can take a wide variety of different forms. For example, the sealing arrangement 162 can be any arrangement capable of forming a hermetic seal between the layers 14, 16. Referring to FIG. 1B, the sealing arrangement 162 includes a heated sealing element 64, a temperature control arrangement 165, an assembly positioning device 66, the optional compliant material 112, a pair of drive rollers 68, a belt speed control 67, and a pair of drive belts 70. The belt speed control 67 electronically communicates with an encoder 80 to control the speed of the belts 68. For example, based on a feedback loop, the encoder can optionally determine the relative speeds of the belts 68. If the relative speeds of the belts 68 are not within a predetermined tolerance, the encoder 80 determines an error has occurred. In one embodiment, if the encoder 80 determines an error occurs, the encoder 80 causes the motors to stop the belts 68. Although the encoder 80 is illustrated as part of the belt speed control 67, it is to be understood that other embodiments in which the encoder 80 is separate from the belt speed control 67 are also contemplated.

In an alternate embodiment, a pair of cooling elements are optionally provided downstream of the heated sealing element 64. Each belt 70 is provided around its respective drive roller 68. Each belt 70 is driven by its respective drive roller 68. The speed of the drive rollers 68 and belts 70 are controlled by the belt speed control 67. The belts 70 are in close proximity or engage one another, such that the belts 70 pull the web 10 proximate to the heat sealing element 64. The seal 42 (see FIG. 2) is formed as the web 10 passes through the heated sealing elements 64.

The heating element 64 can take a wide variety of different forms. Any arrangement capable of raising the temperature of the layers 14 and/or 16 to a point where the layers will hermetically bond together can be used. For example, the heating element 64 may be a heating wire, ceramic element or other member that provides heat upon the application of power. For example, resistance of the heating element 64 causes the heating element 64 to heat up when voltage is applied across the heating element. In the illustrated embodiment, the heating element 64 is a heating wire having a length between about 1" to about 12". It is also contemplated that the heating element 64 is a substantially flat wire having a thickness of about 0.011".

The heating element 64 (wire) can optionally include at least one low resistance portion 82 and at least one high resistance portion 84. As illustrated in FIG. 1B, the heating element 64 (wire) includes two relatively lower resistance portions 82 and one relatively higher resistance portion 84. In one embodiment, the lower resistance portions 82 are copper or at least include a copper coating or other low resistance coating to provide for relatively high electrical conductivity and relatively low electrical resistance. The lower resistance portions 82 have substantially no electrical resistance, which results in substantially no heat or heat dissipation along those lower resistance portions 82. The higher resistance portion 84 includes a material that produces relatively low electrical conductivity and relatively high electrical resistance. Consequently, substantially all of the heat is dissipated along the relatively higher resistance portion 84 of the heating element 64.

In one embodiment, the higher resistance portion 84 is between about 1" long and about 9" long. In another embodiment, the higher resistance portion 84 is between about 2" long and about 8" long. In another embodiment, the higher resistance portion 84 is between about 3" long and about 7" long. In another embodiment, the higher resistance portion 84 is between about 4" long and about 6" long. In another embodiment, the higher resistance portion 84 is about 4.5" long. In the embodiment illustrated in FIG. 4, the lower resistance portion 82, which includes a copper coating, has a width 2010 of about 0.118" (3.0 mm), a length 2012 of about 7.165" (182 mm), and a thickness of about 0.006" (0.15 mm). The higher resistance portion 84, which does not include a copper coating, has a width 2014 of about 0.110" (2.8 mm) at a point "A", a length 2016 of about 4.84" (123 mm), and a thickness of about 0.006" (0.15 mm).

With reference again to FIG. 1B, the relatively shorter length of the optional higher resistance portion 82 can provide for greater control of the electrical resistance and temperature (e.g., ±1 degree, 2, 5 or 10 degrees). For example, in one exemplary embodiment the higher resistance portion is only provided in an area where the seal is being formed. This shorter, higher resistance, portion in only the area where the seal is being formed results in more consistent electrical resistance and temperature control than results over a longer high electrically resistive material that has portions outside the area where the seal is being formed. In addition, the relatively shorter length and more consistent electrical resistance of the higher resistance portion 84 results in faster temperature changes when electrical current is applied and removed from the heating element 64. The faster temperature changes along the heating element 64 are discussed in more detail below.

The assembly positioning device 66 is capable of moving the belt 70 associated with the compliant material 112 away from the belt 70 associated with the heating element 64. For example, the assembly positioning device 66 may cause the belt 70 associated with the optional compliant material 112 to move upward and away from the belt 70 associated with the heating element 64. At times, it is desirable to move the belt 70 associated with the optional compliant material 112 away from the belt 70 associated with the heating element 64 to position the web between the belts 70.

With further reference to FIG. 1B, in the illustrated embodiment the temperature control arrangement 165 is coupled to the heating element 64 to control the temperature of the heating element 64. In this embodiment, the temperature control arrangement 165 is coupled to the low resistance portion 82 of the heating element 64. However, other embodiments in which the temperature control arrangement 165 is coupled to the high resistance portion 84 of the heating element 64 are also contemplated.

The temperature control arrangement 165 may take a wide variety of different forms. Any arrangement capable of controlling the heating element 64 can be used. In one exemplary embodiment, the temperature control arrangement 165 includes a thermocouple. The thermocouple may be coupled to the heating element 64 in a variety of different ways. In one exemplary embodiment, the heating element 64 includes a ceramic member that is encapsulated with the thermocouple. The encapsulation of the ceramic member with the thermocouple provides for very accurate measurement of the temperature of the heating element 64. The temperature measured by the thermocouple is used to adjust the power (e.g., current, voltage, and/or duty cycle) applied to the heating element 64 and thereby control the temperature of the heating element 64.

In one exemplary embodiment, the current passing through the heating element 64 can optionally be used to determine the resistance of the heating element. The resistance of the heating element 64 is, in turn, used to determine the temperature of the heating element 64. For example, the resistance of the heating element 64 can be calculated based on the current passing through the heating element 64 and the voltage across the heating element. The voltage used in the calculation may be acquired in a wide variety of different ways. For example, the voltage used in the calculation may be the voltage applied by the power supply or the voltage may be directly measured by optional bypass leads 84a, 84b as illustrated by FIG. 1B. The current used in the calculation may be acquired in a wide variety of different ways. For example, the current used in the calculation may be measured using a Hall Effect sensor or a low resistance, high precision feedback resistor. In one embodiment, where the current is measured with a Hall Effect Sensor, the temperature control arrangement 165 is a solid state device including a Hall Effect sensor for measuring resistance on the heating element 64. In another embodiment the current is measured with a low resistance, high precision feedback resistor that is in series with the heating element. For example, the low resistance, high precision feedback resistor may be a 20 mΩ resistor.

In another exemplary embodiment, the current applied to the heating element is controlled or held constant and the voltage drop across the heating element 64 is used to determine the resistance of the heating element. The resistance of the heating element 64 is, in turn, used to determine the temperature of the heating element 64. For example, the resistance of the heating element 64 can be calculated based on the current passing through the heating element 64 and the voltage across the heating element. The voltage used in the calculation may be acquired in a wide variety of different ways. For example, the voltage used in the calculation may be the voltage applied by the power supply or the voltage may be directly measured by optional bypass leads 84a, 84b as illustrated by FIG. 1B. The current used in the calculation may be acquired in a wide variety of different ways. For example, the current used in the calculation may be a fixed current applied by the power supply. In this embodiment, the duty cycle of the current can be increased to increase the temperature of the heating element and the duty cycle of the current can be decreased to decrease the temperature of the heating element.

Figure 5:
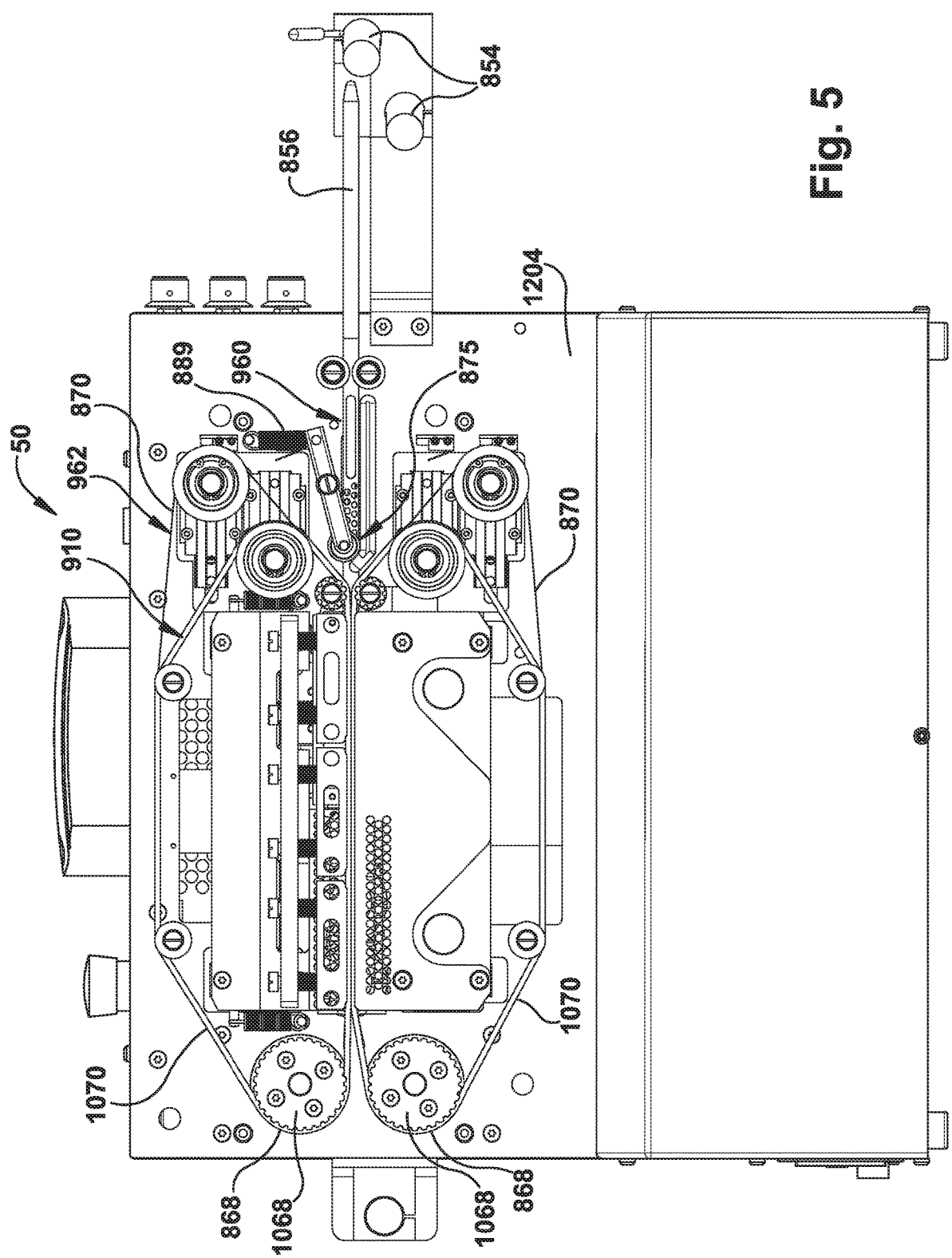
FIG. 5 is a side view of the air cushion inflation machine illustrated by FIG. 4.
Figure 6:
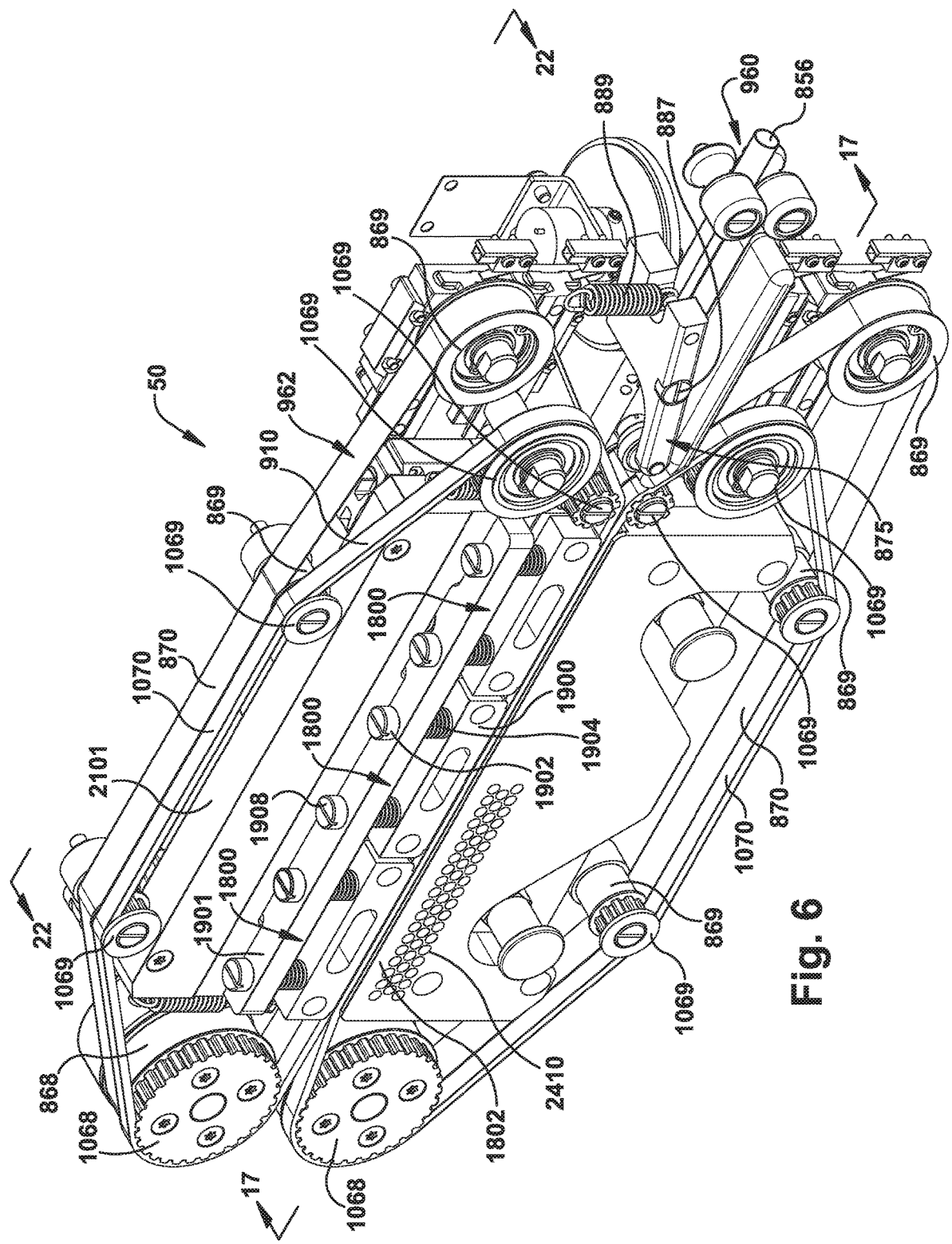
FIG. 6 is a perspective view of the sealing and clamp assemblies of the air cushion inflation machine shown in FIG. 4.

In one embodiment, direct current (DC) is optionally used to power the heating element 64. Powering the heating element 64 with direct current (DC), as opposed to alternating current (AC), permits the temperature control arrangement 165 to calculate resistance (i.e. as a function of current and voltage) in the heating element 64 (e.g., the high resistance portion 84 of the heating element 64). The temperature of the heating element 64 (e.g., high resistance portion 84 of the heating element 64) is determined (e.g., calculated or correlated) based on the calculated resistance. Determining the temperature of the heating element 64 based on the calculated resistance provides a relatively faster temperature response than if alternating current (AC) is used to power the heating element 64. In one embodiment, the DC power is cycled on and off according to a duty cycle to achieve a desired set point temperature of the high resistance portion 84 of the heating element 64. For example, with respect to FIG. 5, a voltage of the DC power is switched between zero (0) volts and 5.5 volts according to a duty cycle to achieve a desired temperature of the heating element 64. For example, the duty cycle is increased (i.e. more on time) to increase the temperature and the duty cycle is decreased (i.e. more off time) to decrease the temperature.

In another embodiment, a voltage of the DC power is controlled to a continuous (e.g., constant) voltage output between, for example, zero (0) volts and 5.5 volts to achieve the desired temperature of the heating element 64. For example, the DC voltage is increased to increase the temperature and the DC voltage is decreased to decrease the temperature.

Once the temperature control arrangement 165 determines the temperature of the heating element 64 (e.g., high resistance portion 84 of the heating element 64), the heating element 64 is capable of controlling the power supplied to the heating element 64 for achieving or maintaining a temperature of the high resistance portion 84 of the heating element 64 within a predetermined temperature range. For example, if the temperature of the high resistance portion 84 of the heating element 64 is above the predetermined temperature range, the temperature control arrangement 165 may cause the amount of direct current (DC) supplied to the heating element 64 to be reduced. Conversely, if the temperature of the high resistance portion 84 of the heating element 64 is below the predetermined temperature range, the temperature control arrangement 165 may cause the amount of direct current (DC) supplied to the heating element 64 to be increased.

FIG. 1B illustrates an exemplary embodiment of a clamping arrangement 110 including the optional compliant material 112. The clamping arrangement 110 is positioned to pinch the top and bottom layers 14, 16 of the preformed web 10 together. The clamping arrangement 110 inhibits air under pressure P (FIG. 2) in the inflated webs from applying force to the molten longitudinal seal 42. This prevents the air under pressure P from blowing the molten longitudinal seal 42 open and/or creating undesirable stresses that weaken the longitudinal seal.

The clamping arrangement 110 can take a wide variety of different forms. For example, the clamping arrangement 110 can be any arrangement capable of squeezing the layers 14, 16 in an area where the material of the layers is molten, soft or not yet completely solidified and cool. In the illustrated embodiment of FIG. 1B, the clamping arrangement 110 includes a pair of drive rollers 68, a pair of drive belts 70, the compliant material 112, and an optional assembly positioning device 66. Each belt 70 is disposed around its respective drive roller 68. Each belt 70 is driven by its respective drive roller 68. The drive rollers 68 may be coupled to the drive rollers 68 (see FIG. 1B) of the heat sealing belts 70 (see FIG. 1B) or the drive rollers 68 may be driven independently of the drive rollers 68 (see FIG. 1B). The belts 70 engage one another, such that the belts 70 pull the web 10 and pinch the web as the web passes by the heat sealing element 64 and the compliant material 112. Another exemplary clamping arrangement is disclosed by U.S. Pat. No. 7,571,584, which is incorporated herein by reference in its entirety.

In the illustrated embodiment, the optional compliant material 112 is on an opposite side of the belt 70 than the web 10. As the web passes by the heat sealing element 64 and the compliant material 112, the compliant material acts to keep substantially constant pressure on the web while the web passes by the heat sealing element 64. For example, the compliant material 112 is a material having a spongy and/or rubbery characteristic. Therefore, as the web passes by the compliant material 112, imperfections in the web (e.g., wrinkles) are reduced since the spongy and/or rubbery compliant material 112 can slightly deform as the imperfections pass by the compliant material 112. In other words, the "forgiving" nature of the compliant material 112 results in the substantially constant pressure on the web as the web passes by the heat sealing element 64. The substantially constant pressure on the web results in a better seal.

It is contemplated that the compliant material 112 is at least as long as the high resistance portion 84 of the heat sealing element 64. However, the compliant material 112 may be longer as illustrated, for example, at least twice or even three times, or more as long, as illustrated by FIG. 1B.

Referring to FIG. 2, the web separation device 158 can take a wide variety of different forms. For example, when the web 10 includes a line of perforations at or along the seal side edge 18, the web separation device 158 may be a blunt surface, when the inflation edge 20 is not perforated the separation device 158 may be a sharp knife edge, and when the layers 14, 16 are not connected together at the seal side edge the web separation device may be omitted. In the illustrated embodiment, the web separation device 158 is positioned along the path of travel of the web prior to the heat sealing element 64. The web separation device 158 is positioned prior to the heat sealing element 64 so that the web separation device opens the pocket 23 of the web at the same time or just before the pouches 26 are being sealed. However, the web separation device 158 can be positioned anywhere along the path of travel of the web. For example, the web separation device 158 can be positioned before the sealing arrangement 162, after the sealing arrangement, before the inflation opening 102, or after the inflation opening 102. The illustrated separation device 158 extends from the pin 56. However, the separation device 158 may be mounted to the machine 50 in any manner. The separation device 158 opens the web 10 at or near the inflation side edge 20 as the web moves through the machine 50.

In the exemplary embodiment, the machine optionally determines 520 whether the inflation arrangement 160 has already been ramped to the inflation speed or output after the sealing element has closed on the web 10. Once the sealing element 64 is closed on the web 10, the belt speed control 67 starts 524 the belts 70, 70 (see arrows in FIG. 8E) and the machine begins producing sealed and inflated cushions and moves on 525 to the run sequence.

Figure 1C:
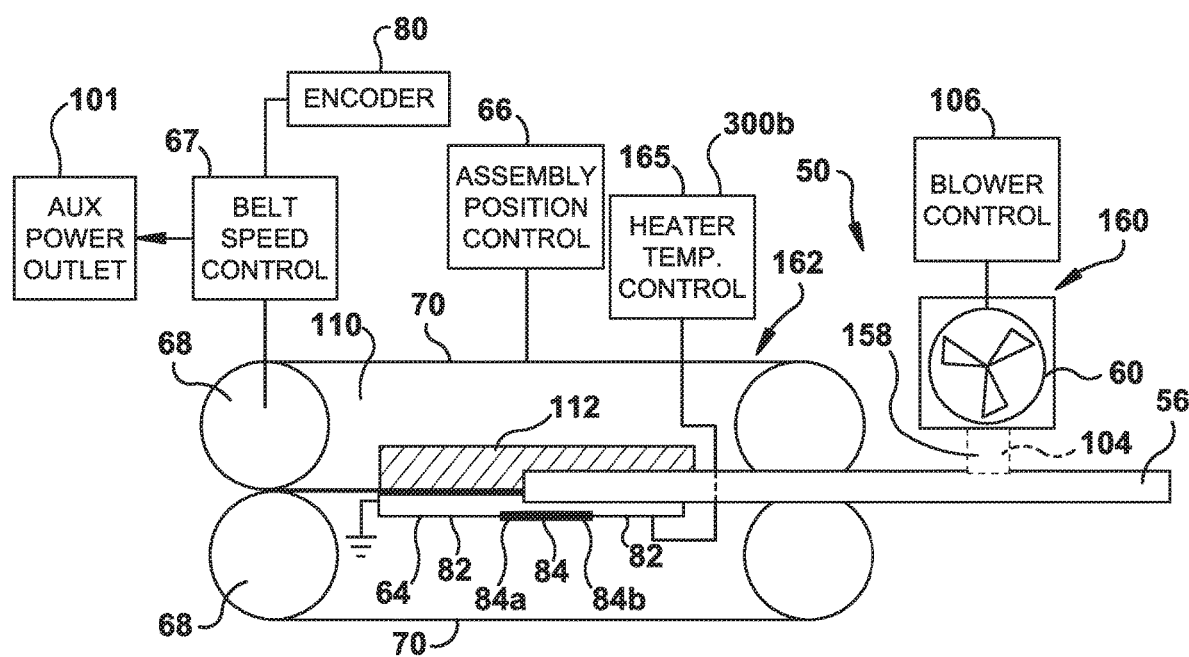
FIG. 1C is a view that is similar to the view of FIG. 1B where an auxiliary power outlet is controlled based on a speed of a sealing assembly.
Figure 3:
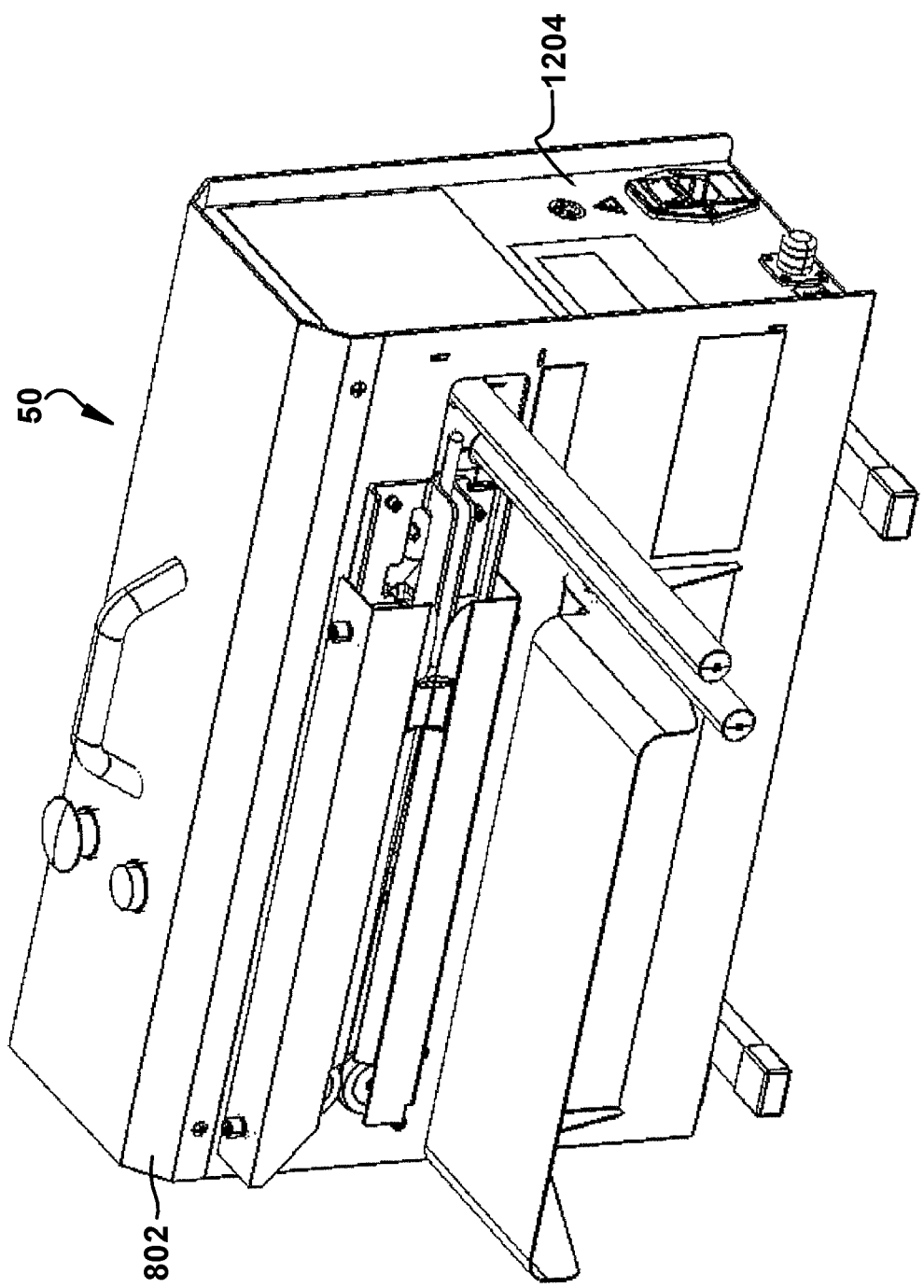
FIGS. 3, 3A, and 3B are perspective views of exemplary embodiments of an air cushion inflation machine.
Figure 3A:
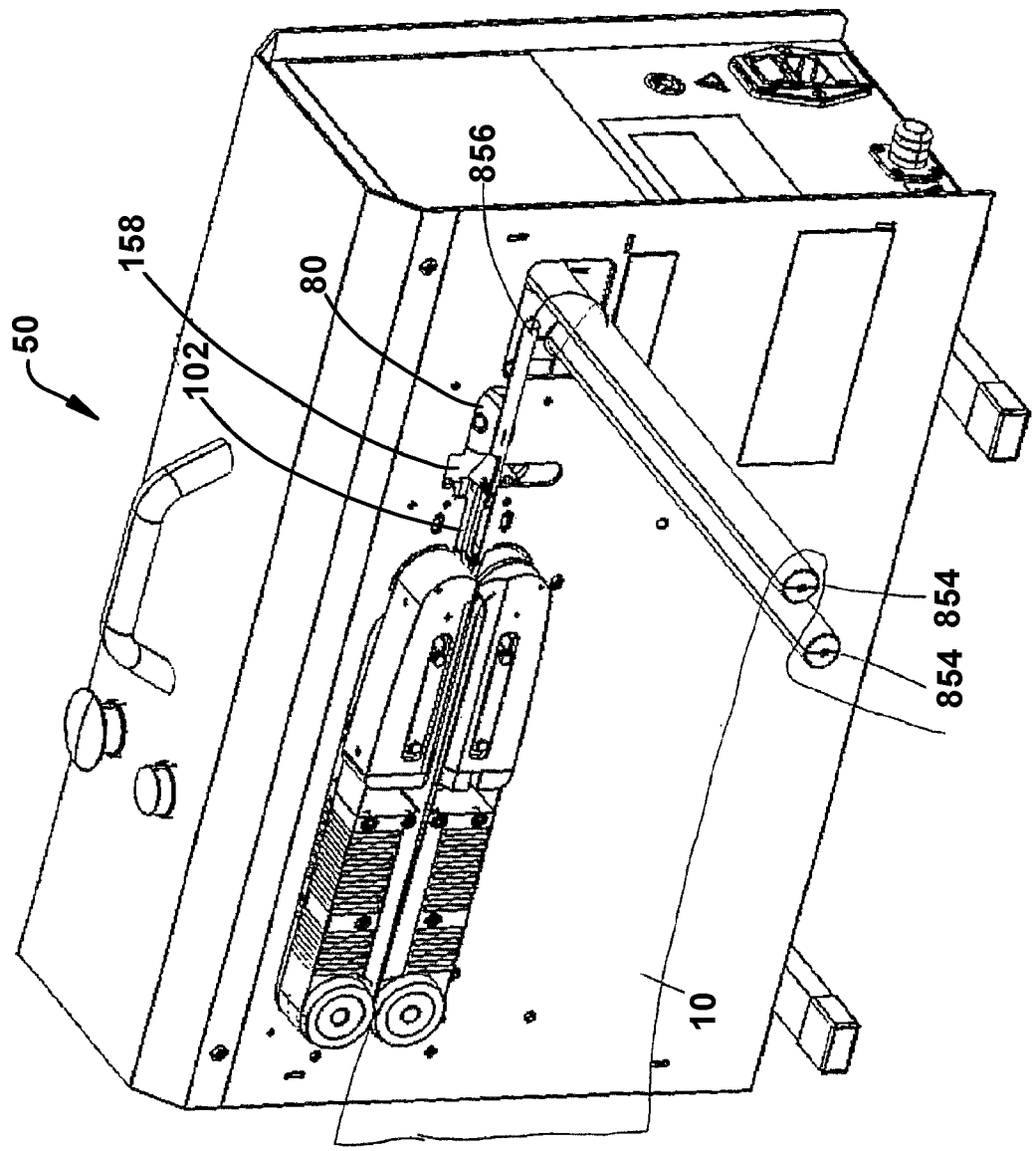

Referring to FIGS. 1C and 3A, in one exemplary embodiment an auxillary power outlet 101 is powered on and off based on a speed of one or more of the belts 70. For example, the power outlet can be turned on when the belts 70 are moving and turned off when the belts are stopped. The movement of the belts 70 can be detected in a wide variety of different ways. For example, the belt speed control 67 can communicate the speed to a controller that controls the auxiliary power outlet 101, a sensor can measure the speed of the belts, and/or a sensor can sense the speed of the drive roller 68. Any manner of determining the speed of the belts 70 can be used. In one exemplary embodiment, the auxiliary power outlet 101 is only turned on when the assembly position control 66 closes the belts and the belts are moving.

The auxillary power supply 101 can be used to power a wide variety of different accessories. For example, the auxiliary power supply can be used to power a an accessory that further processes the air filled pouches or patterns. For example, the auxillary power supply can be used to power a conveyor that transports the air filled material to a packaging station, a counter that counts the number of inflated units, and/or a separator that separates air filled units from one another. However, the auxiliary power supply 101 can be used to power any electrically powered device.

In one exemplary embodiment, control of the sealing arrangement 162, inflation arrangement 160, the drive rollers 68, and/or the auxiliary power supply 101 are interrelated. For example, the sealing arrangement 162, inflation arrangement 160, the auxiliary power supply 101 and/or the belt drive rollers 68 are controlled based on input from one or more of the temperature control arrangement 165, belt speed control 67 and/or the blower control 106. By interrelating the sealing arrangement 162, inflation arrangement 160, and/or the drive rollers 68, the air/pressure in the pouches and/or the quality of the inflation seal 41, may be precisely controlled.

In an exemplary embodiment, the belt speed may be controlled based on feedback from the encoder 80, the blower control 106 and/or the temperature control arrangement 165. If the temperature of the sealing element 64 is lower than a predetermined set point, the belt speed may be reduced to ensure that enough heat is applied to the web to form a high quality seal. Similarly, if the temperature of the sealing element 64 is higher than a predetermined set point, the belt speed may be increased to ensure that too much heat is not applied to the web and thereby ensure that a high quality seal is formed. If the output or speed of the inflation arrangement 160 is lower than a predetermined set point, the belt speed may be reduced to ensure that the pouches 26 are optimally filled. In an exemplary embodiment, the encoder 80, the blower output or speed and/or the heating element temperature 64 are continuously controlled to bring the blower output or speed and the heating element temperature to predetermined set points. The speed of the belts may be continuously updated based on the feedback from the blower control 106 and/or the temperature control arrangement 165 to optimize the seal quality and pouch filling, especially as the inflation arrangement and/or the sealing element are being ramped to their normal operating conditions.

In an exemplary embodiment, the temperature of the sealing element 64 may be controlled based on feedback from the encoder 80, the inflation control 106 and/or the belt speed control 67. If the belt speed is lower than a predetermined set point, the temperature of the sealing element 64 may be reduced to ensure that too much heat is not applied to the web and ensure that a high quality seal is formed. Similarly, if the belt speed is higher than a predetermined set point, the temperature of the sealing element 64 may be increased to ensure that enough heat is applied to the web and a high quality seal is formed. In an exemplary embodiment, the encoder 80, the blower output or speed and/or the belt speed control 67 are continuously controlled to bring the blower output or speed and the belt speed to predetermined set points. The temperature of the sealing element 64 may be continuously updated based on the feedback from the blower control 106 and/or the belt speed to optimize the seal quality and pouch filling, especially as the inflation arrangement and/or the belt speed are being ramped to their normal operating conditions.

In an exemplary embodiment, the inflation arrangement 160 may be controlled based on feedback from the encoder 80, the belt speed control 67 and/or the temperature control arrangement 165. If the temperature of the sealing element 64 is lower than a predetermined set point, the blower output or speed may be changed to ensure proper inflation and sealing of the air filled cushions. If the belt speed is lower than a predetermined set point, the blower output or speed may be changed to ensure proper inflation and sealing of the air filled cushions. In an exemplary embodiment, the belt speed and/or the heating element temperature are continuously controlled to bring the belt speed and/or the heating element temperature to predetermined set points. The blower speed or output may be continuously updated based on the feedback from the encoder 80, the drive roller control 67 and/or the temperature control arrangement 165 to optimize the seal quality and pouch filling, especially as the belt speed and/or the sealing temperature are being ramped to their normal operating conditions.

In one exemplary embodiment, the temperature of the sealing arrangement 162 is independent of feedback from inflation control and belt control. In this embodiment, belt speed may be controlled based solely on feedback from the sealing arrangement 162. Similarly, in this embodiment, the inflation arrangement 162 may be controlled based solely on feedback from the sealing arrangement 162. In an exemplary embodiment, the machine 50 is programmed with a control loop that brings the sealing arrangement 162 to a temperature set point and to hold the temperature at the set point. During execution of this control loop, the current temperature of the sealing arrangement is monitored and is used to control the belt speed and inflation arrangement 162.

The machine 50 may take a wide variety of different forms. FIGS. 3, 3A, and 3B and FIGS. 4-7 illustrate two non-limiting, exemplary embodiments of the machine 50 in detail. In the example illustrated by FIGS. 3, 3A, and 3B, the machine 50 includes an inflation arrangement 102, and a sealing arrangement 110. FIG. 3 illustrates the machine 50 with a cover 802 disposed over the sealing arrangement 110. FIG. 3A illustrate the machine 50 with the cover removed.

Figure 3B:
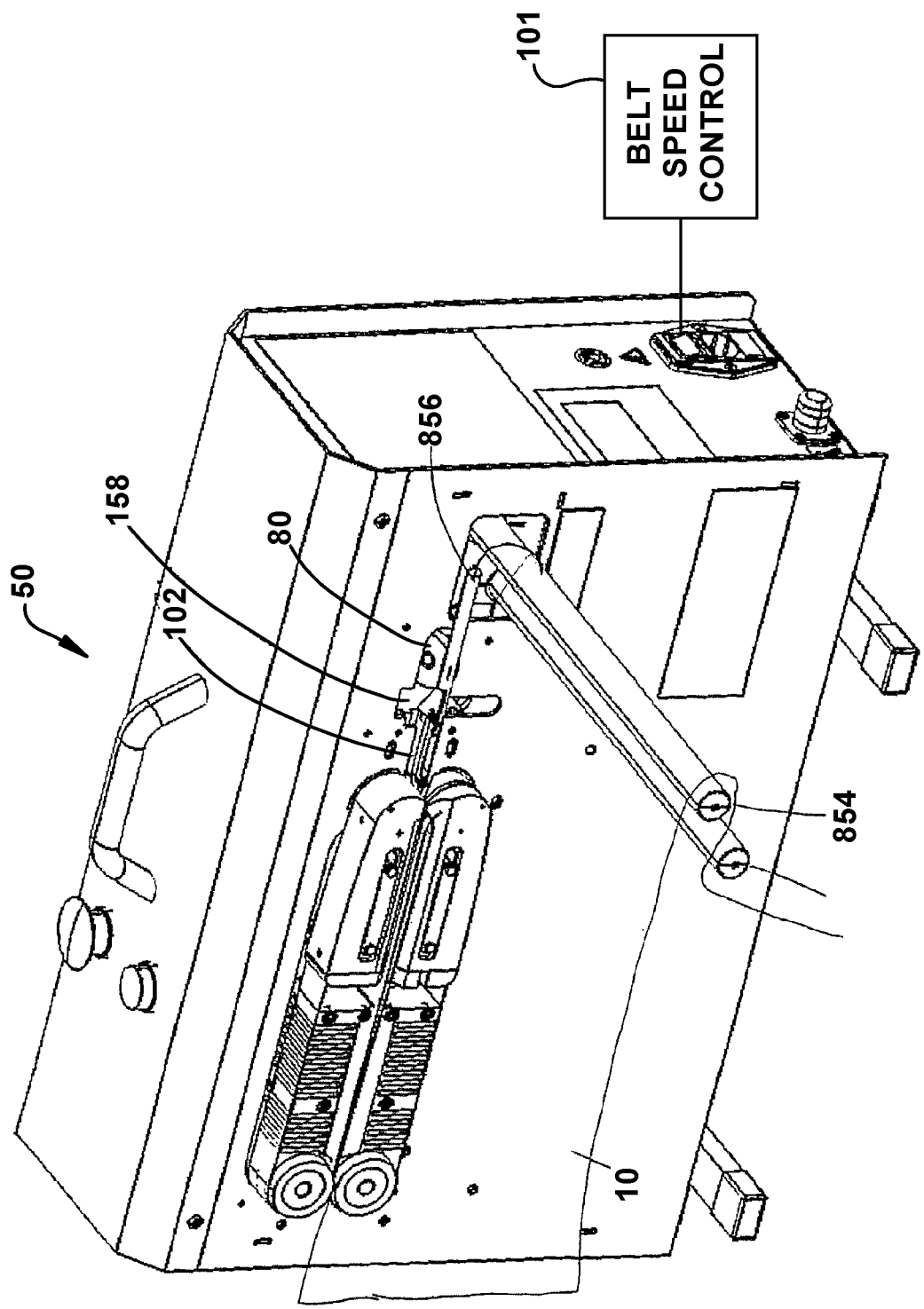

Referring to FIGS. 3, 3A, and 3B, the web 10 is routed from a supply to and around a pair of elongated, transversely extending guide rolls 854. The web 10 is then routed to a longitudinally extending guide pin 856. The guide pin 856 is disposed between the inflation edge 20 and the transverse seals 22 of the web 10. The guide pin 856 aligns the web as it is pulled through the machine. With reference to FIG. 3A, the web 10 passes from the guide rolls 854 to the pin 856 and the separation device 158 before passing into the sealing and clamping arrangement 110.

FIGS. 4, 5, 6, 7, 7A, 7B, and 10-20 illustrate a second non-limiting, exemplary embodiment of an inflation machine 50 in detail. In the example illustrated by FIGS. 4, 15, 16, 7, 7A, 7B, and 10-20, the machine 50 includes an inflation arrangement 960 (see FIG. 7), a sealing arrangement 962 (see FIG. 10), a clamping arrangement 910, and a web tensioning device 875 (see FIG. 7).

Figure 4:
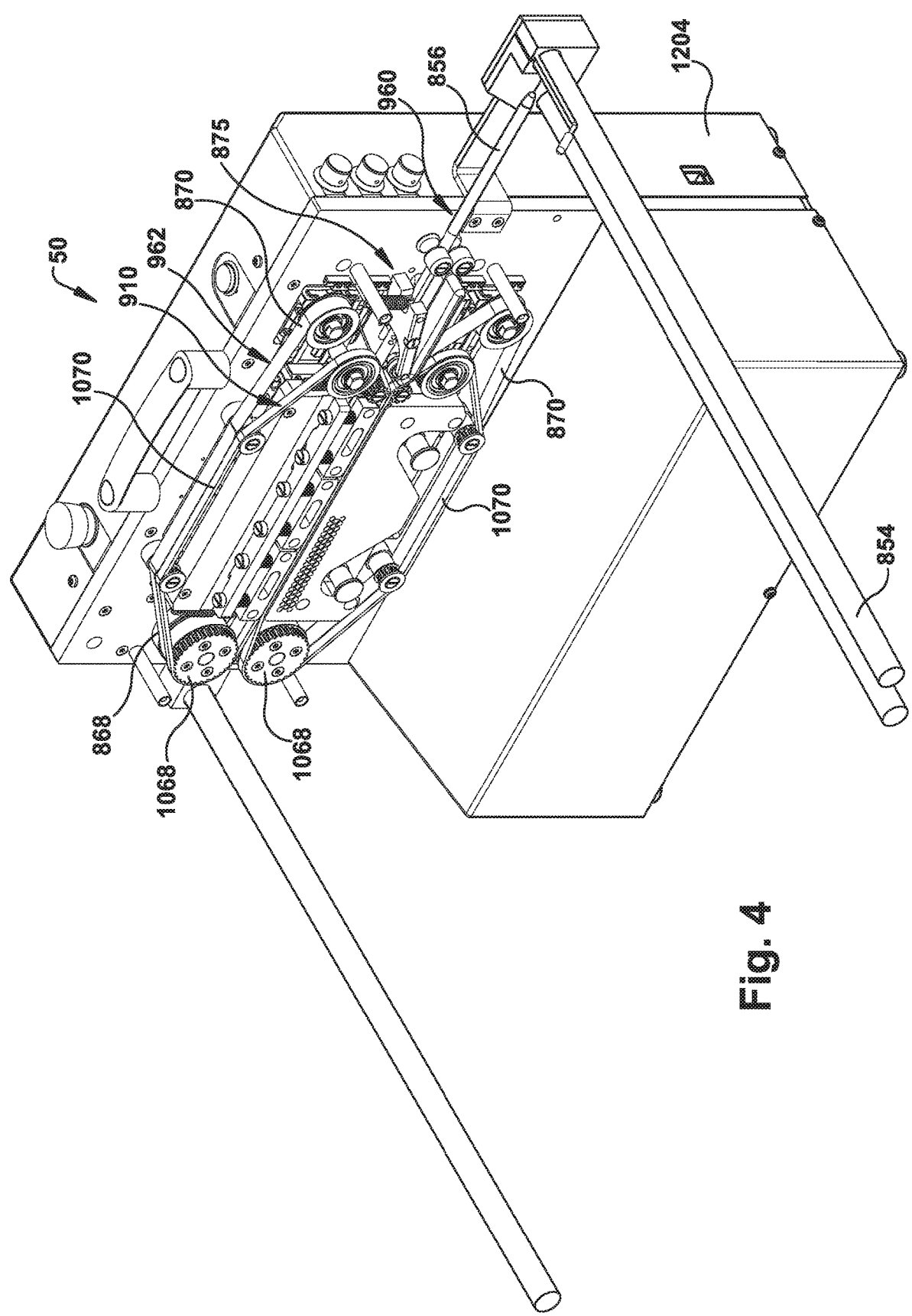
FIG. 4 is a perspective view of a dual belt air cushion inflation machine, such as the air cushion inflation machine illustrated by FIGS. 7B and 7C.

Referring to FIG. 4, the web 10 is routed from a supply to and around a pair of elongated, transversely extending guide rollers 854. The web 10 is then routed to a longitudinally extending guide pin 856. The guide pin 856 is disposed between the inflation edge 20 and the transverse seals 22 of the web 10. The guide pin 856 aligns the web as it is pulled through the machine. The web 10 is routed along the guide pin 856 through the web tensioning device 875.

Figure 7:
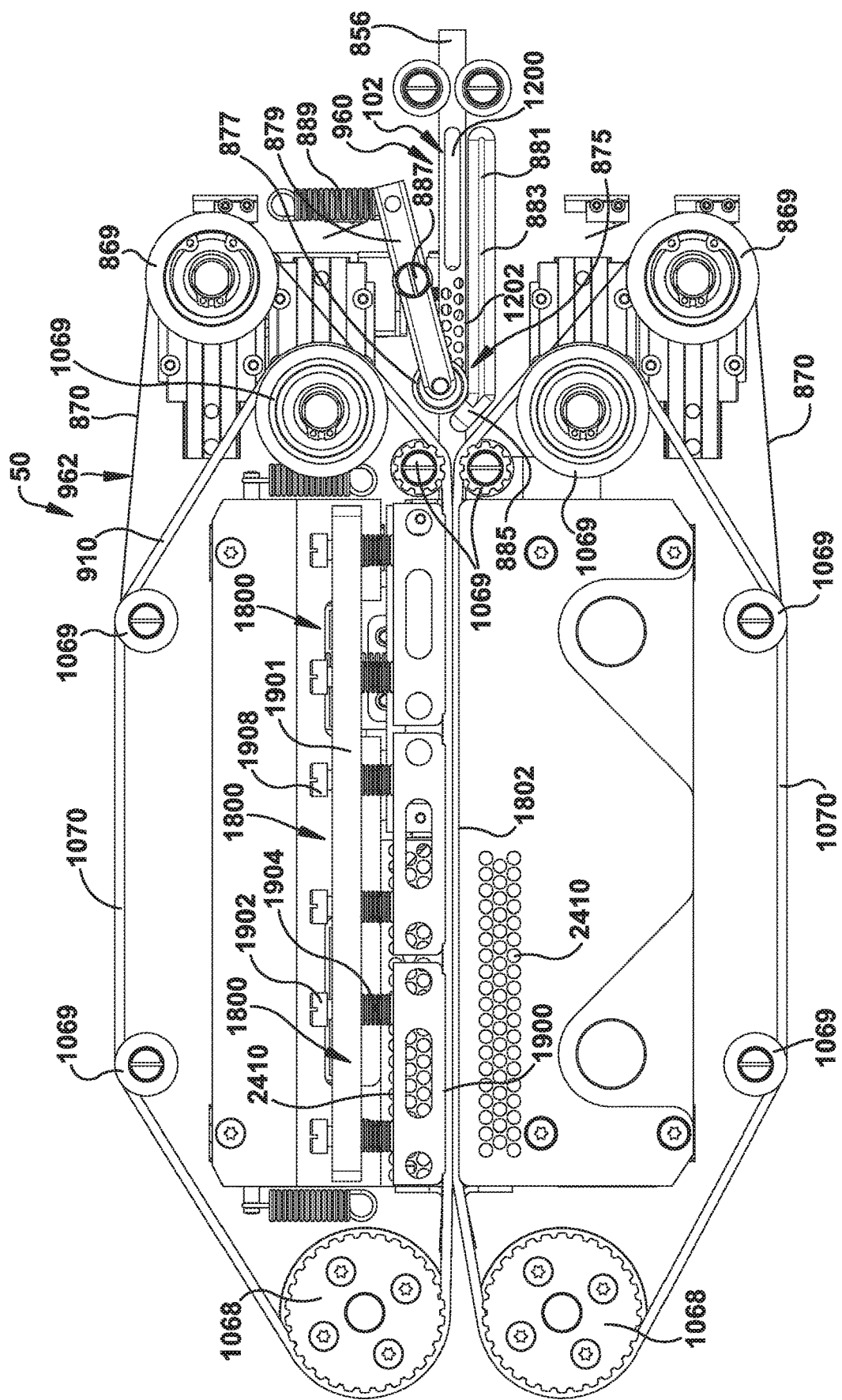
FIG. 7 is a view taken as indicated by lines 22-22 in FIG. 6.
Figure 7A:
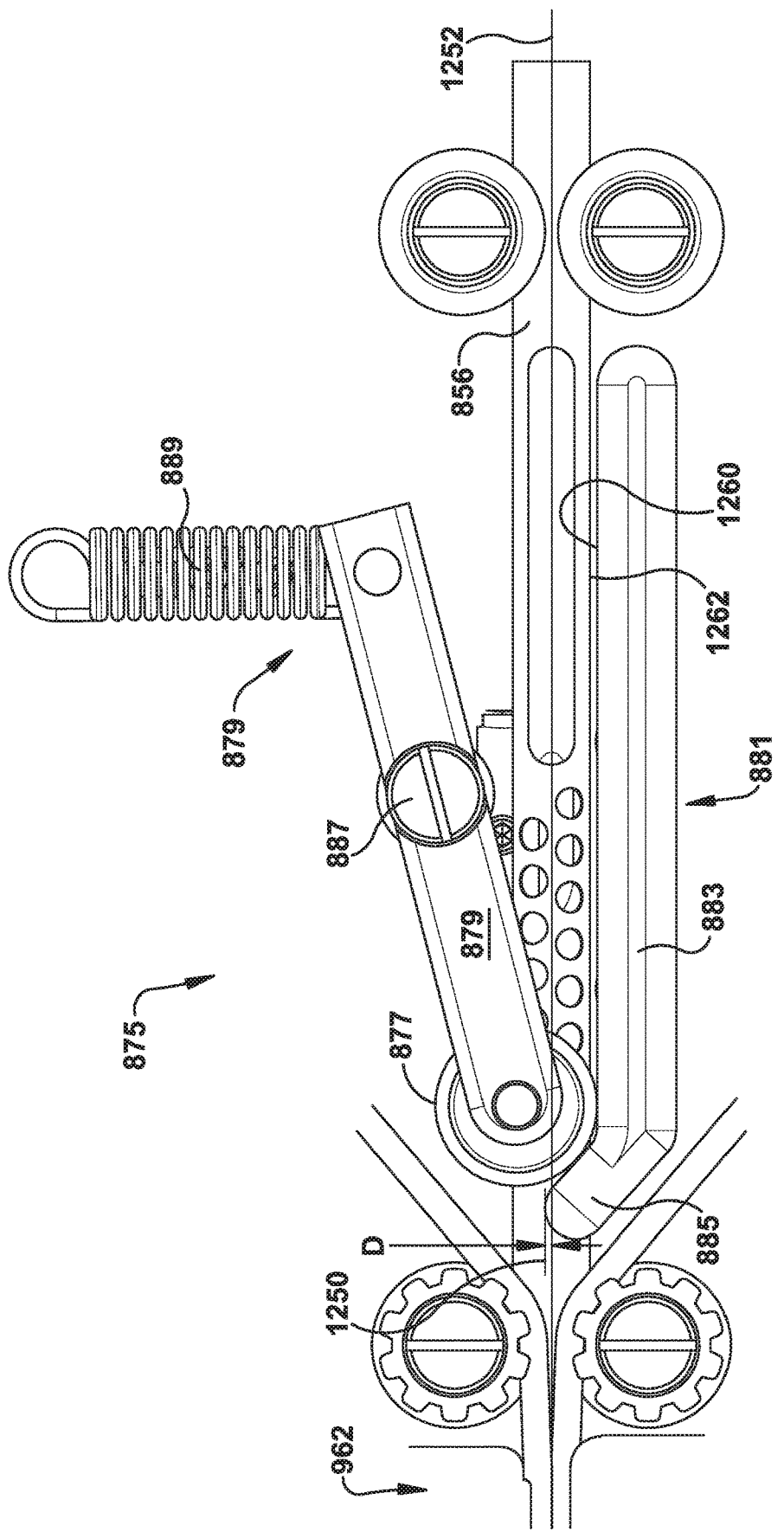
FIG. 7A is an enlarged portion of FIG. 7.

The tensioning device 875 keeps the web 10 (see FIG. 7B) taught as the web is pulled through the machine 50 (see FIG. 7). Keeping the web taught in the sealing arrangement 962 prevents wrinkles from forming in the seal 23. The tensioning device can take a wide variety of different forms. Any arrangement that applies tension to the web 10 can be used. Referring to FIGS. 7A and 7B, in the illustrated embodiment the tensioning device 875 includes a roller 877, a spring loaded pivot arm 879, and a shelf member 881. The shelf member 881 is fixed with respect to the path of travel of the web 10. The illustrated shelf member 881 includes a substantially horizontal portion 883 and an upwardly extending portion 885 that extends upward at an obtuse angle from the substantially horizontal portion 883.

The substantially horizontal portion 883 and the upwardly extending portion 885 can take a variety of different forms. In FIG. 7A, a centerline 1252 (the midpoint between the top and the bottom) of the guide pin 856 is depicted. In an exemplary embodiment, an upper surface 1260 of the substantially horizontal portion 883 is lower than the centerline 1252. In the example illustrated by FIG. 7A, an upper surface 1260 of the substantially horizontal portion 883 is lower than a bottom 1262 of the guide pin 856. In FIG. 7A, a horizontal line 1250 that is tangent to the top or uppermost surface of the upwardly extending portion 885 is depicted. In an exemplary embodiment, the top or uppermost surface 1250 is positioned to keep the pocket 23 taught against the guide pin 856, but not so taught that the perforations of the optional pocket 23 break. By pulling the pocket 23 of the web 10 taught against the guide pin 856, wrinkles in the web are eliminated as the web passes through the sealing arrangement 162. In one exemplary embodiment, the uppermost surface 1250 is positioned at or above the centerline 1252 of the guide pin 856. For example, the uppermost surface 1250 may be positioned at a distance D above the centerline. The distance D may be less than or equal to 0.250 inches, less than or equal to 0.218 inches, less than or equal to 0.187 inches, less than or equal to 0.156 inches, less than or equal to 0.125 inches, less than or equal to 0.093 inches, less than or equal to 0.062 inches, or less than or equal to 0.031 inches.

Referring to FIG. 7B, the pivot arm 879 is pivotally mounted to the machine 50 at a pivot 887. A spring 889 is attached to a first end of the pivot arm and to the machine 50. The roller 877 is rotatably attached to the second end of the pivot arm 879. The spring 889 forces the roller 877 against the shelf member 881 at the intersection of the substantially horizontal portion 883 and the upwardly extending portion 885. It should be readily apparent that the roller 877, the pivot arm 879 and/or the spring 889 can be replaced with any arrangement that frictionally engages the web. The frictional force is selected to keep the web 10 taught as the web passes through the sealing arrangement 162, but the frictional force is not great enough to cause the web 10 to tear. In one exemplary embodiment, the force applied between the roller 877 and the shelf 881 is between 5 lbs and 10 lbs, such as about 7 lbs or 7 lbs. The width of the contact area between the roller 877 and the shelf member 881 also influences the frictional force applied to the web 10. In one exemplary embodiment, the width of the contact area between the roller 877 and the shelf member 881 is between 0.062 and 0.375 inches, between 0.093 and 0.250 inches, between 0.125 and 0.187 inches, about 0.140 inches, or 0.140 inches.

Referring to FIG. 7B, the web 10 is routed between the roller 877 and the shelf member 881 such that the roller and the shelf member frictionally engage the layers 14, 16 of the web 10. The web 10 passes under the roller 877, up and over the upwardly extending portion 885 of the shelf member, and then into the sealing arrangement 962. The friction between the web 10, the roller 877, and the shelf member 881 keeps the web taught as the web is pulled through the sealing arrangement 962.

Figure 8A:
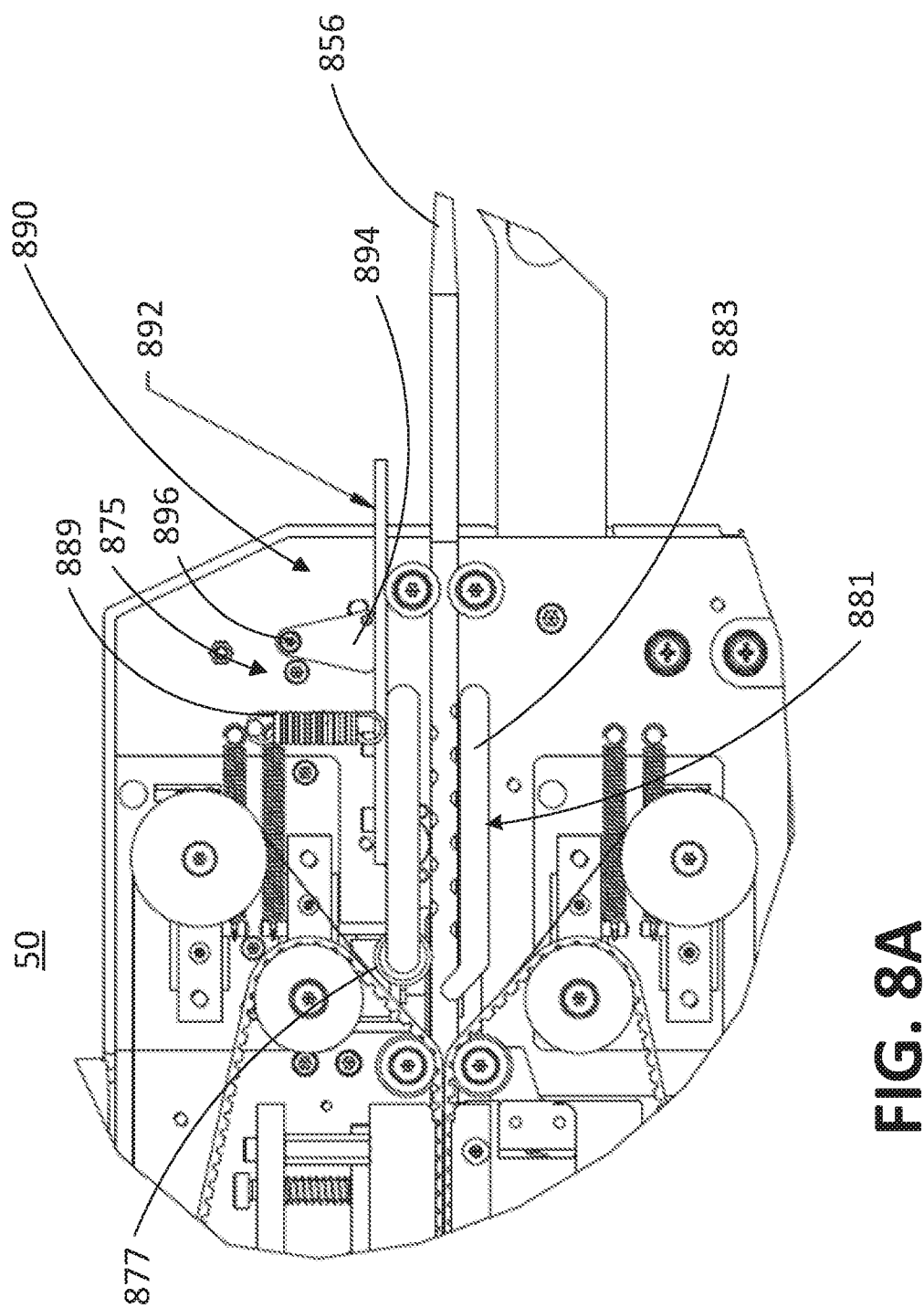
FIG. 8A is a side view of a selectable tensioning device in a low tension position.
Figure 8B:
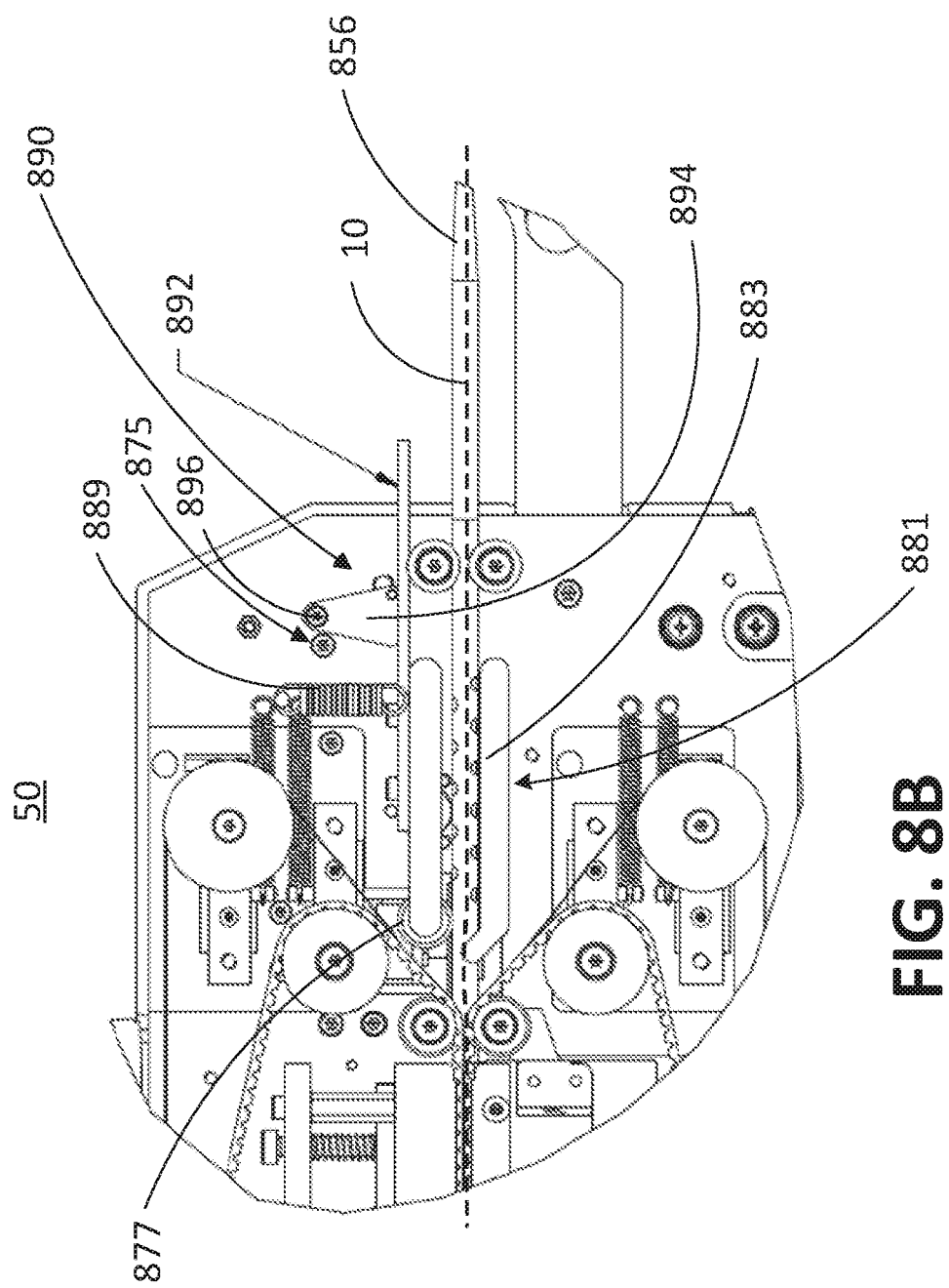
FIG. 8B is a view similar to FIG. 8A that illustrates routing of air pillow material through the tensioning device.
Figure 8C:
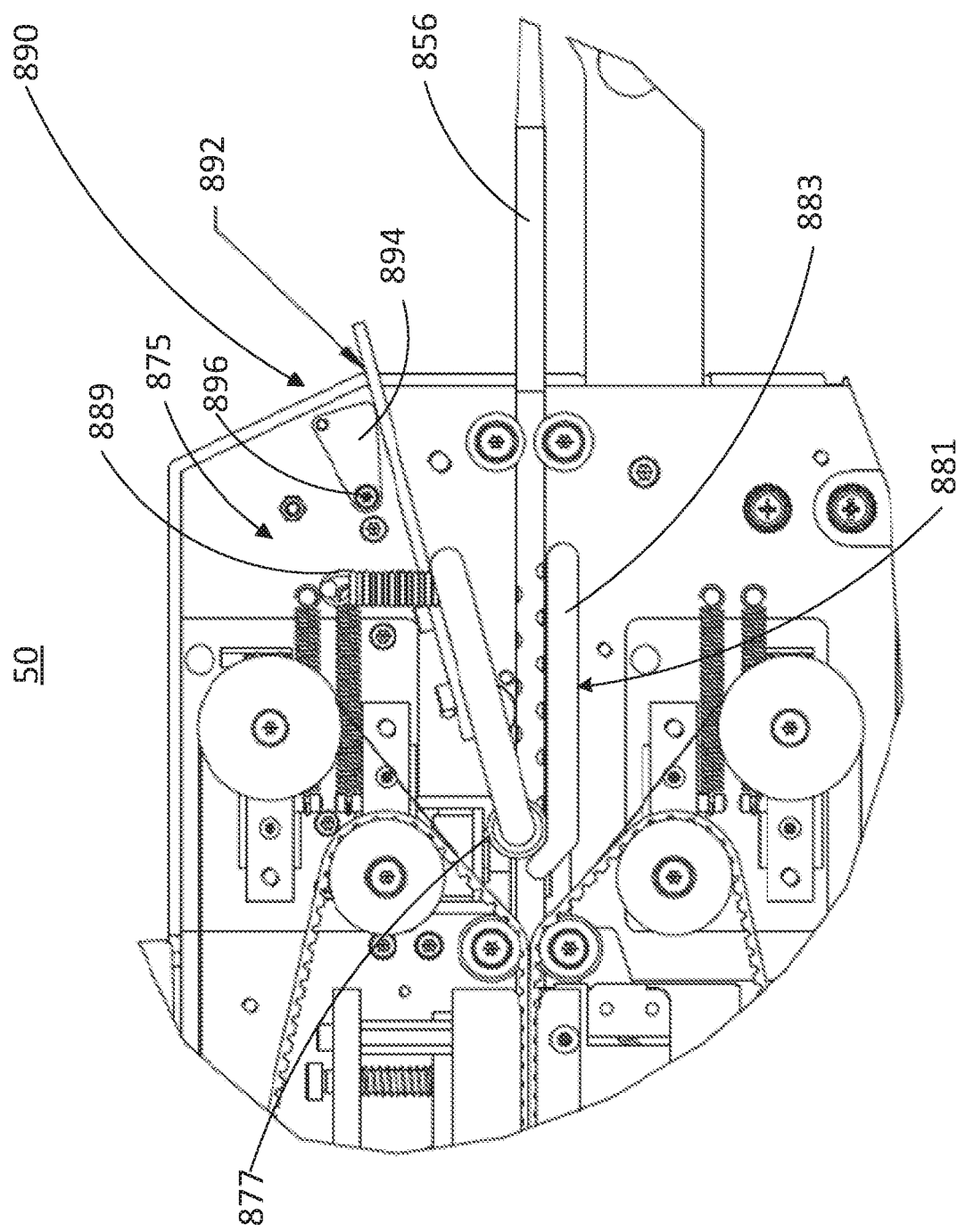
FIG. 8C is a side view of a selectable tensioning device in a high tension position.
Figure 8D:
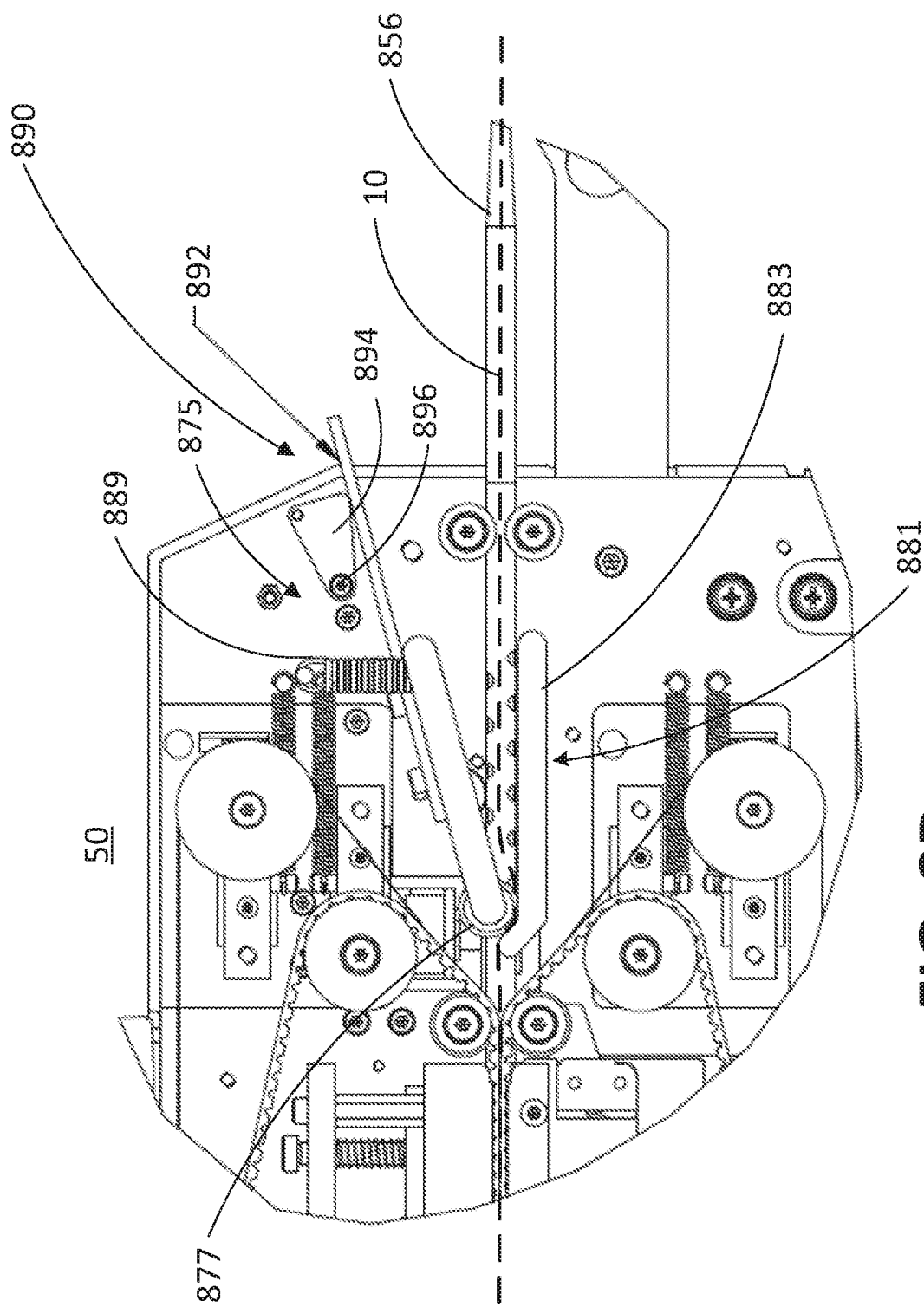
FIG. 8D is a view similar to FIG. 8C that illustrates routing of air wrap material through the tensioning device.

Referring to FIGS. 8A-8D, in one exemplary embodiment, the tensioning device 875 is switchable between a low tension position (FIGS. 8A and 8B) and a higher tension position (FIGS. 8C and 8D). In one exemplary embodiment, the tensioning device 875 is switched to the low tension position when the inflation machine 50 is applies a lower pressure. For example, the inflation machine 50 can apply a lower pressure to the web 10 illustrated by FIG. 1. Referring to FIG. 8A, the roller 877 and the horizontal portion 883 of the shelf 881 are spaced apart from one another in the low tension position. Referring to FIG. 8B, since the roller 877 and the horizontal portion 883 of the shelf 881 are spaced apart, the roller 877 and the shelf do not substantially engage the web and do not apply significant tension to the web 10.

In one exemplary embodiment, the tensioning device 875 is switched to the high tension position when the inflation machine 50 is applies a higher pressure. The increased tension in the web 10 helps to prevent the web from wrinkling in the seal area. For example, the inflation machine 50 can apply a higher pressure to the web 10 illustrated by FIGS. 9 and 9A. Referring to FIG. 8C, the roller 877 and the horizontal portion 883 of the shelf 881 are biased together by the spring 889 in the high tension position. Referring to FIG. 8D, since the roller 877 and the horizontal portion 883 of the shelf 881 are biased together, the roller 877 and the shelf 881 engage the web and apply tension to the web 10.

The ratio of the pressure applied by the machine 50 to inflate the material illustrated by FIGS. 9 and 9A to the pressure (psi) applied by the machine 50 to inflate the material illustrated by FIG. 1 can be at least 5/4, at least 3/2, at least 2/1, at least 3/1, at least 4/1, at least 5/1, at least 7/1, or at least 10/1.

The tensioning device 875 can be switchable between the low tension position (FIGS. 8A and 8B) and higher tension position (FIGS. 8C and 8D) in a wide variety of different ways. Any arrangement for selectively holding the tensioning device 875 in the low tension position (and/or the high tension position) can be used. For example, latches, springs, levers, detents, magnets, etc. can be used to hold the tensioning device 875 in the low tension position (and/or the high tension position).

Referring to FIG. 8A, in the illustrated embodiment the tensioning device 875 is selectively held in the low tension position by a stop arrangement 890. The stop arrangement 890 can take a wide variety of different forms. In the illustrated example, the stop arrangement 890 comprises an arm 892 and a movable stop 894. The arm 892 can take a wide variety of different forms. In the illustrated example, the arm 892 is fixed to and extends from the shelf 881. In other embodiments, the arm 892 can be an integral extension of the shelf. The movable stop 894 can take a wide variety of different forms. In the illustrated example, the movable stop 894 is movably coupled to a frame of the inflation machine 50. The moveable stop 894 is movable between a stop position (FIGS. 8A and 8B) and a release position (FIGS. 8C and 8D). The moveable stop 894 can be coupled to the frame of the machine 50 in a wide variety of different ways to allow the stop 894 to be moved between the stop position and the release position. For example, the stop 894 can be pivotally coupled to the machine 50, slidably coupled to the machine, etc. In the illustrated embodiment, the moveable stop 894 is pivotably connected to the machine 50 at a pivot axis 896. In the position illustrated by FIGS. 8A and 8B, the moveable stop 894 engages the arm 892 to prevent the tensioning device 875 from moving to the engaged or tensioning position. When pivoted to the position illustrated by FIGS. 8C and 8D, the moveable stop 894 allows the arm 892 to move upward to allow the tensioning device 875 to move to the engaged or tensioning position.

Figure 21:
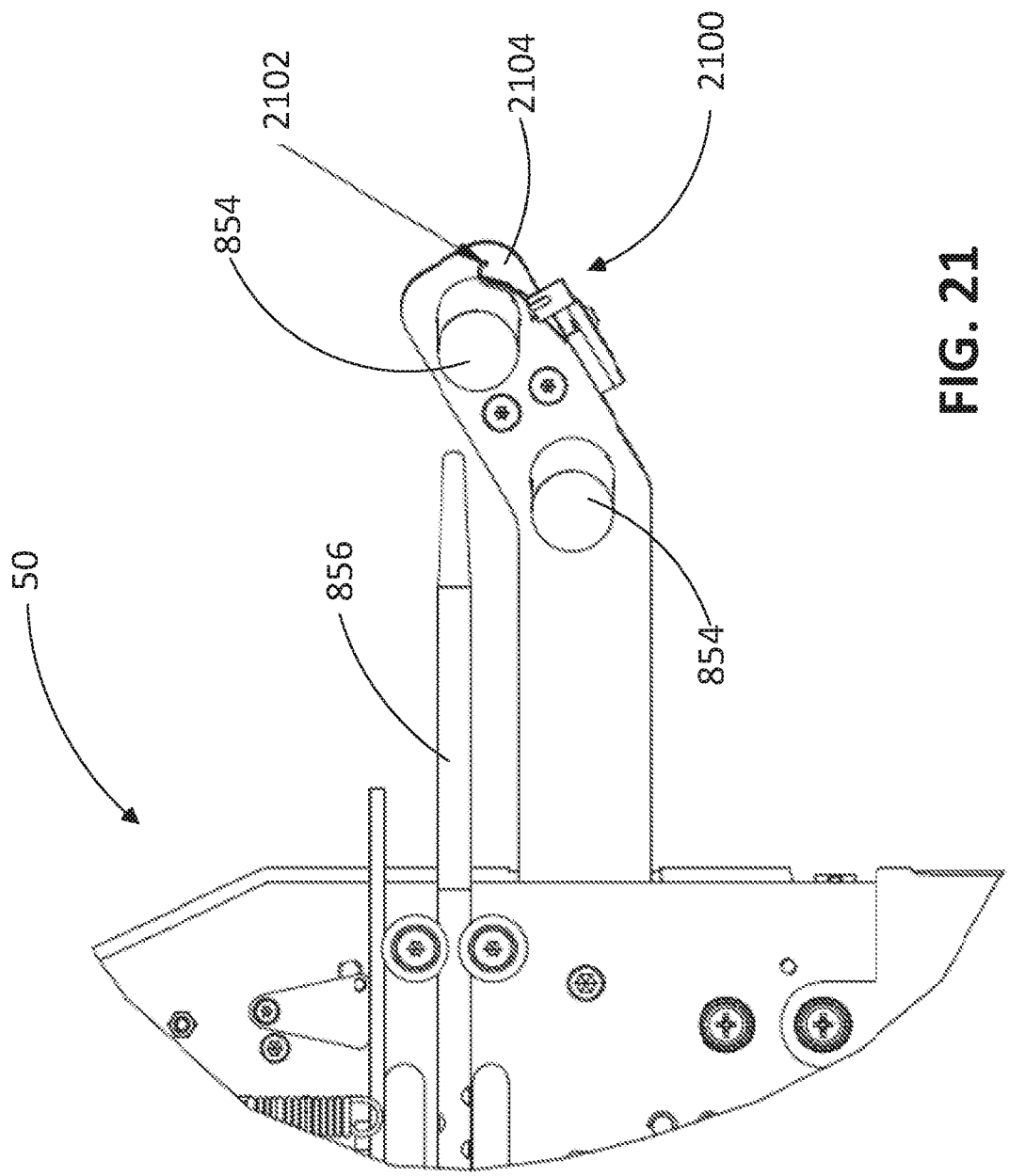
FIG. 21 is a view of a film tensioning arrangement.
Figure 22:
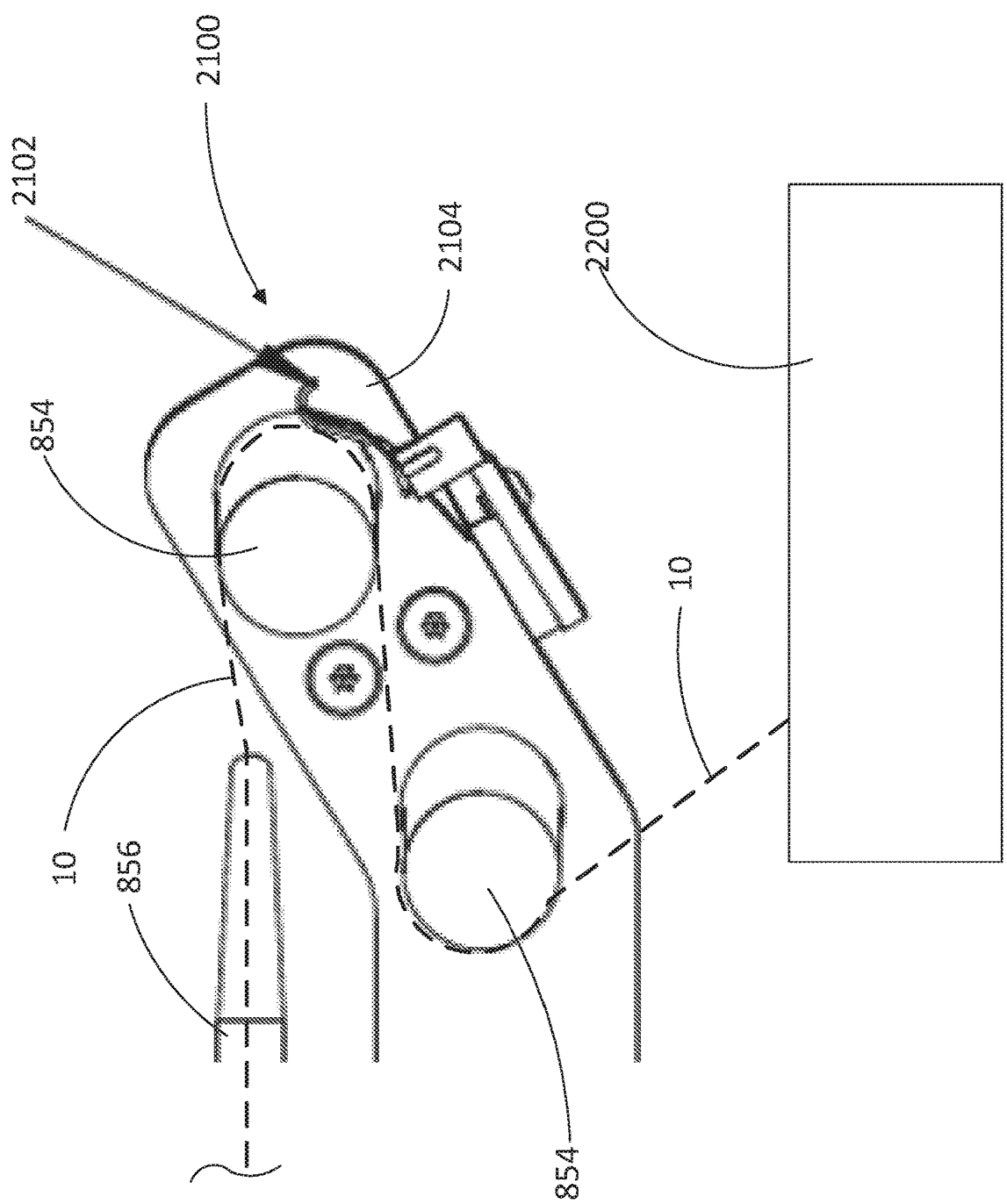
FIG. 22 is a view of film routed through the film tensioning arrangement illustrated by FIG. 21.

FIGS. 21 and 22 illustrate an exemplary embodiment of a tensioning device 2100. The machines 50 can include one or both of the tensioning devices 875, 2100. The illustrated tensioning device 2100 pinches a single layer of the web 10 (i.e. a single layer of web 10 includes a top ply 14 and a bottom ply 16) against one of the elongated, transversely extending guide rollers 854. This pinching of the web 10 against the roller 854 applies tension to the web 10 from the roller 854 to the sealing and clamping arrangements 962, 910 (See FIG. 5).

The tensioning device 2100 can take a wide variety of different forms. Any arrangement for pressing the web 10 against the guide roller can be used. For example, the tensioning device 2100 can comprise a spring biased roller, a spring biased arm, etc. In the illustrated embodiment, the tensioning device 2100 includes a spring arm 2102 connected to the machine 50 by a bracket 2104. The spring arm 2102 is positioned to press the single layer of the web 10 against the upper elongated, transversely extending guide rollers 854. This creates tension in the web 10 between the upper guide roller 854 and the sealing and clamping arrangements 962, 910.

As is illustrated by FIG. 22, the web 10 can be provided in a fan-folded configuration in a box 2200. Since the web is provided from a box 2200, the force required to move the web 10 from the box to the machine is always the same or substantially always the same (i.e. each fan folded layer is sequentially pulled from the top of the box, instead unwinding a roll that gradually diminishes in size and weight. Since the force required to pull the web from the box is constant or substantially constant and the tensioning device 2100 always pinches only a single layer of web 10, the tension in the web 10 between the upper guide roller 854 and the sealing and clamping arrangements 962, 910 can always be the same or substantially the same.

The inflation arrangement 960 can take a wide variety of different forms. Referring to FIG. 7, in the illustrated embodiment, the inflation arrangement 960 includes the hollow, longitudinally extending guide pin 856 and an opening 1200. The illustrated guide pin 856 includes a plurality of inflation openings 1202. The inflation openings 1202 can take a wide variety of different forms. In the illustrated embodiment, the guide pin 856 includes a first, relatively large, opening 1200 and a plurality of smaller openings 1202. The illustrated opening 1200 is a slot with semi-circular ends. The illustrated smaller openings 1202 are circular in shape. The blower and blower control are disposed in a housing 1204 (FIG. 4) of the machine 50.

Figure 11:
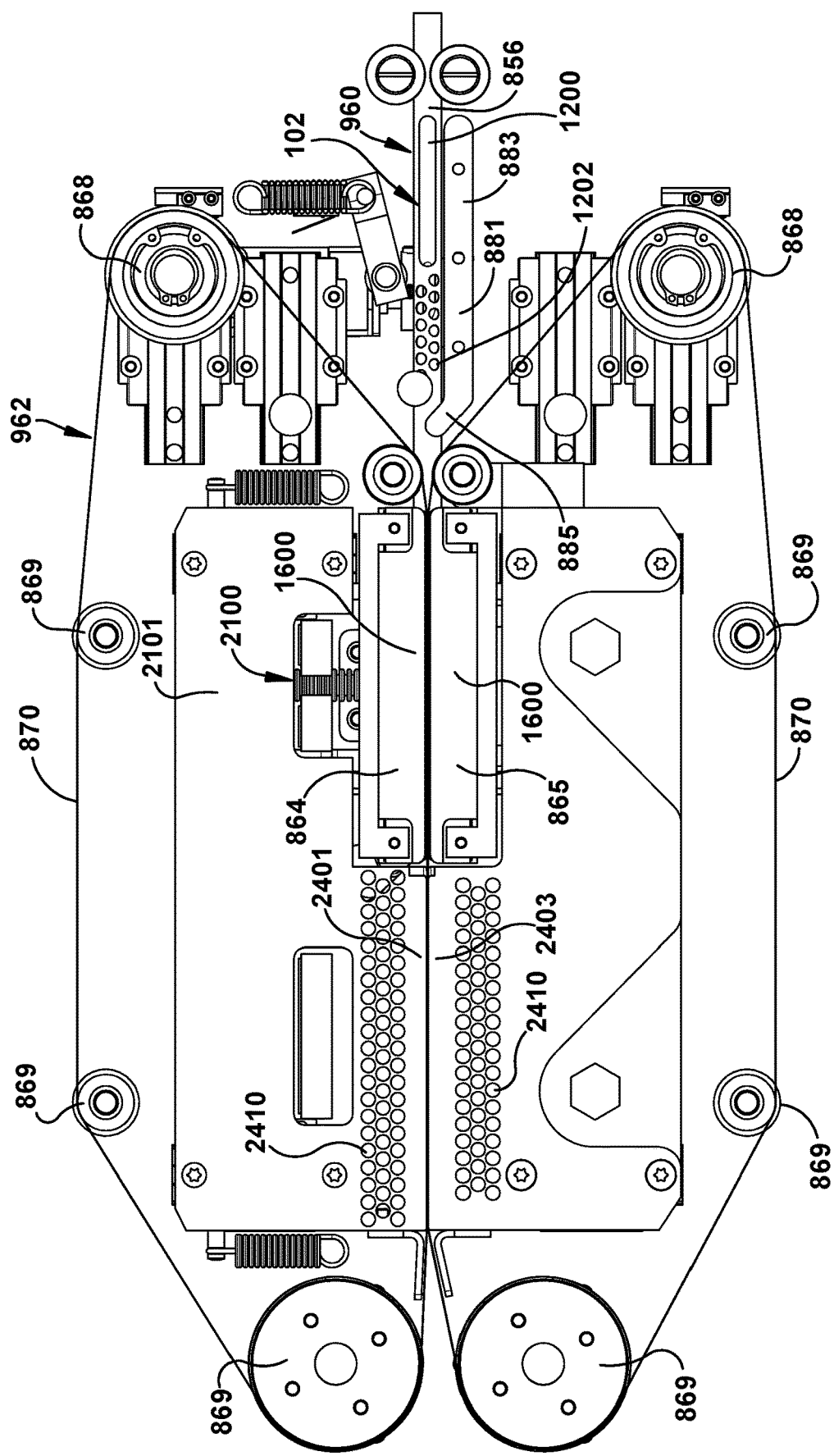
FIG. 11 is a view taken as indicated by lines 16-16 in FIG. 10.
Figure 12:
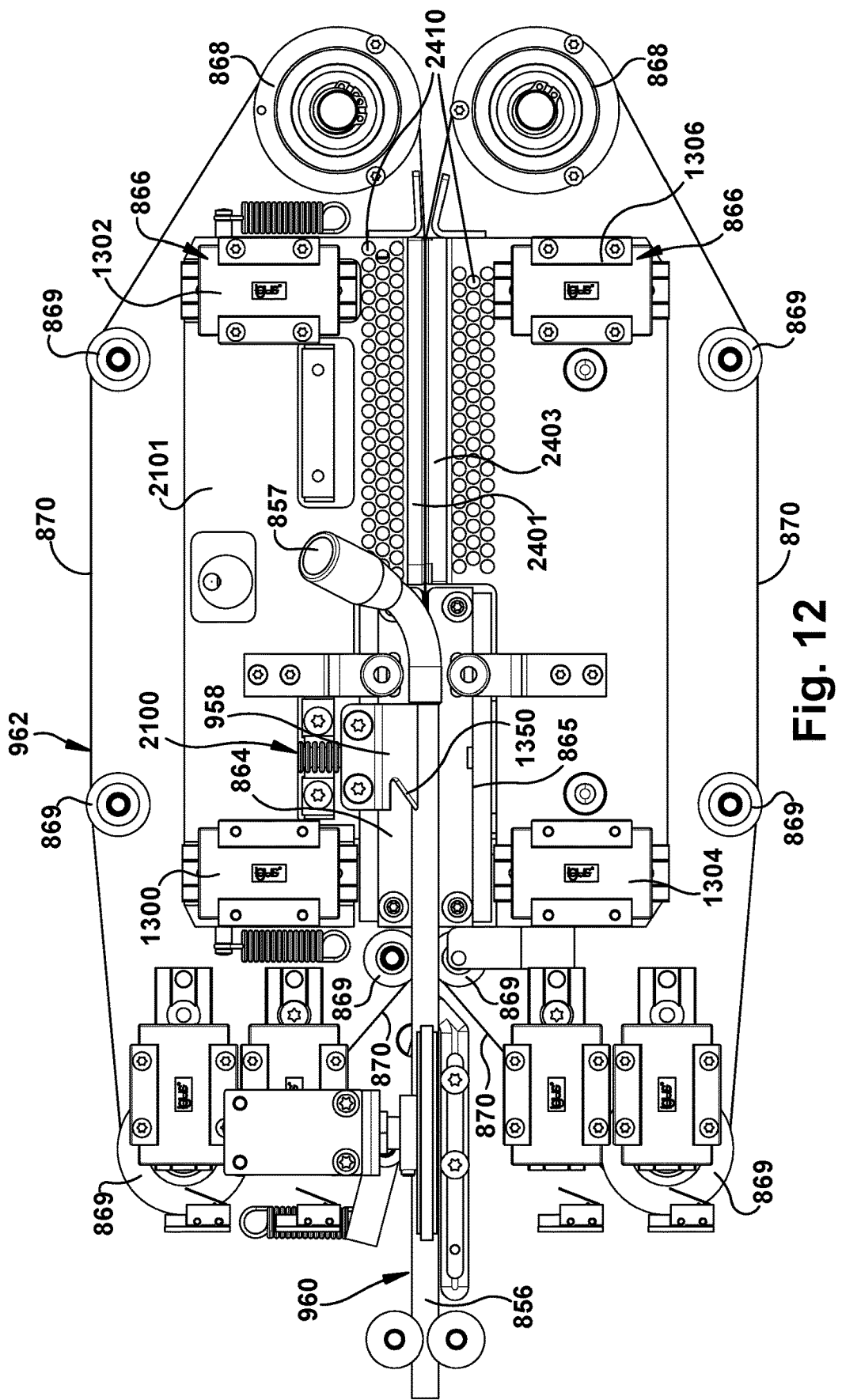
FIG. 12 is a view taken as indicated by lines 17-17 in FIG. 10.
Figure 13:
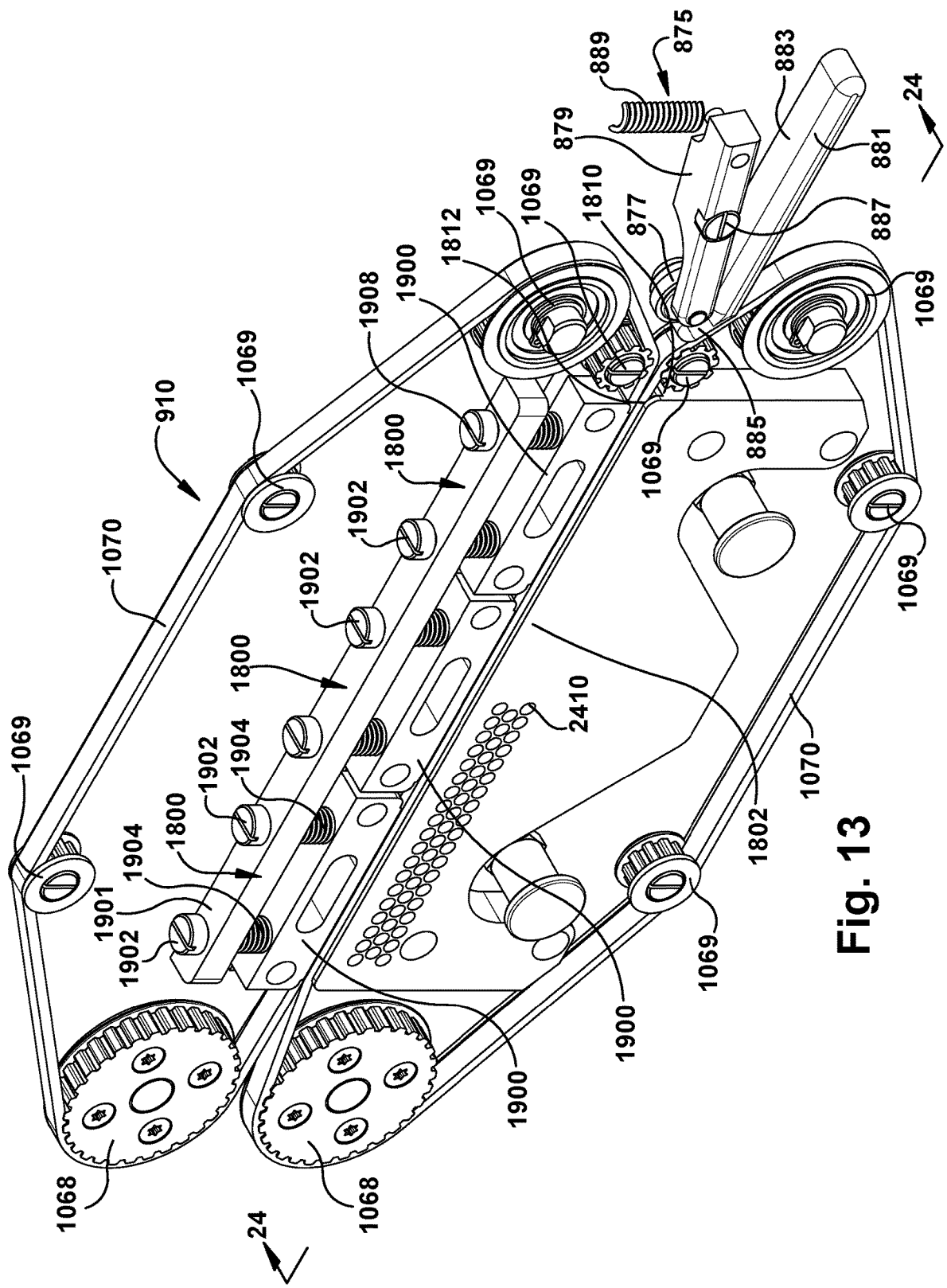
FIG. 13 is a perspective view of a clamping assembly of the air cushion inflation machine shown in FIG. 4.

The sealing arrangement 962 forms the seal 42 to create sealed inflated cushions 12. The sealing arrangement 962 can take a wide variety of different forms. Referring to FIGS. 10-12, the sealing assembly 962 includes a compliant material 864 and a heated sealing element 865, a positioning device 866, drive rollers 868, idler rollers 869, and sealing belts 870. Each belt 870 is disposed around its respective heat sealing elements 864, 865, drive roller 868, and idler rollers 869. Each belt 870 is driven by its respective drive roller 868. In an exemplary embodiment, the speed of the drive rollers 868 and belts 870 are controlled by a belt speed control that is disposed in the housing 1204 of the machine. The belt speed control may be part of an overall controller for the machine or the belt speed controller may be a separate device that interfaces with other devices. The belts 870 engage one another, such that the belts 870 pull the web 10 through the heat sealing elements 864, 865. The seal 42 is formed as the web 10 passes through the heated sealing elements 864, 865.

Figure 16:
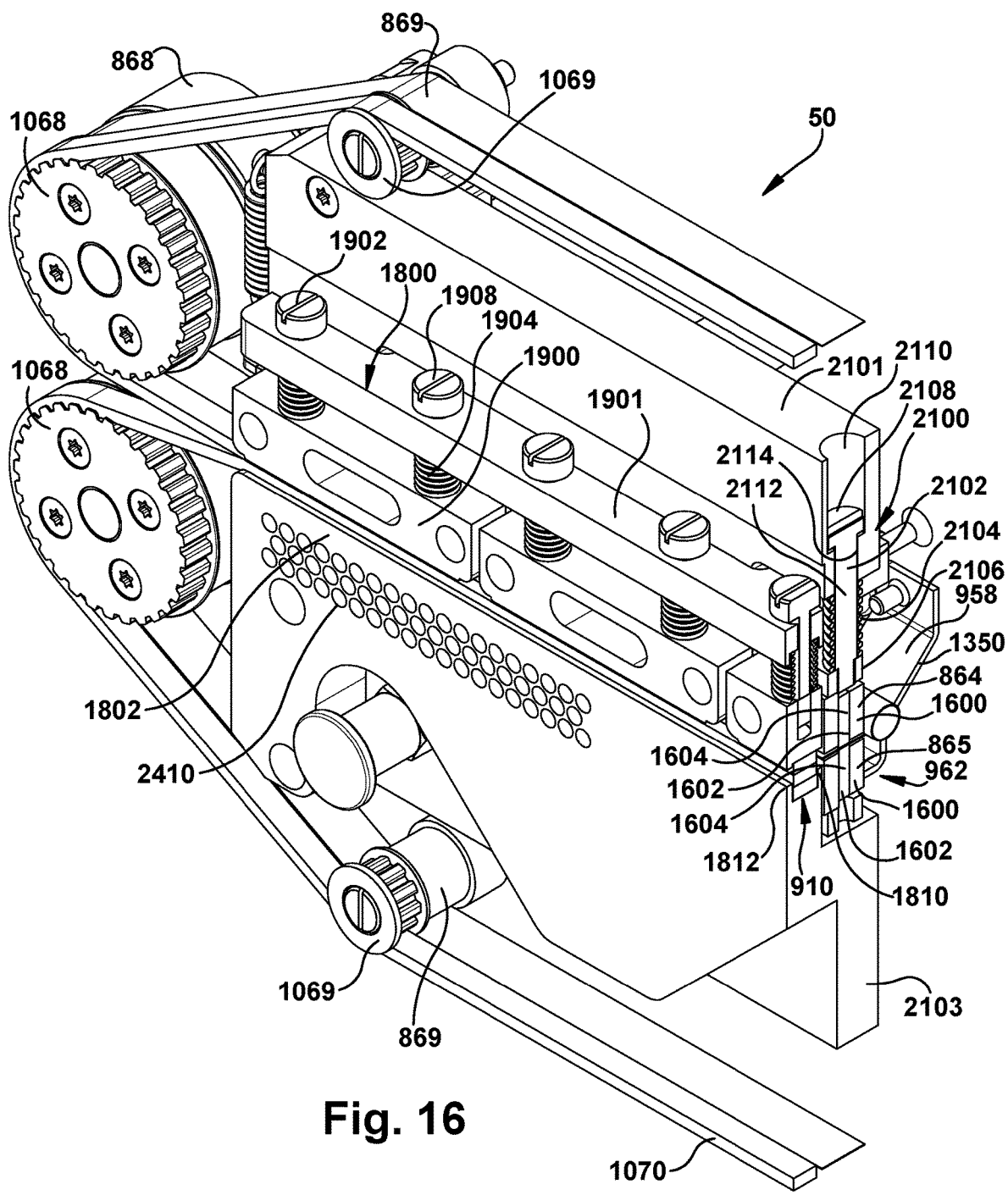
FIG. 16 is a sectioned perspective view with the section being taken as indicated by lines 27-27 in FIG. 15.
Figure 16A:
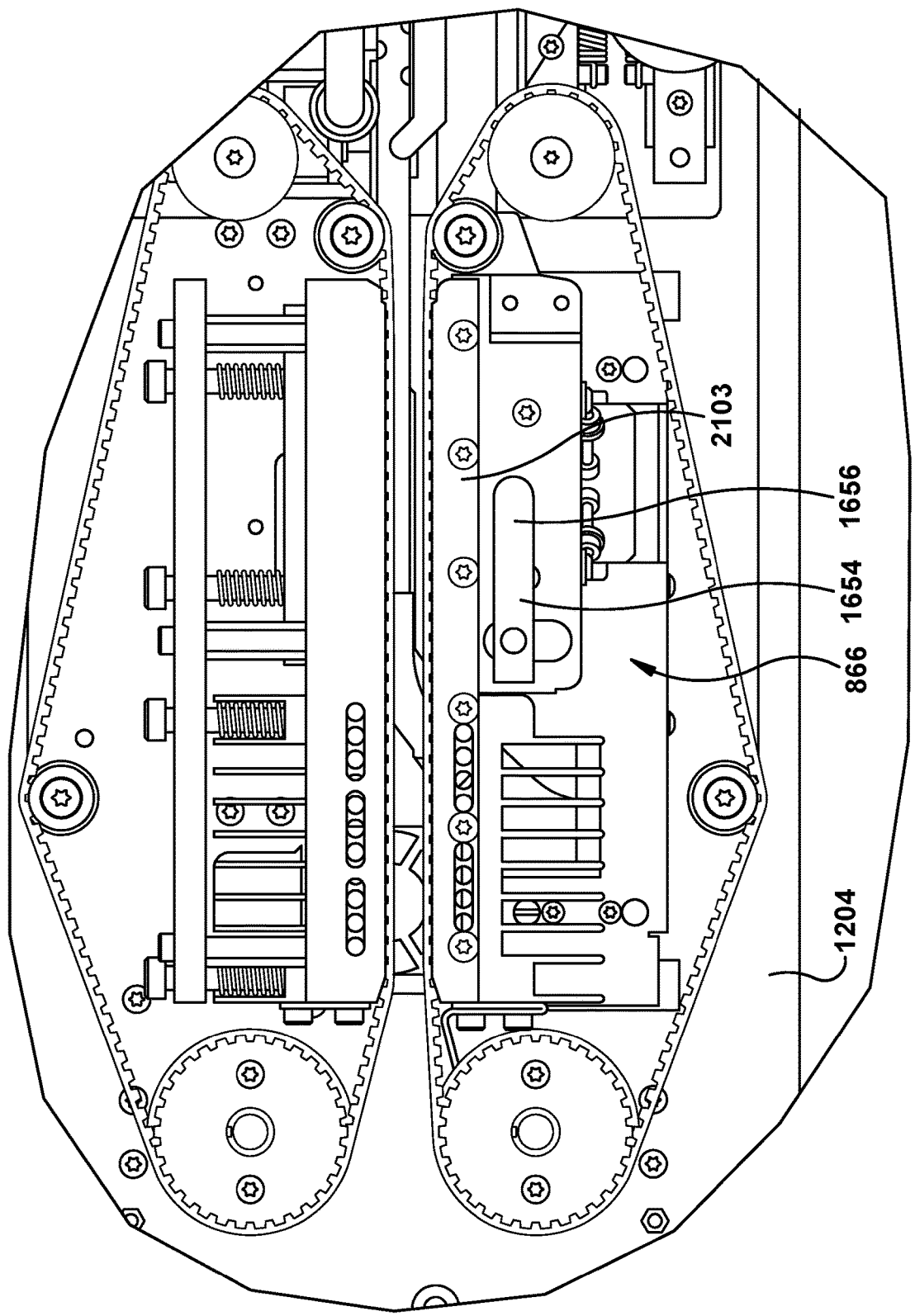

Referring to FIG. 16, in the illustrated example the heat sealing element 864 is biased toward the heat sealing element 865 by a biasing assembly 2100. The biasing assembly 2100 can take a wide variety of different forms. The biasing arrangement may be any arrangement that biases the heat sealing elements 864, 865 relatively toward one another. In the illustrated example, the biasing assembly 2100 includes a support member 2101, a shaft member 2102, a spring 2104 disposed around the shaft member, and a coupling member 2106 connected to the heat sealing element 864. A head 2108 of the shaft member 2102 is disposed in a counterbore 2110 of the support member 2101 with a shaft portion 2112 of the shaft member extending through a hole 2114 in the support member 2101. The shaft member 2102 is free to move axially in the counterbore. An end of the shaft portion is connected to the coupling member 2106. The spring 2104 pushes the coupling member 2106 and attached heat sealing element 864 downward. The biasing assembly 2100 ensures that the heat sealing elements 864, 865 securely engage the web 10 between the belts 1070 whenever the belts are engaged.

The heating element 864 can take a wide variety of different forms. Referring to FIG. 16, in the illustrated example the heating element 864 includes an outer body 1600, an internal ceramic element 1602, and an internal thermocouple 1604 or other device for measuring the temperature of the internal ceramic element 1602. A potting material or other encapsulating material surrounds the internal ceramic element 1602 and the thermocouple 1604. In an exemplary embodiment, the thermocouple 1604 is disposed directly on the ceramic element 1602. As discussed above, in other embodiments the heating element 864 may also be the wire including at least one low resistance portion 82 and at least one high resistance portion 84. The compliant material 112 is included as part of a spring loaded clamping assembly 1800, which is discussed below.

A temperature control arrangement is coupled to the thermocouple 1602 and the ceramic element 1602 for controlling the temperature of the ceramic element 1602 based on feedback from the thermocouple 1604. The temperature measured by the thermocouple is used to adjust the power applied to the heating element and thereby control the temperature of the heating element. The temperature control arrangement is disposed in the housing 1204 of the machine. The temperature control arrangement may be part of an overall controller for the machine or the temperature control arrangement may be a separate device that interfaces with other devices.

Figure 17:
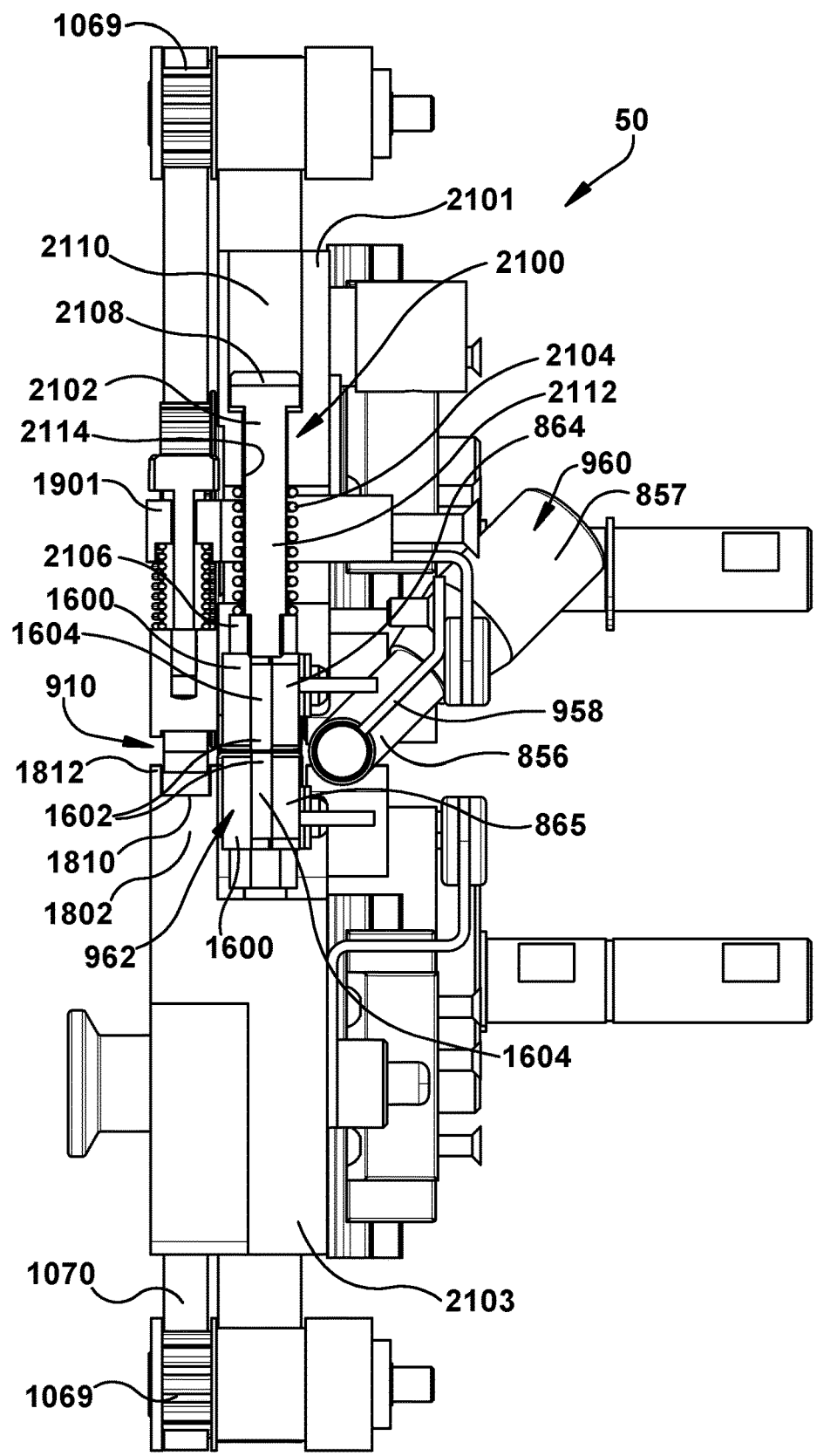
Figure 18:
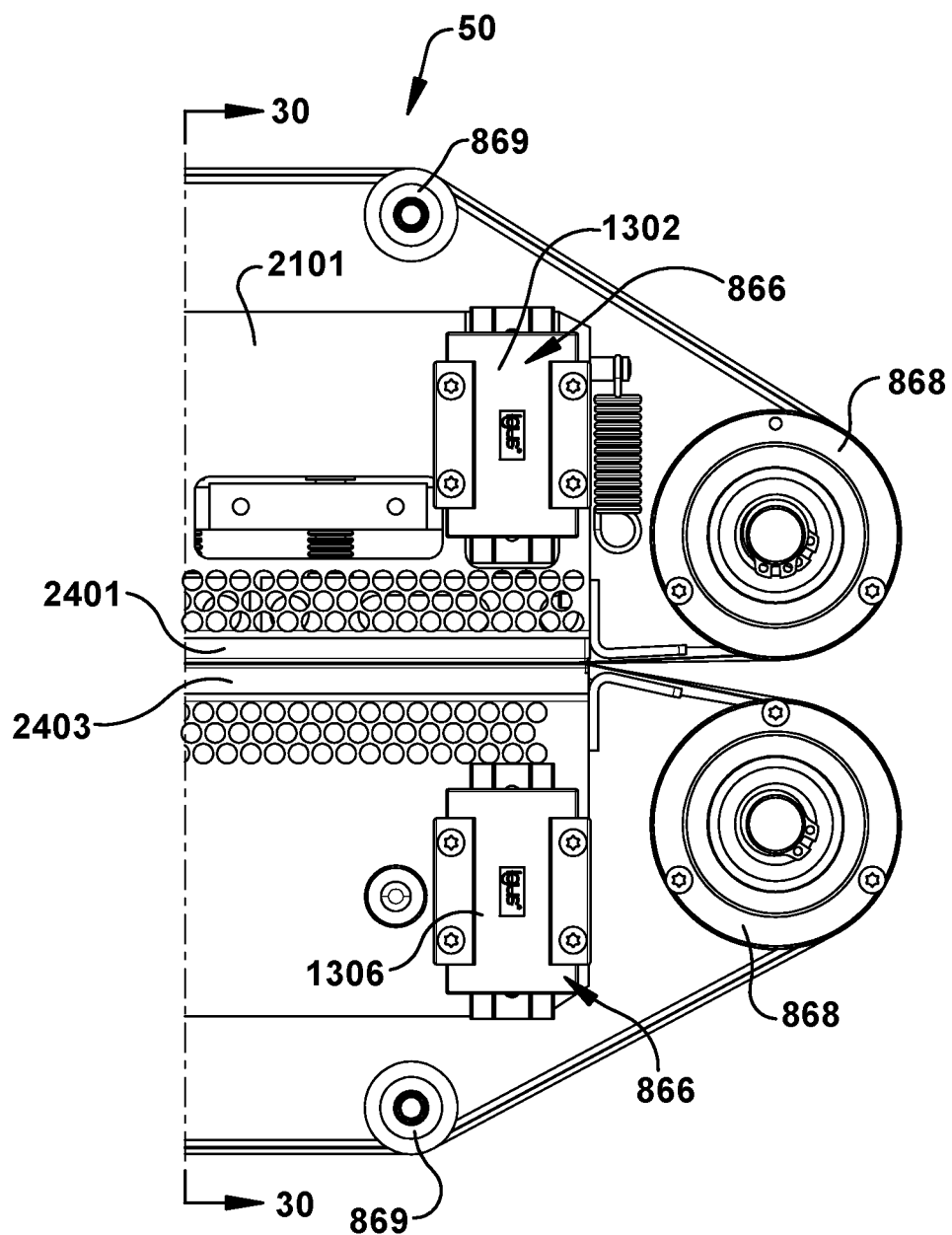
FIG. 18 is a partial rear view of the sealing and clamping assemblies shown in FIG. 16.

Referring to FIGS. 16 and 17, in the illustrated example the heat sealing elements 864, 865 are coupled to the upper support members 2101 and a lower support member 2103 respectively. The illustrated heat sealing element 865 fixed to the lower support member 2103. However, the lower heat sealing element may be coupled to the lower support member 2103 in any manner. For example, the lower heat sealing element 865 may be coupled to the lower support member 2103 by a second biasing assembly.

Referring to FIGS. 12, 15, 16, and 16A-16D, the heating sealing element positioning device 866 can take a wide variety of different forms. In the example illustrated by FIGS. 12 and 15, the heat sealing element positioning device 866 (see FIG. 15) comprises two upper actuators 1300, 1302 (see FIG. 12) and two lower actuators 1304, 1306 (see FIG. 12). The two upper actuators 1300, 1302 (see FIG. 12) are each operably connected to the upper support member 2101 and a fixed component of the machine 50, such as the housing 1204. The two lower actuators 1304, 1306 are each operably connected to the lower support member 2103 and a fixed component of the machine 50, such as the housing 1204. The actuators 1300, 1302, 1304, 1306 are operable to move the upper and lower support members 2101, 2103 and coupled heat sealing element 865 relatively toward and away from one another. As such, the heating element 865 is positioned with respect to the path of travel of the web 10 such that the sealing belts 870 selectively engage and disengage the web 10.

Figure 16C:
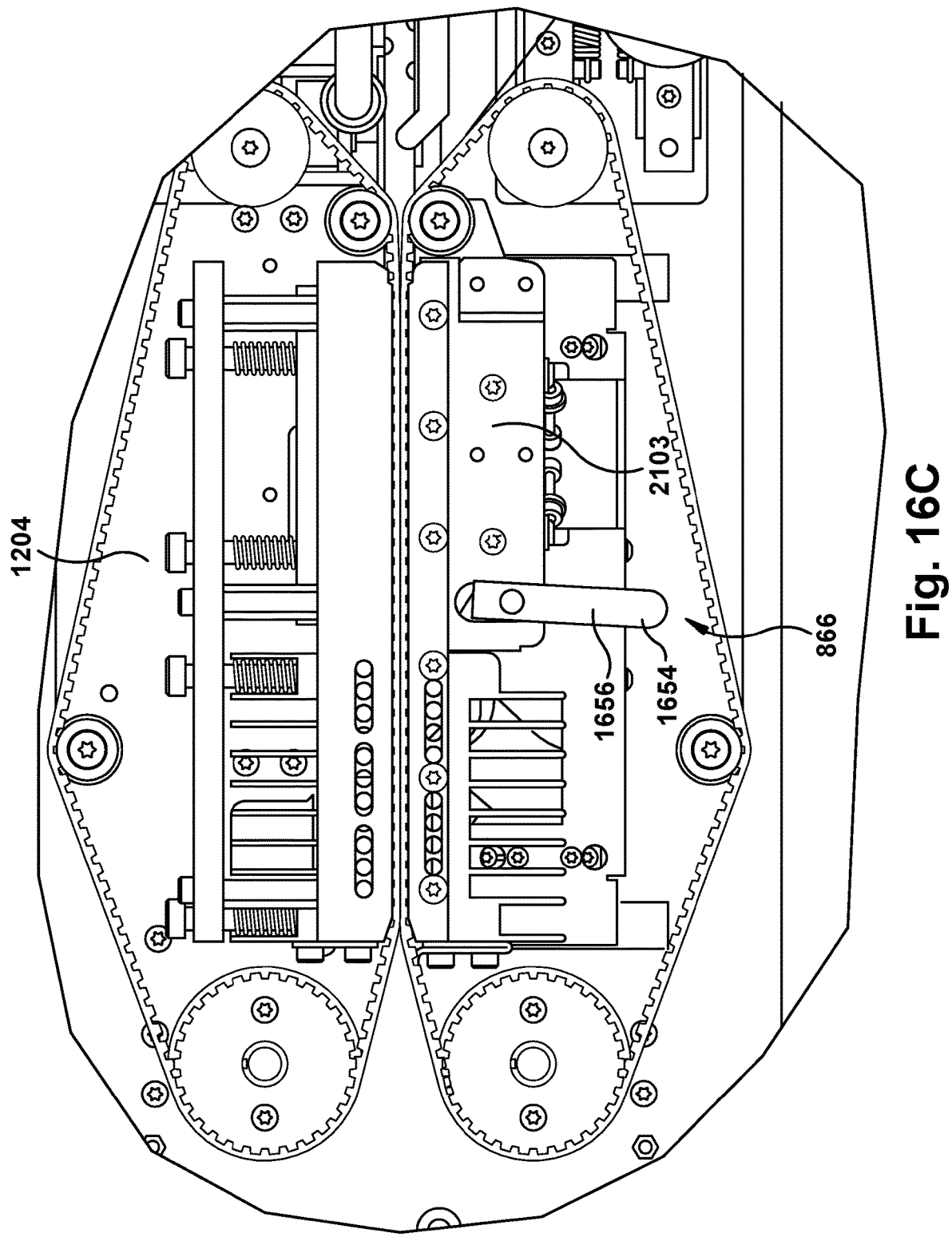
Figure 16D:
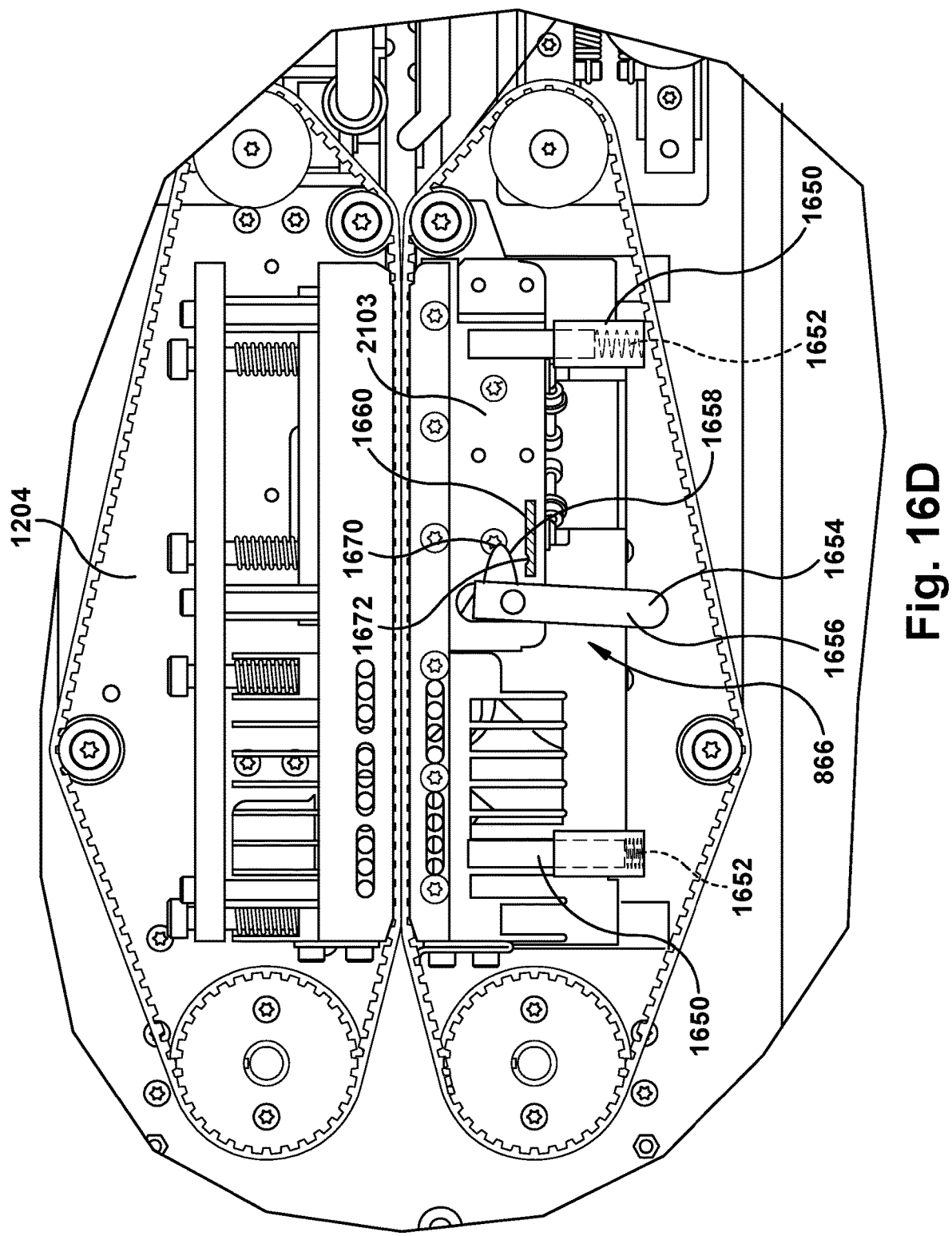

FIGS. 16A-16D illustrate another exemplary embodiment of a heating sealing element positioning device 866. One of the support members 2101, 2103 can be fixed to a fixed component of the machine 50, such as the housing 1204 and the other of the support members 2101, 2103 is movable with respect to the fixed component of the machine 50, such as the housing. In another embodiment, the fixed support member can be omitted and the sealing and/or clamping components can be mounted directly to one or more fixed components of the machine 50. In the examples illustrated by FIGS. 16A-16D, the upper support member 2101 is omitted and the components of the sealing and/or clamping mechanisms are mounted directly to the housing 1204. In another exemplary embodiment, an upper support member 2101 can be fixed relative to the housing 1204. In either case, the lower support member 2103 is moveable relative to the housing. As such, the lower support member 2103 (and the corresponding heat sealing and/or clamping components) is moveable between an open or released position (FIGS. 16A and 16B) and a closed or clamped position (FIGS. 16C and 16D).

The lower support member 2103 can be movably coupled to the housing 1204 in a wide variety of different ways. In the example illustrated by FIGS. 16B and 16D, the lower support member 2103 is movably coupled to the housing 1204 by spring loaded slides 1650. In this example, a spring 1652 of each spring loaded slide 1650 biases the lower support member 2103 toward the closed position. However, in another exemplary embodiment, the spring loaded slide 1650 can be configured to bias the lower support member 2103 toward the open position.

The lower support member 2103 can be moved between an open or released position (FIGS. 16A and 16B) and a closed or clamped position (FIGS. 16C and 16D) in a wide variety of different ways. In one exemplary embodiment, an actuator 1654 moves the lower support member 2103 between the open or released position and the closed or clamped position. The actuator can take a wide variety of different forms. For example, the actuator can be a powered actuator or a manual actuator of any type. In the example illustrated by FIGS. 16A-16D, the actuator 1654 comprises a lever 1656. Rotating the lever 1656 moves the lower support member 2103 between the open or released position and the closed or clamped position.

Referring to FIGS. 16B and 16D, in one exemplary embodiment the actuator 1654 includes a cam and/or detent mechanism. In this example, the lever 1656 is rotatably connected to a fixed portion of the machine 50, such as the housing 1204. When the lever 1656 is rotated from the position illustrated by FIG. 16D to the position illustrated by FIG. 16B, a first cam surface 1658 that is rotated by the lever 1656 engages a second cam surface 1660 that is fixed to a fixed portion of the machine. The engagement between the first cam surface 1658 and the second cam surface 1660 forces the lower support member 2103 to move away from the upper support member against the biasing force applied by the spring loaded slides 1650 (i.e. the lever pushes the lower support member 2103 down). However, in another exemplary embodiment, the actuator 1654 can be configured to move the lower support member in the opposite direction and the spring loaded slide 1650 can be configured to bias the lower support member 2103 away from the upper support member 2101.

In the example illustrated by FIGS. 16B and 16D, an optional detent 1662 maintains the actuator 1654 and the lower support member 2103 in the open or released position. In the illustrated example, the detent 1662 comprises a surface or portion 1670 of the first cam surface 1658 that fits in a recess 1672 of the second cam surface 1660. However, the optional detent can take any form. In another exemplary embodiment, the detent can maintain the lower support member in the closed or clamped position.

Figure 19:
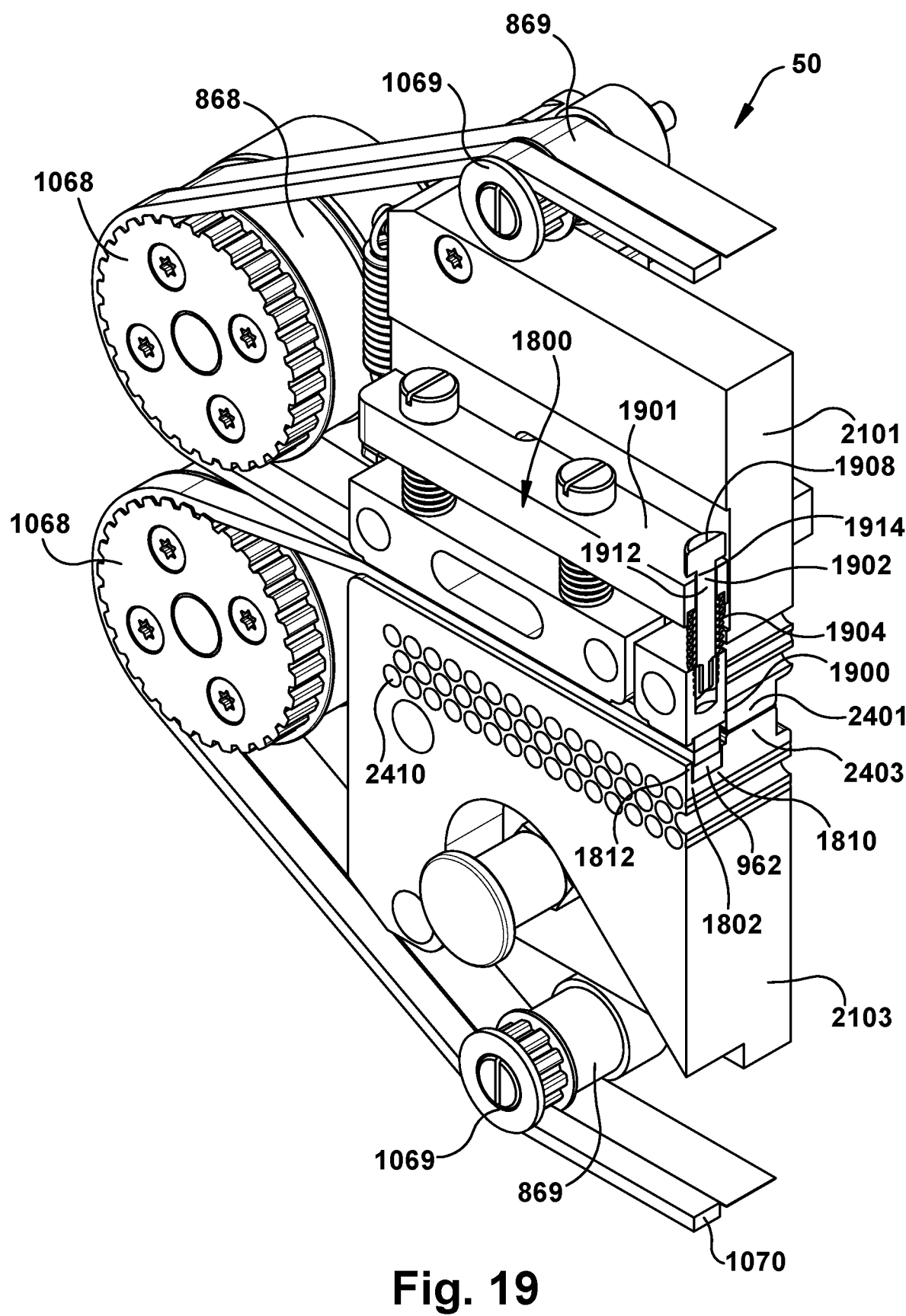
FIG. 19 is a sectioned perspective view with the section being taken as indicated by lines 30-30 in FIG. 18.
Figure 20:
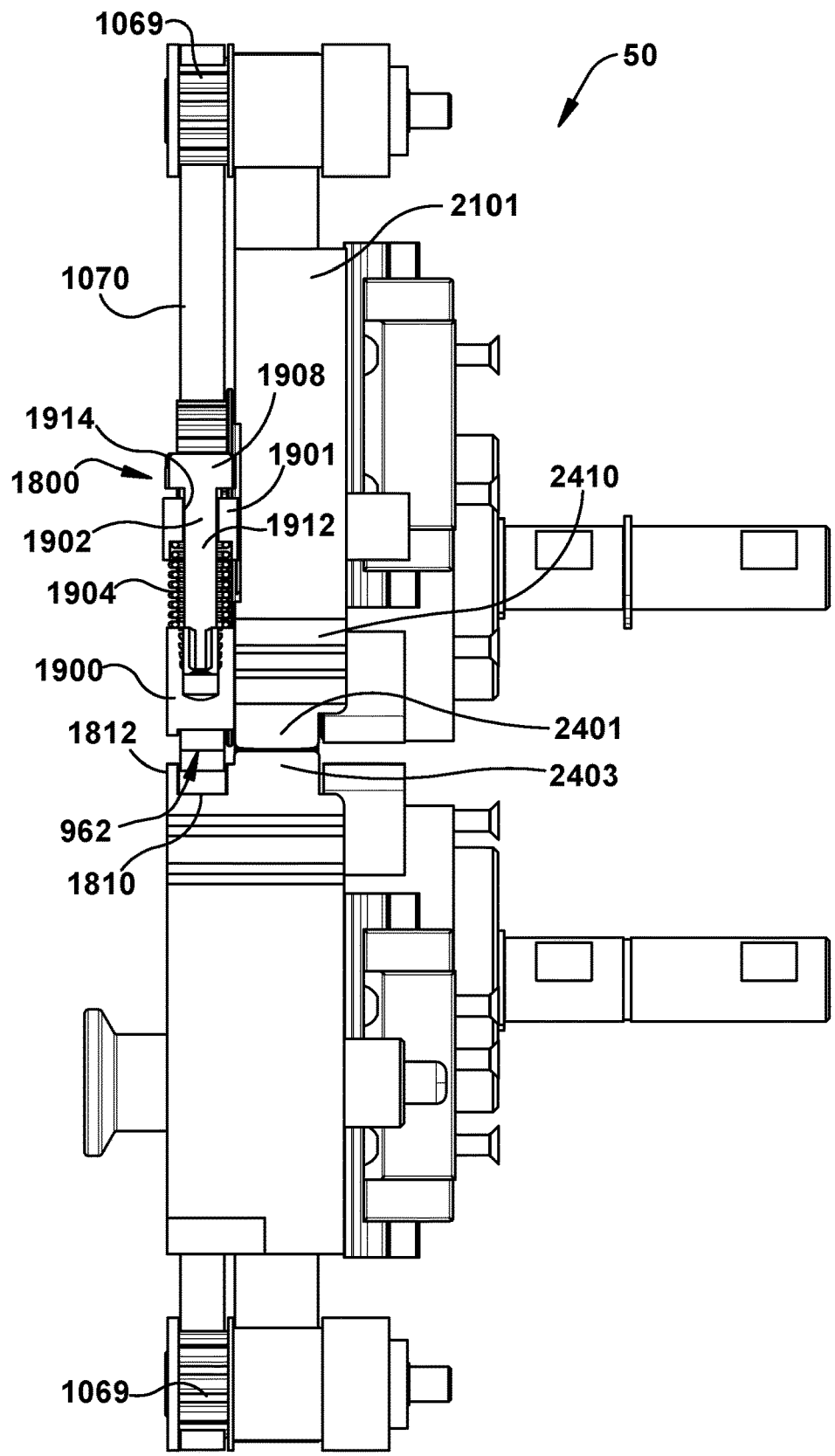

Referring to FIGS. 19 and 20, the illustrated upper and lower support members 2101, 2103 include seal cooling portions 2401, 2403. The seal cooling portions 2401, 2403 engage the belts 870 and compress the material of the seal downstream of the sealing elements 864, 865. Heat of the seal is transferred through the belts 870 and into the seal cooling portions 2401, 2403 of the support members 2101, 2103 to cool the material of the seal. The illustrated upper and lower support members 2101, 2103 include optional holes 2410. The holes 2410 increase the surface area of the upper and lower support members 2101, 2103 to increase their effectiveness as heat sinks and reduce their weight. The upper and lower support members 2101, 2103 can be made from a wide variety of different materials. In an exemplary embodiment, the support members are made from a thermally conductive material such as aluminum or copper.

Figure 23:
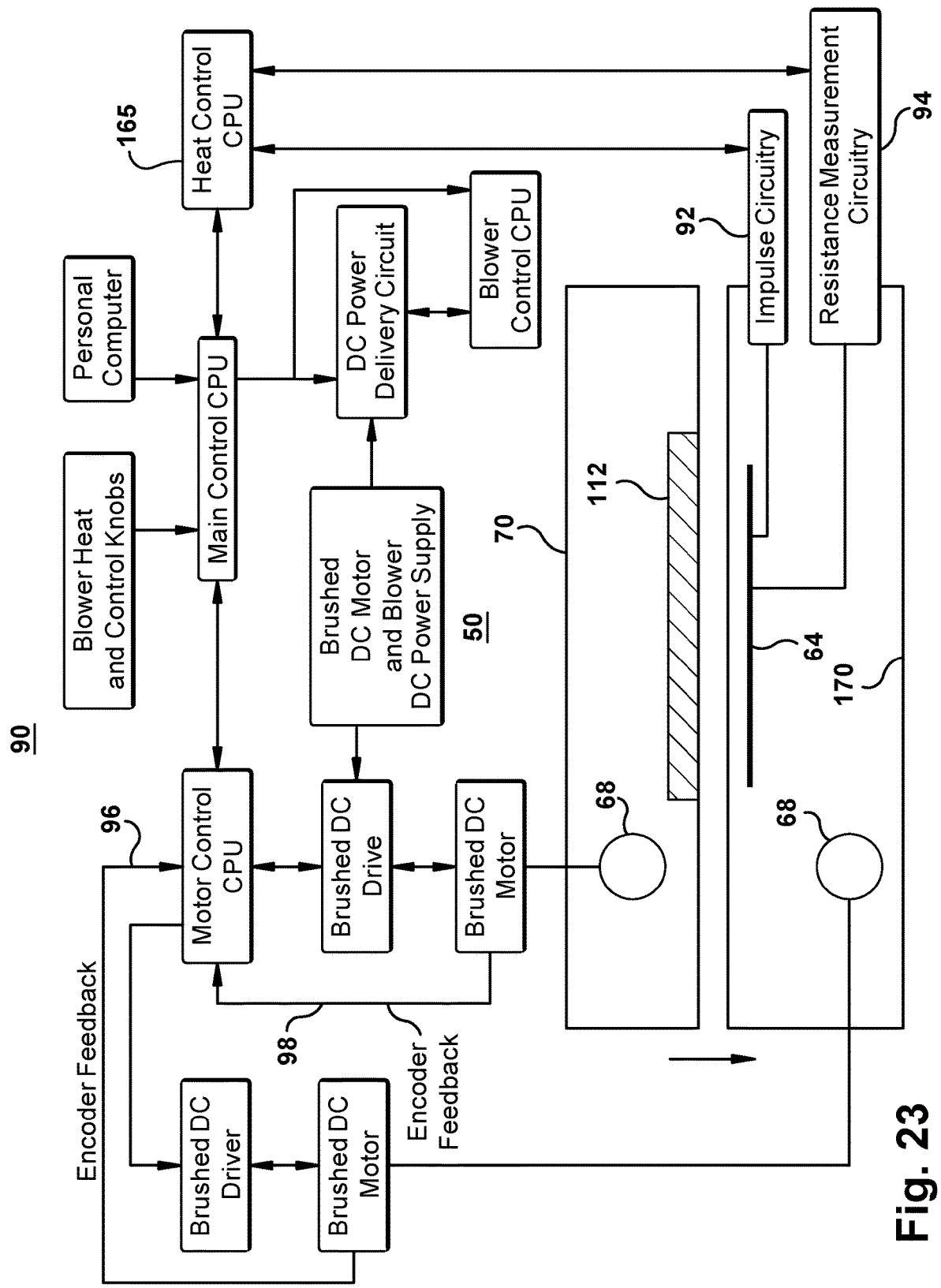
FIG. 23 is a component diagram of an air cushion inflation machine.
Figure 24:
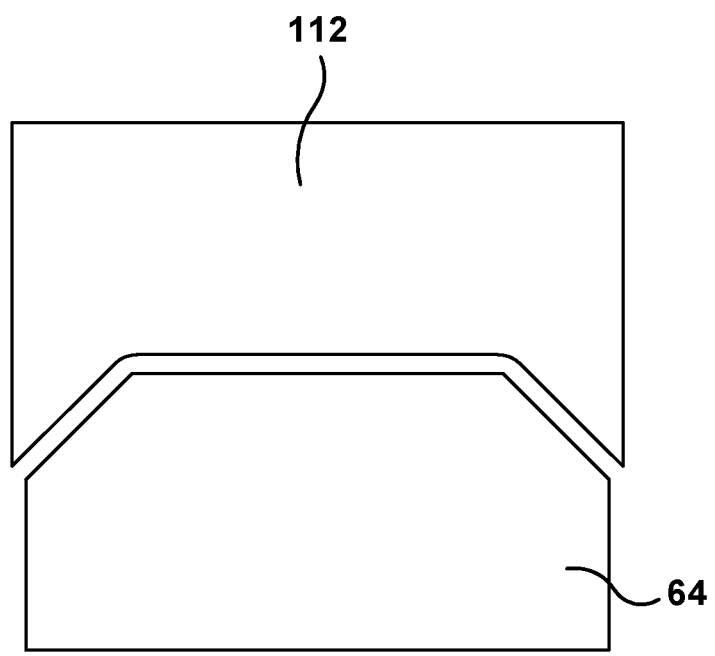
FIG. 24 is a sectional view of the heated sealing element and the compliant material.

The clamping arrangement 910 is positioned to pinch the top and bottom layers 14, 16 of the preformed web together. The clamping arrangement 910 can take a wide variety of different forms. Referring to FIGS. 23 and 24, the clamping arrangement 910 includes drive rollers 1068, idler rollers 1069, spring loaded clamping assemblies 1800, a clamping portion 1802 of the lower support member 2103, and a pair of drive belts 1070. The illustrated clamping portion 1802 of the lower support member 2103 includes a support surface 1810 or groove and a lip 1812. The width of the support surface 1810 or groove corresponds to the width of the belts 1070. The support surface 1810 supports the lower belt 1070 and the lip 1812 retains the belt or the support surface.

Referring to FIGS. 19 and 20, each spring loaded clamping assembly 1800 includes a clamping member 1900, a shaft member 1902, and a spring 1904 disposed around the shaft member. The clamping members 1900, shaft members 1902, and springs are coupled to a support member 1901. Each clamping member 1900 is biased toward the clamping portion 1802 of the lower support portion 2103 by the springs 1902. A head 1908 of each shaft member 1902 is disposed on the support member 1901 with a shaft portion 1912 of the shaft member extending through a hole 1914 in the support member 1901. The shaft member 1902 is free to move axially in the counterbore. An end of each shaft portion 1912 is connected to a clamping member 1900. The springs 1904 push the clamping members 1900 downward. The biasing assemblies 1800 ensure that the belts 1070 securely engage the web 10 whenever the belts are engaged.

Each belt 1070 is disposed around its respective drive rollers 1068 and idler rollers 1069. Each belt 1070 is driven by its respective drive roller 1068, which is attached to a drive roller 868. As such, the sealing belts 870 and the pinching belts 1070 are driven in sync. The belts 1070 engage one another, such that the belts 1070 pull the web 10 and pinch the web as the web moves through the heat sealing element 865.

Figure 14:
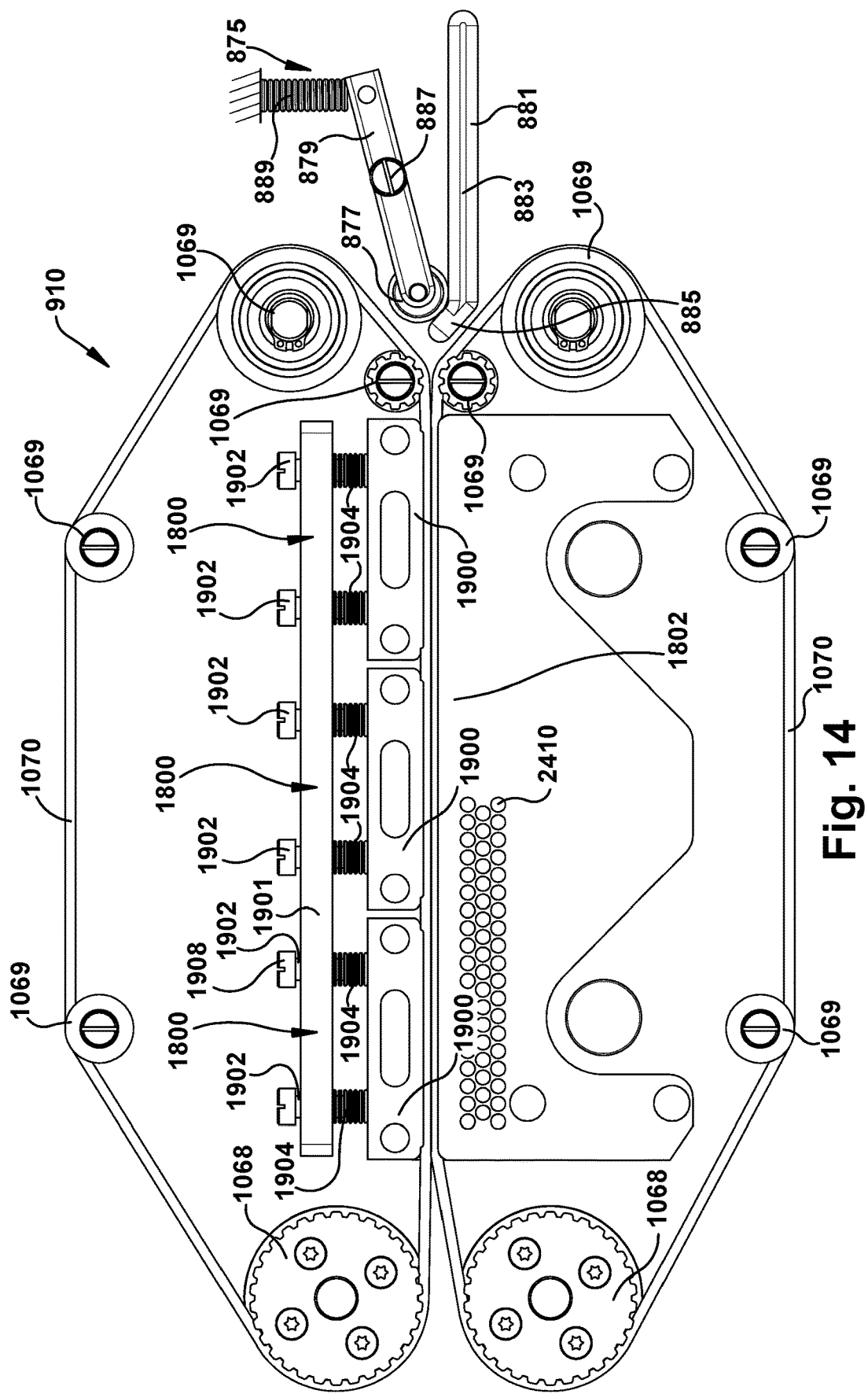
FIG. 14 is a view taken as indicated by lines 24-24 in FIG. 13.
Figure 14A:
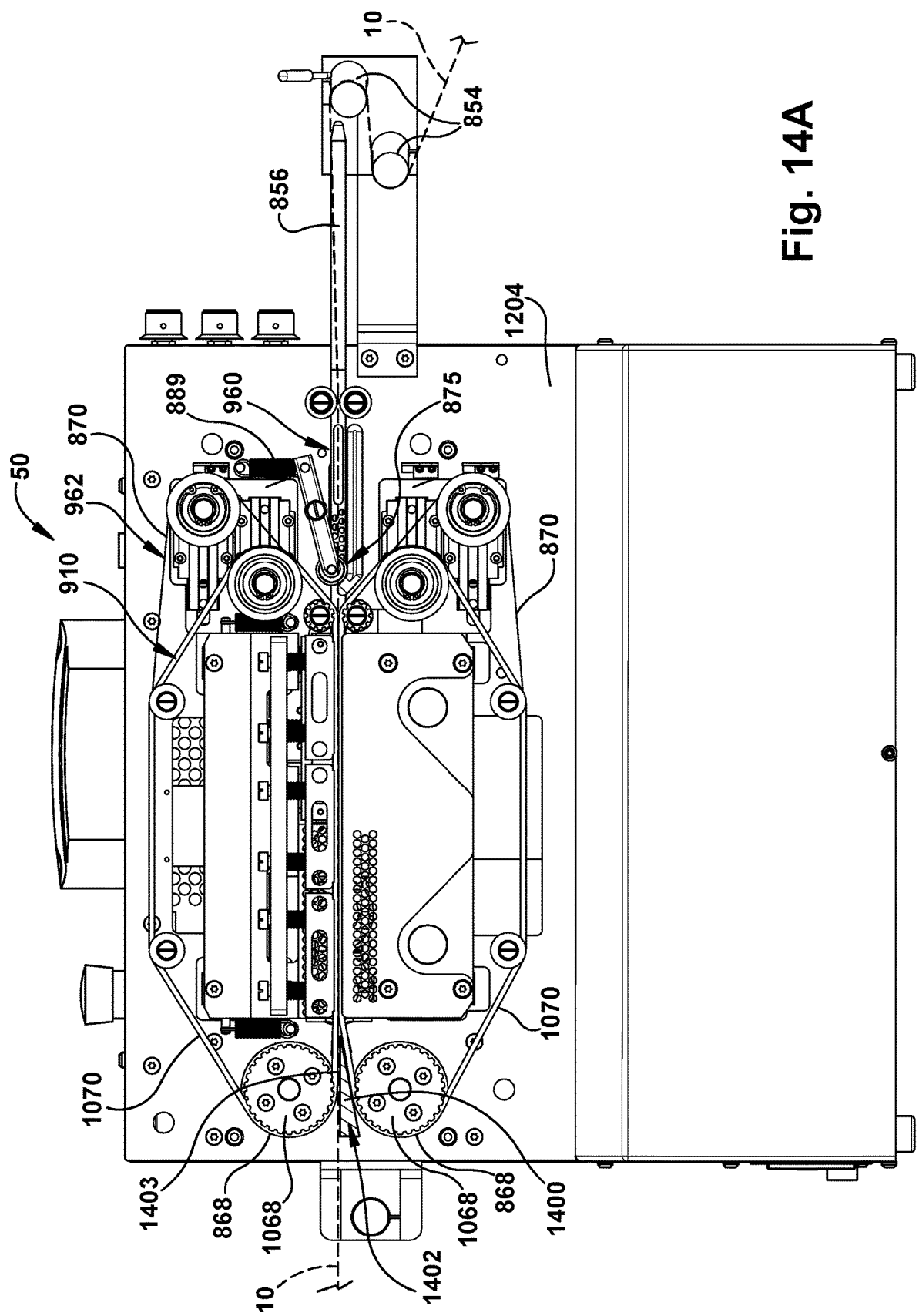
FIG. 14A is a side view of an exemplary embodiment of an air cushion inflation machine that includes a film separation member.

FIG. 14A illustrates an exemplary embodiment of a machine that includes a separation member 1400. The separation member 1400 can be positioned to prevent the web 10 from sticking to one or both of the lower belts 870, 1070 and following the lower belts 870, 1070 around the lower rollers 868, 1068. The separation member 1400 can take a wide variety of different forms. In the example illustrated by FIG. 14A, the separation member 1400 is in a space 1402. This space is between the upper rollers/belts and the lower rollers/belts. In another embodiment, the space 1402 is in the area where the belts 870, 1070 diverge, but slightly in front of the belts. In other embodiments, the separation member is located outside the space 1402 (e.g. to the left of the belts 870, 1070 and rollers 868, 1068 in FIG. 14A). The web 10 is routed over a top surface 1403 of the separation member 1400. As a result, the web 10 slides over the top surface 1402 and does not stick to and follow the lower belts around the lower rollers.

Figure 14B:
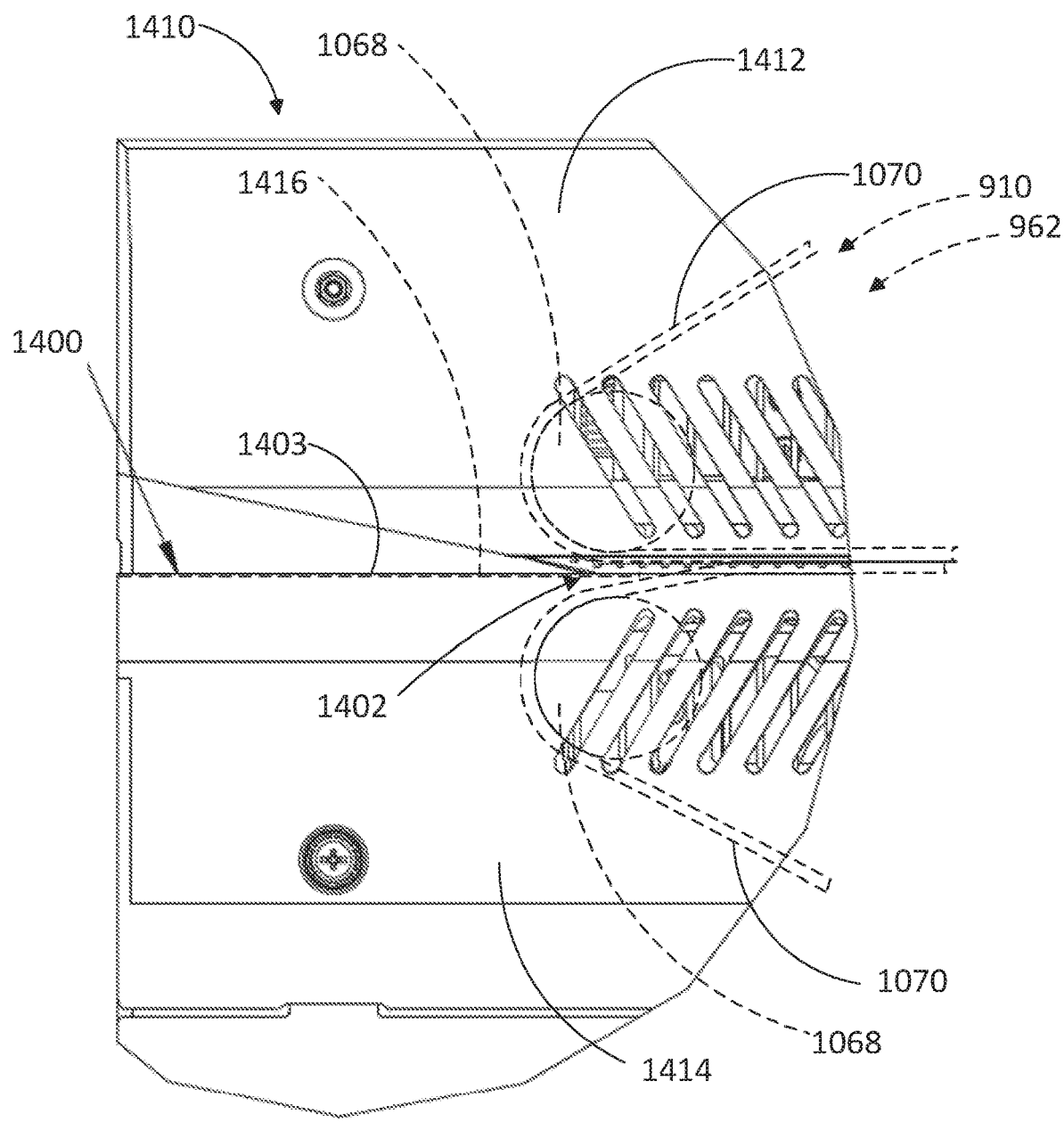
FIGS. 14B-14D illustrate an exemplary embodiment of a cover assembly that includes an example of a film separation member.
Figure 14C:
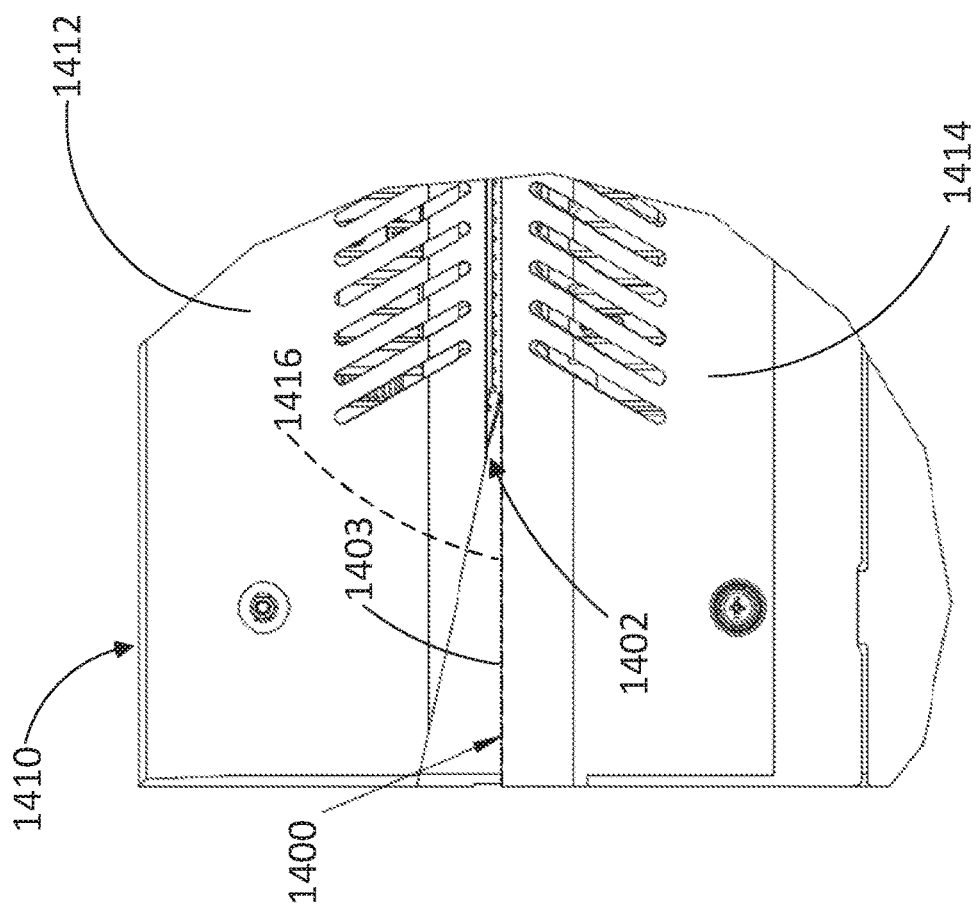
Figure 14D:
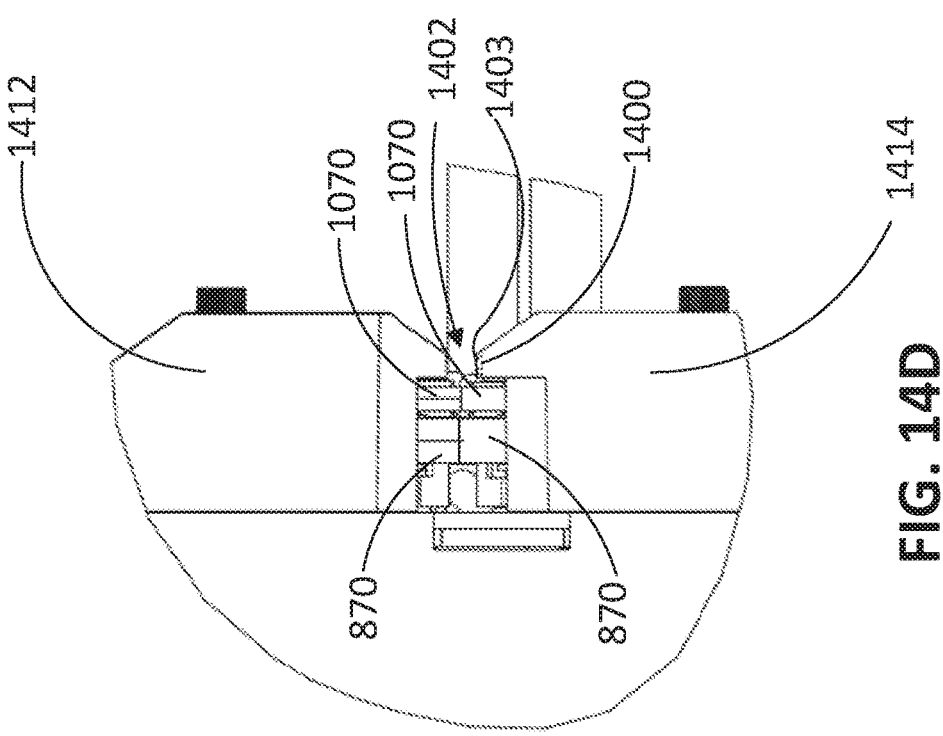
Figure 15:
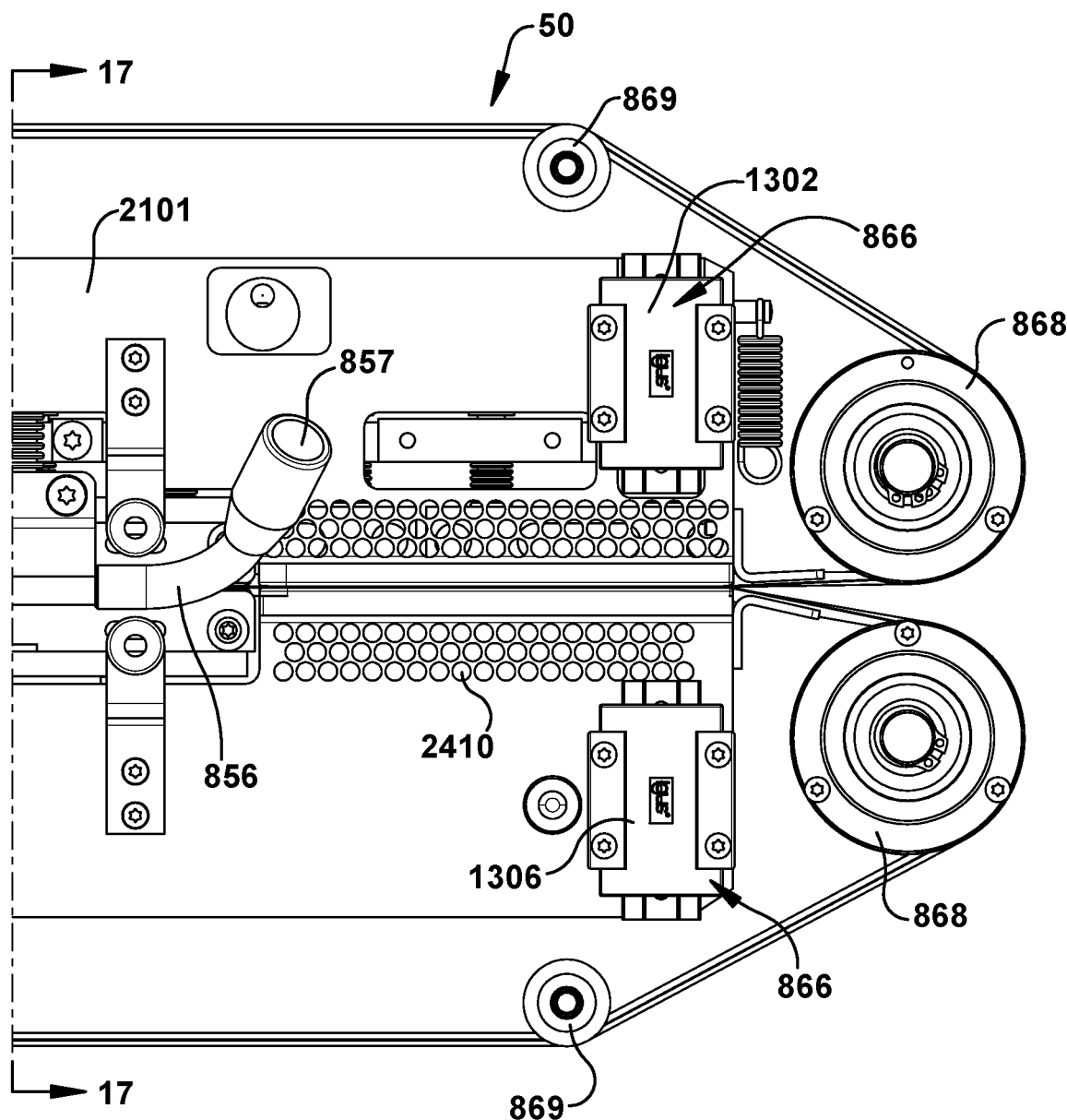
FIG. 15 is a partial rear view of the sealing and clamping assemblies shown in FIG. 6.

Referring to FIGS. 14B-14D, in one exemplary embodiment the separator 1400 can be formed as part of a cover assembly 1410. The cover 1410 covers the clamping arrangement 910 and the sealing arrangement 962 (See FIG. 4). In the illustrated example, the cover assembly 1410 includes an upper cover 1412 and a lower cover 1414. The lower cover 1414 includes the separator 1400. In this example, the separator 1400 comprises a wall 1416 of the lower cover 1414 that extends into the space 1402. The illustrated wall 1416 also extends out of the space 1402 (to the left of the space 1402 in FIG. 14B). The web 10 is routed over a top surface 1402 of the wall 1416. As a result, the web 10 slides over the top surface 1402 and does not stick to and follow the lower belts around the lower rollers.

The illustrated separation member 1400 is wedge shaped. However, in other exemplary embodiments, the separation member 1400 can have other shapes, such as rectangular, round, etc. Any shape that separates the web from the lower belts can be used.

Figure 25:
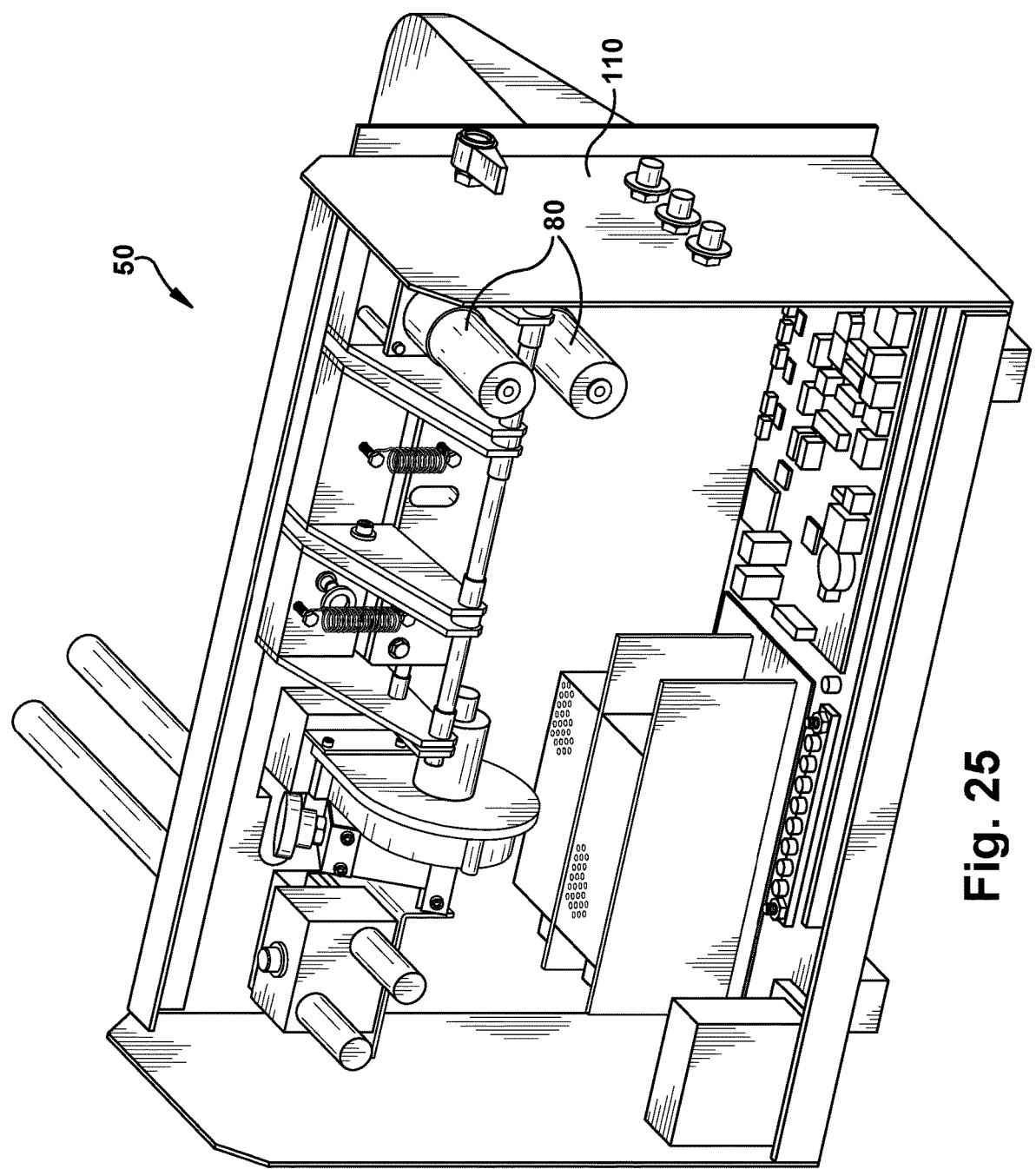
FIG. 25 is a perspective view showing an inside of the air cushion inflation machine.

FIG. 23 illustrates a component diagram of a system 90 including the machine 50. The system 90 includes the rollers 68, belts 70, the heated sealing element 64 and the compliant material 112. Impulse circuitry 92 receives a pulse width modulation (PWM) signal for driving the heated sealing element 64. A Resistance Measurement Circuitry 94 measures current draw from a known voltage. Therefore, the Resistance Measurement Circuitry 94 acts as a current sensor (e.g., feedback resistance) for determining temperature based on a linear relationship with resistance. In one exemplary embodiment, the temperature of the DC powered heat sealing element 64 is repeatedly calculated at very short time intervals. For example, the temperature of the DC powered heat sealing element may be calculated a less than 10 ms, less than 5 ms, less than or equal to 2 ms, or less than or equal to 1 ms. It is contemplated that the system 90 operates at about 281 Hz. If the system operates at about 281 Hz, the heated sealing element 64 is monitored between every about 2 ms and about 10 ms (e.g., in one embodiment about every 3.56 ms) instead of about every 20 ms if the system is operated at 50 Hz. Furthermore, although brushed motors are included on the illustration, brushless motors are also contemplated. Lines 96, 98 represent the encoder feedback from the respective rollers 68 driven by the motors. FIG. 24 illustrates a cross-sectional view of the compliant material 112 and the heated sealing element (e.g., wire) 64. FIG. 25 illustrates the machine 50 with the encoders 81. In this embodiment, the encoders 81 are in the drive train of the motors 100.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, hardware, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

The invention claimed is:

1. A machine for converting two different types of webs of inflatable material to two different types of inflated cushioning material, the machine comprising:
an inflation arrangement configured to provide air at a lower pressure to a first web of a first type of inflatable material to inflate the first type of inflatable material, and configured to provide air at a higher pressure to a second web of a second type of the inflatable material to inflate the second type of the inflatable material, wherein the inflation arrangement comprises a guide pin configured to receive the first and second webs and align the first and second webs on the machine;

a sealing arrangement configured to seal the first type of inflatable material and the second type of inflatable material to create the two different types of inflated cushioning material; and a tensioning device configured to provide a lower tensioning force to the first web as the first web moves between the inflation arrangement and the sealing arrangement, and configured to provide a higher tensioning force to the second web as the second web moves between the inflation arrangement and the sealing arrangement.

2. The machine according to claim 1, wherein the tensioning device is switchable between a first position in which the tensioning device provides the lower tensioning force and a second position in which the tensioning device provides the higher tensioning force.

3. The machine according to claim 1, wherein the tensioning device comprises a spring-loaded pivot arm, a roller attached to the spring-loaded pivot arm, and a shelf.

4. The machine according to claim 3, wherein the roller of the tensioning device forces the second web against the shelf when the tensioning device is providing the higher tensioning force.

5. The machine according to claim 1, further comprising a stop arrangement configured to engage the tensioning device to move the tensioning device between a first position in which the tensioning device provides the lower tensioning force and a second position in which the tensioning device provides the higher tensioning force.

6. The machine according to claim 5, wherein the stop arrangement comprises an arm and a movable stop, wherein the arm of the stop arrangement is connected to a spring-loaded pivot arm of the tensioning device, wherein the movable stop is movable between a first position in which the movable stop engages the arm to cause the tensioning device to be in the first position and a second position in which the movable stop engages the arm to cause the tensioning device to be in the second position.

7. The machine according to claim 1, wherein the inflation arrangement comprises a blower.

8. The machine according to claim 1, wherein the sealing arrangement is configured to create a hermetic seal.

9. A machine for converting two different types of webs of inflatable material to two different types of inflated cushioning material, the machine comprising:

an inflation arrangement configured to provide air at a lower pressure to a first web of a first type of inflatable material to inflate the first type of inflatable material, and configured to provide air at a higher pressure to a second web of a second type of the inflatable material to inflate the second type of the inflatable material, wherein the inflation arrangement comprises a guide pin configured to receive the first and second webs and align the first and second webs on the machine;

a sealing arrangement configured to seal the first type of inflatable material and the second type of inflatable material to create the two different types of inflated cushioning material; and a tensioning device switchable between a first position and a second position, wherein the tensioning device provides a lower tensioning force to the first web as the first web moves between the inflation arrangement and the sealing arrangement when the tensioning device is in the first position, and wherein the tensioning device provides a higher tensioning force to the second web as the second web moves between the inflation arrangement and the sealing arrangement when the tensioning device is in the second position.

10. The machine according to claim 9, wherein the tensioning device comprises a spring-loaded pivot arm, a roller attached to the spring-loaded pivot arm, and a shelf.

11. The machine according to claim 10, wherein the roller of the tensioning device forces the second web against the shelf when the tensioning device is in the second position.

12. The machine according to claim 10, further comprising a stop arrangement configured to engage the tensioning device to move the tensioning device between the first position and the second position.

13. The machine according to claim 12, wherein the stop arrangement comprises an arm and a movable stop, wherein the arm is connected to the spring-loaded pivot arm, wherein the movable stop is movable between a first position in which the movable stop engages the arm to cause the tensioning device to be in the first position and a second position in which the movable stop engages the arm to cause the tensioning device to be in the second position.

14. The machine according to claim 9, wherein the inflation arrangement comprises a blower.

15. The machine according to claim 9, wherein the sealing arrangement is configured to create a hermetic seal.

16. A method of converting two different types of webs of inflatable material to two different types of inflated cushioning material, the method comprising:

moving a first web of a first type of inflatable material along a path of travel;

providing a lower air pressure to the first type of inflatable material;

sealing the first web to form a first type of inflated cushioning material of the two different types of inflated cushioning material;

applying a first tensioning force to the first web with a tensioning device;

moving a second web of a second type of inflatable material along the path of travel;

providing a higher air pressure to the second type of inflatable material;

applying a second tensioning force to the second web with the tensioning device, wherein the second tensioning force is greater than the first tensioning force; and sealing the second web to form a second type of inflated cushioning material of the two different types of inflated cushioning material.

17. The method according to claim 16, further comprising switching the tensioning device between a first position in which the tensioning device applies the first tensioning force to the first web and a second position in which the tensioning device applies the second tensioning force to the second web.

18. The method according to claim 17, wherein the tensioning device comprises a spring-loaded pivot arm, a roller attached to the spring-loaded pivot arm, and a shelf.

19. The method according to claim 17, wherein switching the tensioning device between the first position and the second position includes moving a stop arrangement that engages the tensioning device between a first stop position and a second stop position.

20. The method according to claim 19, wherein the stop arrangement comprises an arm and a movable stop, wherein the arm of the stop arrangement is connected to a spring-loaded pivot arm of the tensioning device, wherein the movable stop is movable such that the stop arrangement can be moved between the first stop position and the second stop position.

* * * * *